(12) United States Patent
Poitau et al.

(10) Patent No.: US 10,264,437 B2
(45) Date of Patent: Apr. 16, 2019

(54) DISCOVERY SIGNAL GENERATION AND RECEPTION

(71) Applicant: INTERDIGITAL PATENT HOLDINGS, INC., Wilmington, DE (US)

(72) Inventors: Gwenael Poitau, Montreal (CA); Ghyslain Pelletier, Laval (CA); Marian Rudolf, Montreal (CA); Benoit Pelletier, Roxboro (CA); Paul Marinier, Brossard (CA); Diana Pani, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 24 days.

(21) Appl. No.: 14/765,201

(22) PCT Filed: Jan. 16, 2014

(86) PCT No.: PCT/US2014/011794
§ 371 (c)(1),
(2) Date: Jul. 31, 2015

(87) PCT Pub. No.: WO2014/113537
PCT Pub. Date: Jul. 24, 2014

(65) Prior Publication Data
US 2016/0142898 A1 May 19, 2016

Related U.S. Application Data

(60) Provisional application No. 61/897,738, filed on Oct. 30, 2013, provisional application No. 61/882,574,
(Continued)

(51) Int. Cl.
*H04L 5/06* (2006.01)
*H04W 8/00* (2009.01)
(Continued)

(52) U.S. Cl.
CPC ....... *H04W 8/005* (2013.01); *H04W 72/0413* (2013.01); *H04W 72/0446* (2013.01); *H04W 76/023* (2013.01); *H04W 76/14* (2018.02)

(58) Field of Classification Search
None
See application file for complete search history.

(56) References Cited

U.S. PATENT DOCUMENTS

| 6,175,561 B1 | 1/2001 | Storm et al. |
| 2007/0064669 A1 | 3/2007 | Classon et al. |

(Continued)

FOREIGN PATENT DOCUMENTS

| CN | 102037752 A | 4/2011 |
| CN | 102859925 A | 1/2013 |

(Continued)

OTHER PUBLICATIONS

U.S. Appl. No. 61/734,323, filed Dec. 6, 2012.*
(Continued)

*Primary Examiner* — Sithu Ko
(74) *Attorney, Agent, or Firm* — Condo Roccia Koptiw LLP

(57) ABSTRACT

Physical layer processing and procedures for device-to-device (D2D) discovery signal generation and transmission and scheduling of D2D discovery signals are described. Detection and measurement of a D2D discovery signal, D2D signal identity management, and monitoring by a wireless transmit/receive unit (WTRU) of PDCCH for D2D discovery scheduling is described, as is a WTRU that may be configured with a D2D-specific transmission/reception opportunity pattern. The discovery signal may carry a payload for explicit information about user and/or service identity, and may be mapped to physical resources in such a way as to decouple transmission/reception of the discovery (Continued)

signal from downlink operations. A WTRU may measure a D2D discovery signal quality and report to the network.

20 Claims, 27 Drawing Sheets

Related U.S. Application Data filed on Sep. 25, 2013, provisional application No. 61/821,038, filed on May 8, 2013, provisional application No. 61/807,476, filed on Apr. 2, 2013, provisional application No. 61/753,173, filed on Jan. 16, 2013, provisional application No. 61/753,389, filed on Jan. 16, 2013.

(51) Int. Cl.
*H04W 76/14* (2018.01)
*H04W 76/02* (2009.01)
*H04W 72/04* (2009.01)

(56) References Cited

U.S. PATENT DOCUMENTS

| | | | |
|---|---|---|---|
| 2009/0285119 A1 | 11/2009 | Horn et al. | |
| 2010/0165882 A1 | 7/2010 | Palanki et al. | |
| 2010/0202400 A1 | 8/2010 | Richardson et al. | |
| 2011/0268101 A1 | 11/2011 | Wang et al. | |
| 2011/0305179 A1 | 12/2011 | Wang et al. | |
| 2012/0129540 A1* | 5/2012 | Hakola | H04W 72/042 455/450 |
| 2012/0163235 A1* | 6/2012 | Ho | H04W 76/023 370/254 |
| 2012/0269250 A1 | 10/2012 | Li et al. | |
| 2013/0157656 A1* | 6/2013 | Gao | H04W 76/023 455/434 |
| 2013/0315152 A1* | 11/2013 | Ratasuk | H04W 76/023 370/329 |
| 2014/0269419 A1* | 9/2014 | Han | H04W 56/00 370/254 |
| 2015/0057006 A1* | 2/2015 | Gao | H04W 72/04 455/450 |
| 2015/0319796 A1* | 11/2015 | Lu | H04B 7/2615 370/330 |

FOREIGN PATENT DOCUMENTS

| | | |
|---|---|---|
| CN | 103380654 A | 10/2013 |
| JP | 2012-514435 A | 6/2012 |
| JP | 2013-529416 A | 7/2013 |
| JP | 2014-504814 A | 2/2014 |
| RU | 2208914 C2 | 7/2003 |
| WO | WO 2010/116220 A1 | 10/2010 |
| WO | WO 2011/130630 A1 | 10/2011 |
| WO | WO 2012/066433 A1 | 5/2012 |
| WO | WO 2012/088470 A1 | 6/2012 |

OTHER PUBLICATIONS

3rd Generation Partnership Project (3GPP), R1-130493, "Dense Small Cell Mobility with Realistic Cell Detection", Nokia Siemens Networks, Nokia Corporation, 3GPP TSG RAN WG1 Meeting #72 Malta, Jan. 28-Feb. 1, 2013, 5 pages.

$3^{rd}$ Generation Partnership Project (3GPP), TS 36.213 V10.1.0, "$3^{rd}$ Generation Partnership Project; Technical Specification Group Radio Access Network; Evolved Universal Terrestrial Radio Access (E-UTRA); Physical layer procedures (Release 10)", Mar. 2011, 115 pages.

$3^{rd}$ Generation Partnership Project (3GPP), TS 36.211 V10.1.0, "$3^{rd}$ Generation Partnership Project; Technical Specification Group Radio Access Network; Evolved Universal Terrestrial Radio Access (E-UTRA); Physical Channels and Modulation (Release 10)", Mar. 2011, 103 pages.

$3^{rd}$ Generation Partnership Project (3GPP), TS 36.212 V10.1.0, "$3^{rd}$ Generation Partnership Project; Technical Specification Group Radio Access Network; Evolved Universal Terrestrial Radio Access (E-UTRA); Multiplexing and channel coding (Release 10)", Mar. 2011, 76 pages.

Khan, Farooq, "LTE for 4G Mobile Broadband: Air Interface Technologies and Performance", Cambridge University Press, Mar. 26, 2009, 4 pages of relevance pp. 188-191.

* cited by examiner

Legend:

No transmission

Reference symbols

Other (e.g. gap, synchronization, discovery sequance, payload)

Legend:

No transmission

Reference symbols

Other (e.g. gap, synchronization, discovery sequance, payload)

DISCOVERY SIGNAL GENERATION AND RECEPTION

CROSS-REFERENCE TO RELATED APPLICATIONS

This application is the National Stage Entry under 35 U.S.C. § 371 of Patent Cooperation Treaty Application No. PCT/US2014/011794, filed Jan. 16, 2014, which claims the benefit of U.S. Provisional Patent Application Nos. 61/897,738 filed on Oct. 30, 2013; 61/882,574 filed on Sep. 25, 2013; 61/821,038 filed on May 8, 2013; 61/807,476 filed on Apr. 2, 2013; 61/753,173 filed on Jan. 16, 2013; 61/753,389 filed on Jan. 16, 2013, the contents of which are hereby incorporated by reference herein.

BACKGROUND

Device-to-device (D2D) communication may facilitate specific commercial and social applications, network offloading, and/or public safety direct communications. These proximity services (ProSe) may require D2D discovery and communication procedures.

Some wireless technologies, e.g., Wi-Fi and/or Bluetooth may allow direct communication between two devices. However, such technologies may work on license-exempt bands and may be subject to higher interferences and lower Quality of Service. Moreover, with the emergence of Long Term Evolution (LTE) and Long Term Evolution Advanced (LTE-A) mobile technologies, it may be desirable to enable network control of D2D communication.

SUMMARY

Methods and devices associated with device to device (D2D) signaling by a wireless transmit/receive device are described comprising determining a discovery signal schedule indicating allowed subframes to transmit a D2D discovery signal, determining a scrambling sequence, determining to transmit the D2D discovery signal on one or more of the allowed subframes, and transmitting the D2D discovery signal using the scrambling sequence, wherein the D2D discovery signal comprises a payload and a reference symbol.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
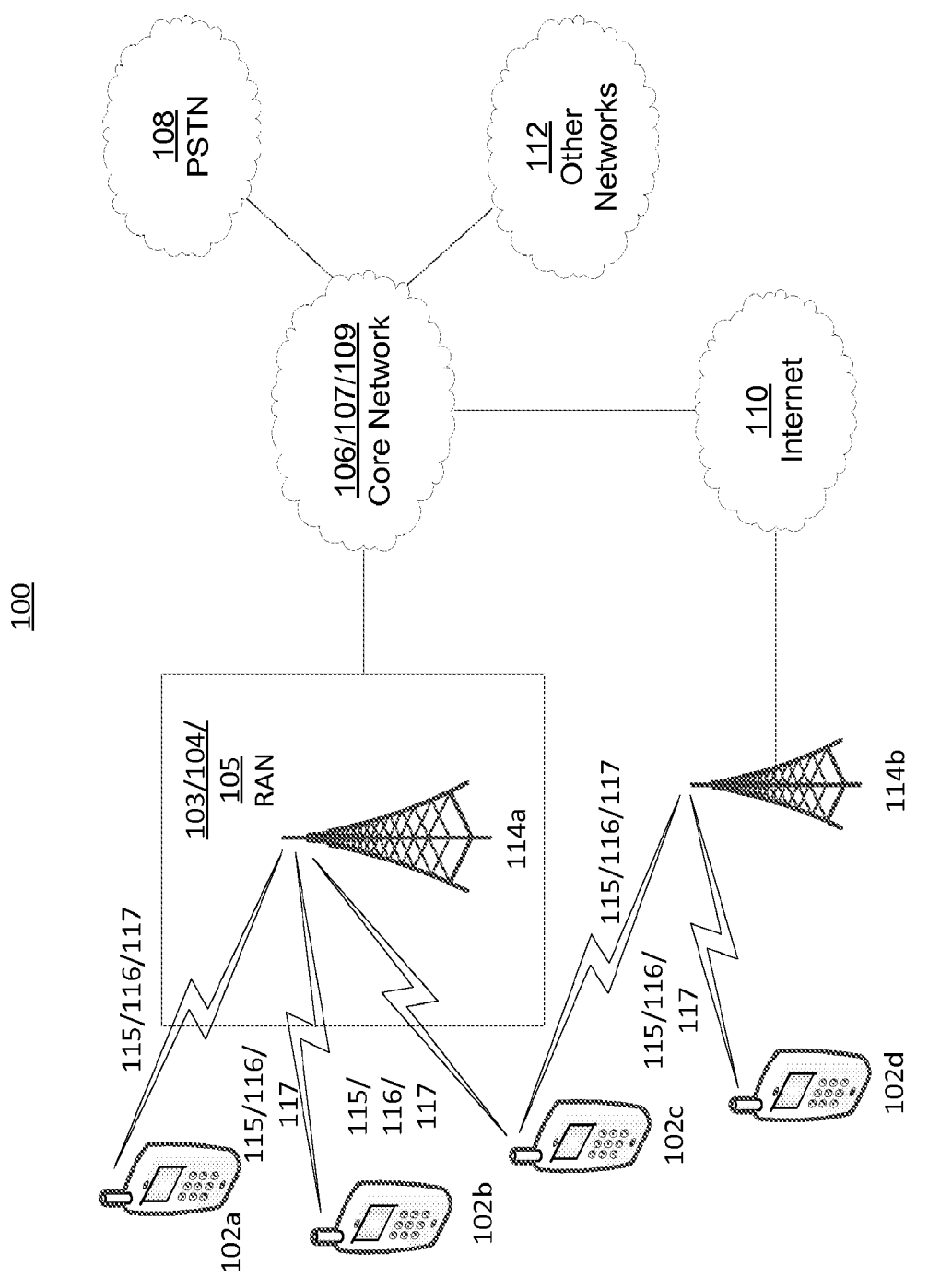
FIG. 1A is a system diagram of an example communications system.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
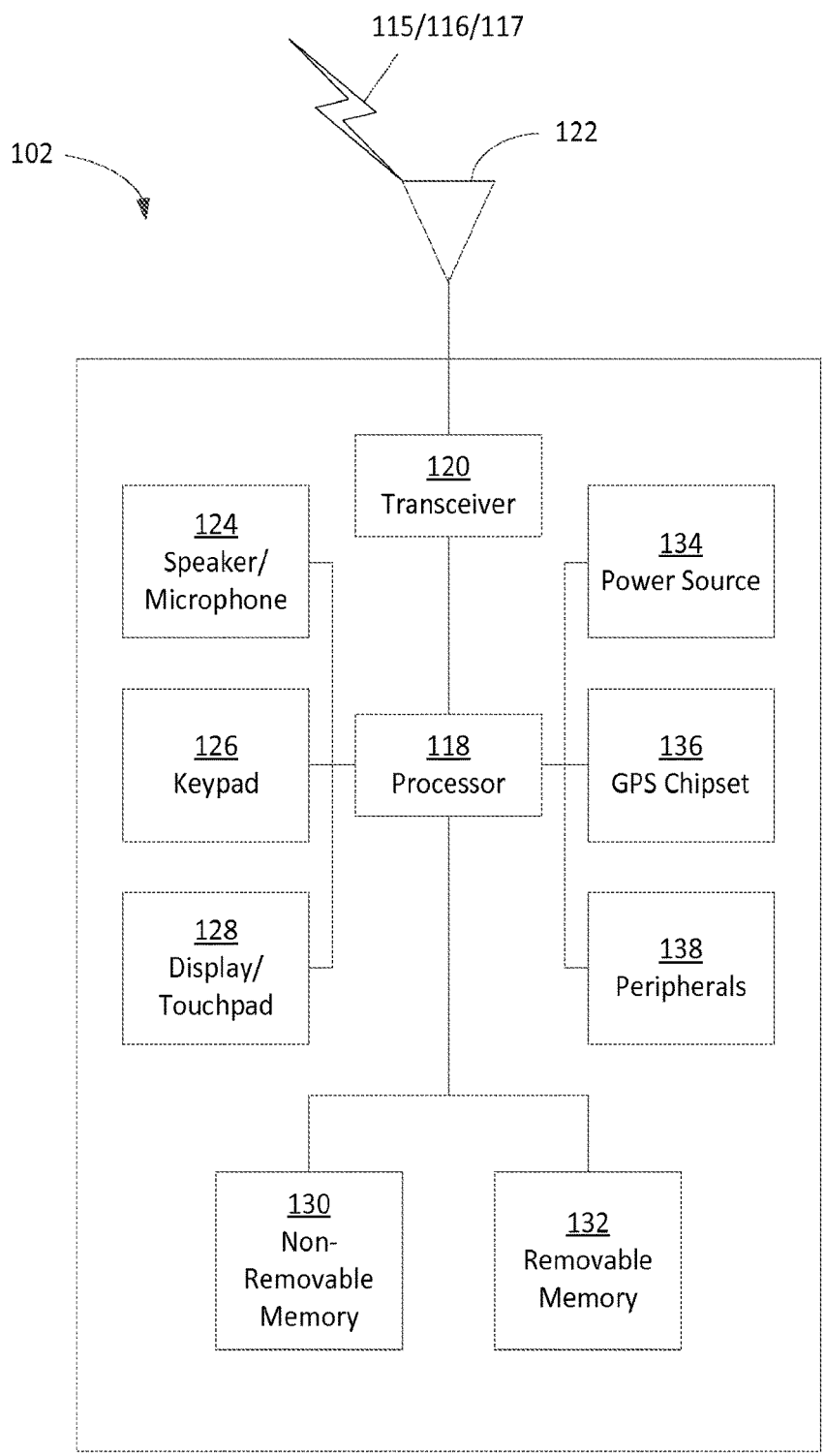
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
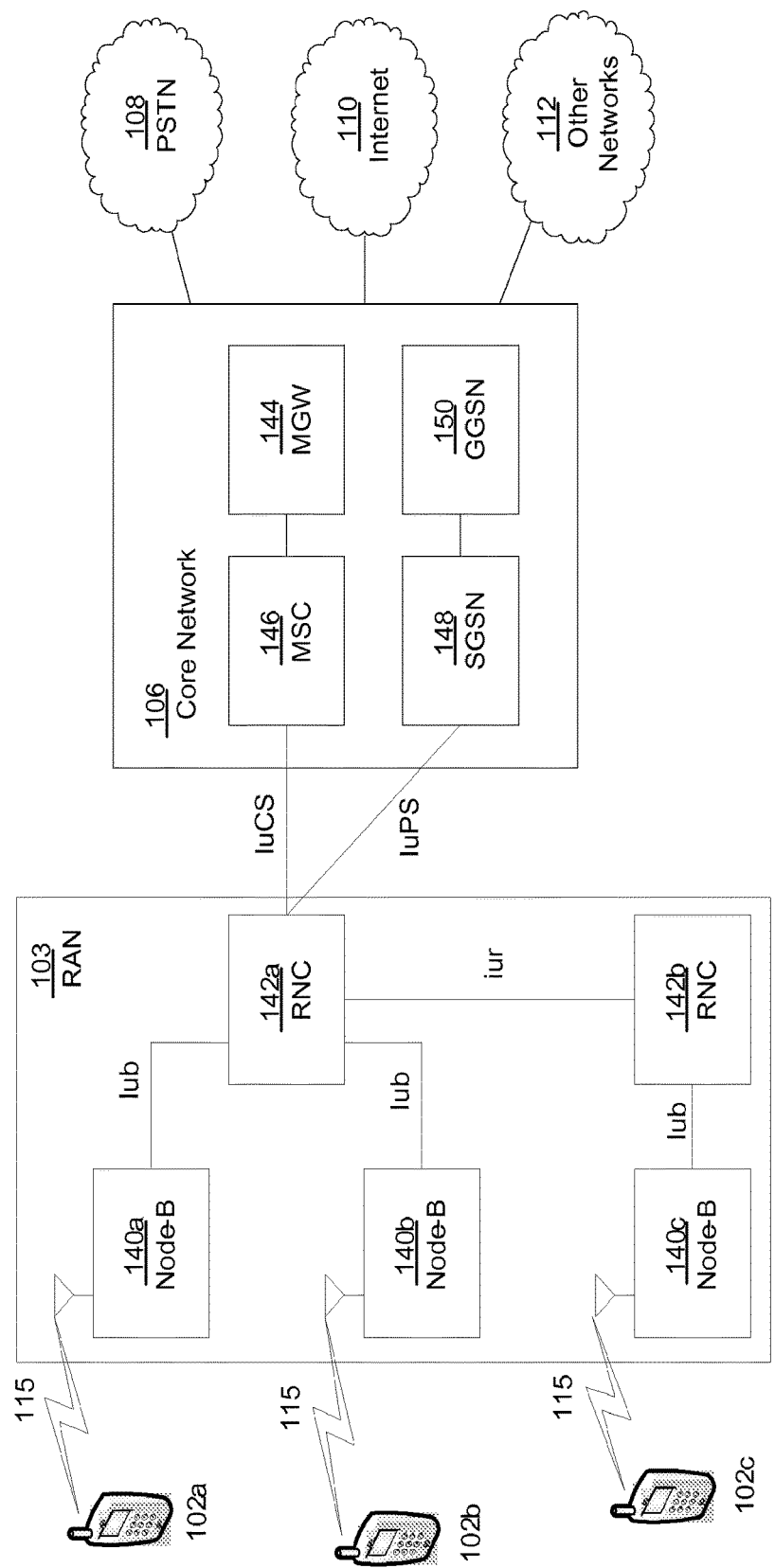
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
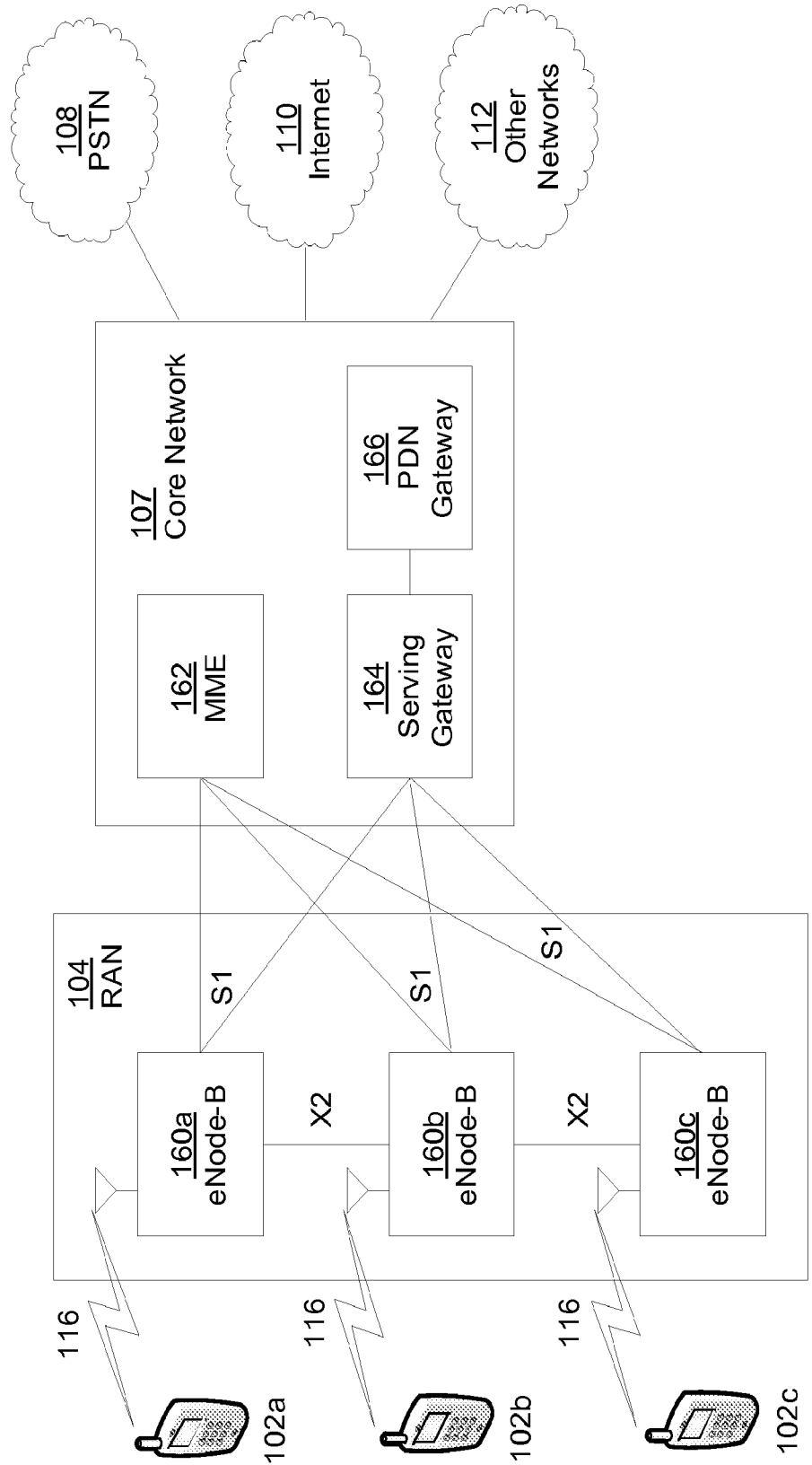
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
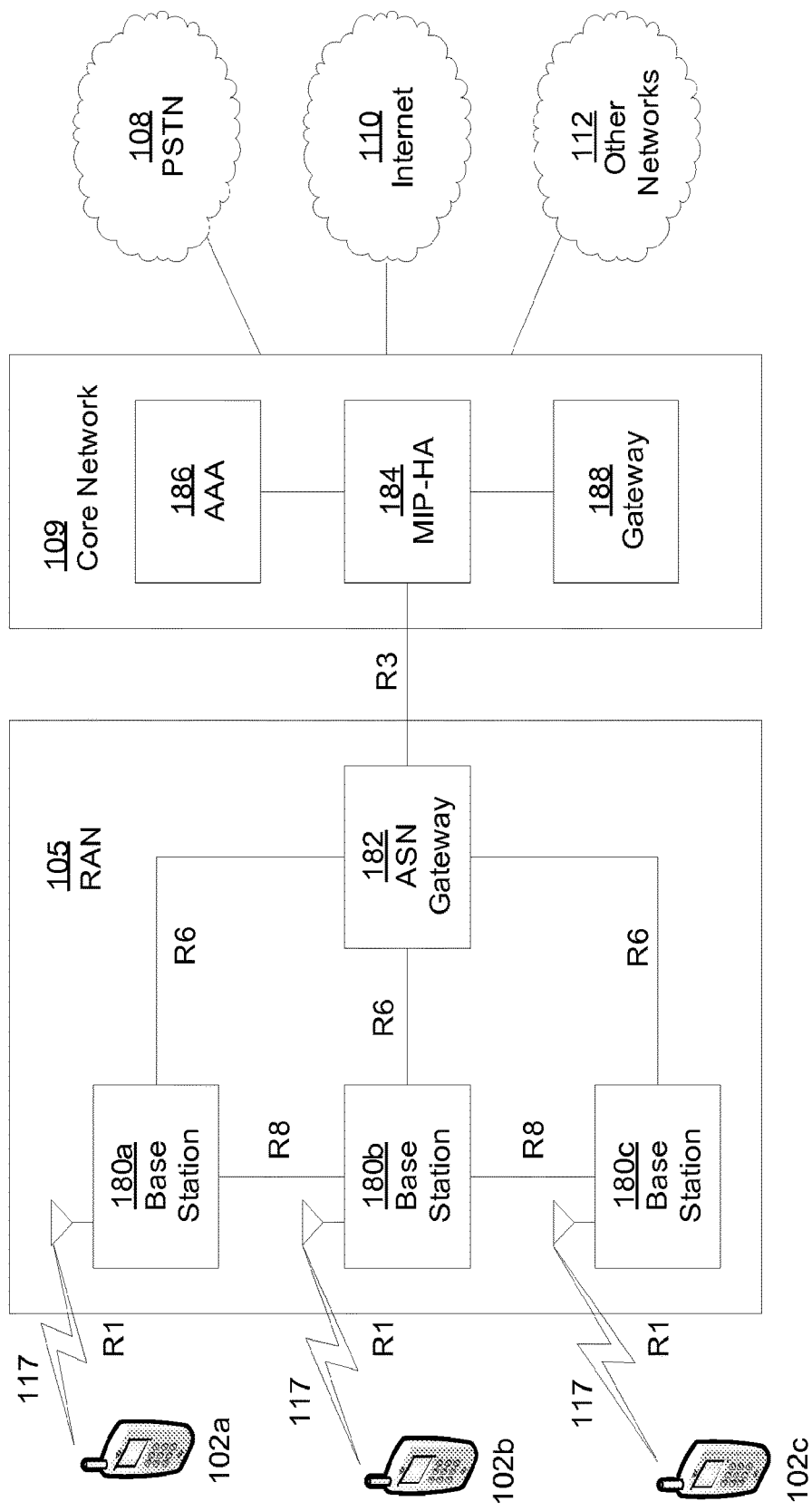
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Embodiments recognize that proximity services (ProSe) may be getting more and more attention from the cellular technology ecosystem. These services may rely on proximity between two or more devices and may allow specific commercial and social applications, network offloading, and/or public safety direct communications. Other alternatives such as WIFI or Bluetooth may allow direct communication between two devices (D2D), perhaps on a license-exempt band and thus may be subject to higher interferences and lower Quality of Service. The cellular technology may allow a network control of the D2D communication. Embodiments contemplate that it may be useful to reduce the device scanning time and/or its power consumption and perhaps also in terms of the link security level offered by a centralized infrastructure. This may allow reusing the same resources for the D2D and/or the infrastructure mode under control of the level of interferences between one or more, or each, mode. Adding the D2D capability to the cellular technology may be useful for public safety applications. It may allow the use of the same technology for local calls in direct or D2D mode and may allow access to the national cellular network with the same equipment, for example. This may allow generating economies of scale. The integration of both capabilities may improve the response time and coordination in case of major disasters, among other conditions.

The proximity between two devices may be determined using a variable level of accuracy (e.g., depending on the approach). For example, using GPS to determine the proximity between two devices may involve the two devices supporting GPS and may involve both devices acquiring the position, which may be difficult in one or more, or all, conditions (e.g., indoor, street canyon, and/or under heavy rain/cloud coverage). Using network positioning (e.g., triangulation based on known location or eNB) may lead to other uncertainties, perhaps due to propagation channel characteristics. Embodiments may recognize that these two approaches may rely on the two devices reporting their position to the network which then may determine the proximity. Other approaches for proximity detection may rely on a wireless transmit/receive unit (WTRU) transmitting a beacon and another WTRU attempting to detect the signal. Such approaches may operate under any channel and environmental conditions, perhaps providing a measure of radio-frequency proximity. Embodiments may contemplate devices and techniques for enabling such discovery mechanisms, for example in the context of LTE systems. Embodiments may contemplate techniques and devices for transmitting and/or receiving a discovery signal and/or the determination as to when to transmit and/or receive a discovery signal.

In one or more embodiments, the term device may encompass, without restricting its applicability, any entity such as a mobile device (e.g., a WTRU) or a network node, any application or possibly a user, or combination thereof. For example, a mobile device may take on the role of a network device (e.g., in one or more D2D embodiments). The term device or UE or WTRU may be used generally to this meaning, unless specifically stated otherwise. By way of illustration, and not limitation, one or more embodiments may contemplate the following terms.

Discovery may relate to a first device detecting a second device. Service discovery may relate to a device may detecting the availability of a service. RF discovery may relate to a first device detecting the proximity of a second device based on one or more radio characteristics, e.g., the first device detects a signal transmitted by the second device, or the first device is informed by the network of the proximity of the second device (e.g., for proximity at cell level). RF proximity may relate to a first device detecting that a second device is within range. Discovery identity may relate to an identifier that may be used to determine a relationship between a discovery procedure and a requesting device. A Discovery Identity may be associated to a RF discovery procedure or to a Service Discovery procedure, or both. Service discovery identity may relate to a discovery identity associated with a service discovery procedure. RF discovery identity may relate to s discovery identity associated with an RF discovery procedure. An RF identity may be for example one of an index to a physical resource or to a scrambling sequence, a numerical value, a CRC, a service discovery identity, or the like.

Discovery Signal: A discovery signal transmitted by a first device. Such signal may be received by a second device and may be used to detect RF proximity. A discovery signal may include a payload (e.g., a service discovery identity).

Discovery Shared Channel (DISCH): A logical channel that may contain discovery information.

Physical Device-to-Device Channel (PD2DCH): Physical channel that may be used for discovery signal and/or for transmission of payload. For example, the PD2DCH may carry DISCH messages. The PD2DCH may be defined as a physical channel between a plurality of WTRUs. In some embodiments, this may be a departure from conventional channels, which may be defined either as uplink (from the WTRU to eNB) or as downlink (from the eNB to the WTRU) channels. Transmissions on the PD2SCH may be used as a discovery signal. A transmission on PD2DCH may be associated with a transmission of at least one physical signal such as at least one reference signal used for demodulation purposes, at least one synchronization signal used for synchronization purposes, at least one preamble or postamble used for channel estimation purposes, and/or at least one discovery signal.

Discovery Request: Procedure by which a device makes a Discovery Identity visible and/or available to other devices. Such request may be performed by transmitting a discovery signal and/or by transmitting on a DISCH.

Discoverable Service: A service that may be detected by another device (e.g., a WTRU, or an application) using a service discovery procedure.

Detectable Device: A device (e.g., a second WTRU) that may be detected by another device (e.g., a first WTRU) using a RF discovery procedure.

Discoverable WTRU: A WTRU may be discoverable by advertising a service (e.g., the WTRU has at least one discoverable service), by transmitting a discovery signal (e.g., the WTRU is a detectable device) or both in combination. A discoverable WTRU may thus be a WTRU that transmits a discovery signal and/or that requests the transmission of at least a Discovery Identity on a DISCH (e.g., broadcasted by the network) and/or that performs the transmission of at least a Discovery Identity on a DISCH.

Monitoring WTRU: A WTRU that actively searches for a service, for another WTRU or for both. For example, a WTRU that monitors for a Discovery Signal and/or for a Discovery Identity in a given resource in time/frequency and/or on a DISCH.

Discovery area: Network area where the information on discovery processes is broadcasted. This may be a cell, a group of cells, etc.

Discovery area center: Network entity handling the discovery processes for a given discovery area.

Embodiments contemplate that the term network to refer to any element or function of a wireless network infrastructure. For example, a network element may have the capability of controlling transmission and/or reception of devices (WTRUs), transmit signals used for reference by devices, etc. Examples of network elements may include an eNB, MME, S-GW, and the like. The term network may refer to any device that has this capability, e.g., in a specific context. For instance, in some public safety applications it may be possible that a device takes the role of a network for certain functionalities.

Embodiments may contemplate one or more techniques and/or devices for discovery signal scheduling, transmission and/or reception. One or more embodiments may be applicable in the context of a WTRU in the presence of an LTE network infrastructure, or under the control of another device acting as a network infrastructure. One or more embodiments may be applicable to the case where the WTRU may not be in the presence of a network infrastructure (e.g., which may be referred to as infrastructure-less mode, or ad-hoc mode, for example).

Although one or more embodiments may be described in the context of LTE systems, the contemplated embodiments may be applicable to other wireless technologies. One or more embodiments may assume that the WTRU knows its role, that is, the WTRU knows whether or not it should be monitoring or discoverable. A WTRU for example may receive a configuration indicating its role by the application layer, by higher signaling layers, and/or via dedicated L1 messages, for example. One or more embodiments may contemplate discovery signal scheduling, for the WTRU to determine when to transmit a discovery signal, and/or when to receive a discovery signal and which resources to use. One or more embodiments may contemplate discovery signal transmission and reception. In one or more embodiments, the term PDCCH may be used to refer to either the PDCCH or to an ePDCCH, and/or more generally to any type of scheduling channel, for example. While the contemplated techniques and devices may be described herein in the context of a conventional LTE carrier (e.g., with PDCCH, CRS, etc), the contemplated techniques and devices may be applicable to new (e.g., contemplated or heretofore undefined) carrier types (NCT).

In one or more embodiments, the term discovery signal may be used in describing one or more techniques. In some embodiments, the described techniques and devices may apply to a discovery sequence and/or a discovery payload. In some embodiments, e.g., when referring to a discovery signal, the contemplated techniques and devices may be applicable to a discovery sequence and/or a discovery payload. In some embodiments, the term discovery signal, discovery sequence, and/or discovery payload may be used interchangeably.

Embodiments contemplate one or more scheduling techniques for transmission of a discovery signal. The term "discovery signal" may include one or more, or any, transmission between two or more WTRUs. For example, it may be a transmission on a physical resource or on a physical channel e.g., accompanied by supporting signals (e.g., synchronization, preamble, reference and/or discovery signals) that may or may not include a payload, including but not limited to a physical signal (such as an SRS or a synchronization signal e.g., PSS/SSS), or a transmission over a physical channel (e.g., with a similar structure as a PUSCH or PDSCH, or a new channel which may comprise this purpose e.g., a PD2DCH). It may be a signal according to those described herein, or the like.

A WTRU may be configured to transmit a discovery signal. Such transmission may be performed on physical resources corresponding to an uplink or to a downlink frequency of a cell, which aspect may be part of the WTRU's configuration. A WTRU may be configured to receive a discovery signal with similar physical resources.

A discovery signal may carry information such as control signaling or may be associated to a payload. Such payload may be information corresponding to WTRU characteristics, such as identification, or data radio bearers and/or signaling radio bearers, system information blocks (SIBs), and/or special system information blocks for discovery or direct communications (SIBD), or the like.

A discovery signal may be scheduled, e.g., dynamically, semi-statically, and/or configured. Embodiments may contemplate allocating and/or scheduling radio resources for the discovery signal, e.g., according to one or more, or each, of these principles.

The WTRU may be configured with one or more set of discovery signal information, where one or more, or each, may correspond to a different discovery process. A discovery process may be characterized for example by a set of parameters that may include an associated D-RNTI. For example, a WTRU may not be configured with two discovery processes associated to the same D-RNTI or with the same parameters. In other words, a WTRU may be able to distinguish different discovery processes. For example, the WTRU may be configured with a discovery process associated with one or more discovery signals, and/or with one or more discovery payloads.

In one or more embodiments regarding periodic discovery signal transmission, the WTRU may be configured for one or more, or each, discovery process with a specific set of resources (e.g., PRB, OFDM symbols, subframe, etc.) for discovery signal transmission, which may include, for example, a configuration for periodic transmission of the discovery signal.

A WTRU may be configured with a number of parameters applicable to the scheduling of a discovery signal (or to scheduling of a PD2DCH transmission and/or applicable to a transmission on the PD2DCH) that may be associated to a discovery process. Such configuration may be received on the system information broadcasting (e.g., as part of a SIB), on a DISCH broadcasted in the cell, using dedicated signaling or a combination thereof.

One or more embodiments may contemplate the reception of a configuration on broadcasted SysInfo or by dedicated signaling. For example, a WTRU (e.g., in IDLE mode) may receive broadcast system information that may include a discovery signal configuration. A WTRU in connected mode may receive such configuration by dedicated signaling. Such discovery signal configuration may include parameters related to scheduling of discovery signal transmissions, e.g., semi-static scheduling information, and/or parameters that may be required for dynamic scheduling.

Embodiments may contemplate the reception of a DISCH configuration on broadcasted SysInfo and/or by dedicated signaling. The configuration received by the WTRU (e.g., such as by system information broadcast) may include parameters for acquisition of a Discovery CHannel (DISCH), e.g., in the concerned cell. Such DISCH may be a logical transport channel by which a WTRU may receive a set of identities (either a service identity and/or a RF identity) and possibly one or more, or each, associated to a device to device-specific configuration e.g., a discovery signal configuration for RF discovery.

One or more embodiments may contemplate the configuration of scheduling parameters for discovery signal. For example, a WTRU may receive scheduling related and/or other configuration parameters (e.g., for a discovery process) according to at least a subframe configuration for PDCCH decoding.

A WTRU may receive timing parameters related to the reception of control signaling on PDCCH (e.g., from which the WTRU may derive the timing of the applicable discovery signal transmission, for example, as per one or more of the techniques described herein).

For example, such parameters may include a frame configuration e.g., in the form of one or more of a cycle duration (DCycle), an offset (DOffset), and/or other parameter to determine applicable radio frame(s) or subframes.

The WTRU may determine applicable subframes according to:

$$[SFN*10+\text{subframe number}]\,\text{modulo}(D\text{Cycle})= D\text{Offset} \quad (1)$$

where in this example the cycle (DCycle) and the offset (DOffset) may be expressed in units of subframes. A subframe configuration may be configured for example in the form of a bitmap indicating one or more subframe in the concerned radio frame(s), or the like.

For example, applicable radio frame(s) or subframes may be determined by the WTRU as a function of a subframe configuration index or index set representative of parameters such as cycle duration (DCycle) and/or offset (DOffset). Exemplary cell or WTRU specific subframe configuration period DCycle and the cell or WTRU specific subframe offset DOffset for the transmission of discovery signal(s) are shown in Table 1. The parameter D2D-SubframeConfig may be provided by signaling such as RRC. Subframes which are candidates to transmission of discovery signals may be those satisfying [SFN*10+subframe number] modulo (DCycle) ∈DOffset. Based on the example shown in Table 1, similar mappings of cycle duration, offsets, and other parameters from/to index or index sets describing the occurrences of discovery signal transmission opportunities may be construed, which may result in possibly different settings for periodicities, different mappings to allowable subframes for a given frame, and/or number of discovery signal transmission opportunities per multi-frame period, etc.

TABLE 1

Example Discovery signal subframe configuration

| Discovery signal - SubframeConfig | Binary | Configuration Period DCycle (in subframes) | Transmission offset DOffset (in subframes) |
|---|---|---|---|
| 0 | 0000 | 10 | {0} |
| 1 | 0001 | 20 | {0} |
| 2 | 0010 | 20 | {5} |
| 3 | 0011 | 40 | {0} |

TABLE 1-continued

Example Discovery signal subframe configuration

| Discovery signal - SubframeConfig | Binary | Configuration Period DCycle (in subframes) | Transmission offset DOffset (in subframes) |
|---|---|---|---|
| 4 | 0100 | 40 | {5} |
| 5 | 0101 | 80 | {2} |
| 6 | 0110 | 80 | {3} |
| 7 | 0111 | 80 | {0, 5} |
| 8 | 1000 | 80 | {0, 5} |
| 9 | 1001 | 160 | {0} |
| 10 | 1010 | 160 | {2} |
| 11 | 1011 | 160 | {4} |
| 12 | 1100 | 160 | {6} |
| 13 | 1101 | 160 | {0, 2, 4, 6, 8} |
| 14 | 1110 | 160 | {1, 3, 5, 7, 9} |
| 15 | 1111 | reserved | reserved |

The applicable subframes may also be determined as a function of a specific RNTI and SFN, offset and subframe number (e.g., according to [SFN−D-RNTI] mod (offset)=0) in which the WTRU wakes up to monitor the PDCCH. The determination may also be as a function of the SFN, offset, and a specific RNTI.

In such subframe, the WTRU may monitor the PDCCH for a specific RNTI (e.g., a configured D-RNTI). The WTRU may monitor for DCIs that may be specific to device to device scheduling. In such subframe, the WTRU may attempt blind decoding on PDCCH for DCI sizes that may correspond a DCI that may be specific to the discovery procedure. In some embodiments perhaps only such DCI sizes and perhaps if the WTRU may not be required to decode other scheduling information in the concerned subframe. A WTRU may receive a DCI that may dynamically schedule a discovery signal transmission. A WTRU may receive a DCI that may activate and/or deactivate a configured resource for discovery signal. A WTRU may receive a DCI that re-associates a configured resource for discovery signal to a different RF discovery identity. The WTRU may determine whether it may (or perhaps should) receive or transmit the corresponding discovery signal, for example according to methods described herein (e.g., as a function of the RNTI, search space, DCI format, DCI content, PD2DCH occasion, and/or RF Discovery Identity associated to the received DCI).

Such PDCCH monitoring may be part of the WTRU's DRX active time. In such cases, the WTRU may monitor other DCIs and/or other RNTIs applicable to the subframe according to legacy procedures (e.g., either in idle mode or in connected mode). In some embodiments, it may not be applicable to the WTRU's DRX algorithm.

In one or more embodiments, a WTRU may receive scheduling related and/or configuration parameters (e.g., for a discovery process) according to at least a subframe configuration for discovery signal occasions. For example, such parameters may include a frame configuration, e.g., in the form of an offset to determine applicable radio frame(s) or subframe(s). For example according to [SFN*10+subframe number] mod (cycle)=offset where the cycle may represent the periodicity and the offset may be a subframe offset with respect to (w.r.t.) frame number. A subframe configuration for example in the form of a bitmap indicating one or more subframe in the concerned radio frame(s), or the like may also be used. The occasions may also be determined as a function of a network configurable subframe number (e.g.,

[SFN+subframe number] mod (cycle)=0. The occasions may be determined as a function of a network configurable specific D2D RNTI.

In some embodiments, the WTRU may receive timing parameters related to the occurrence of a discovery signal transmission. For example, the WTRU may receive scheduling information such that it may provide control parameters for occasions that may be fixed and/or periodically recurring in time.

In one or more embodiments, a WTRU may receive scheduling related and/or other configuration parameters (e.g., for a discovery process) according to at least one (or more) RNTI(s) for PDCCH decoding. Such parameters may include RNTI (e.g., Discovery-RNTI (D-RNTI)) for reception of control information on PDCCH (e.g., in particular for dynamic scheduling).

For example, a WTRU (either in IDLE or CONNECTED mode) may receive system information broadcasted by the network, which information may include a shared RNTI (e.g., a D-RNTI) for the scheduling of resources for the discovery signal. For example, a WTRU may decode control signaling scrambled by a shared D-RNTI in the PDCCH common search space (e.g., cell-specific search space). In LTE, the DCI information may be CRCd. The CRC may then "masked" (or equivalently "scrambled") with an RNTI. To simplify herein, embodiments may equivalently refer to this operation as "DCI scrambled with an RNTI", or "control signaling is scrambled. If the WTRU receives a discovery signal configuration by dedicated signaling, the WTRU may decode control signaling scrambled by the corresponding RNTI (e.g., C-RNTI may also be applicable in case discovery signal-specific DCIs may be used) also in the WTRU-specific search space.

In another example, a WTRU may receive a configuration using dedicated signaling, which information includes a RNTI (e.g., a D-RNTI) for device-to-device scheduling. For example, the WTRU may decode control signaling and determine that discovery scheduling information is present for the WTRU in the PDCCH located in a D2D specific search space when the PDCCH CRC is scrambled by the D-RNTI.

In another example, the WTRU may be configured with two RNTIs, one that may be used when the WTRU may be scheduled to transmit a discovery signal and/or on the discovery channel and one that may be used when the WTRU may be scheduled to receive a discovery signal (e.g., a receiving and transmitting RNTI). The WTRU may decode the PDCCH and may determine that a DCI contains scheduling information for discovery signal reception for the concerned WTRU, perhaps if the corresponding CRC may be scrambled with a receiving RNTI (in some embodiments, possibly only if the DCI may include an identity that corresponds to the discovery process for the concerned WTRU). The WTRU may decode the PDCCH and may determine that a DCI contains scheduling information for discovery signal transmission for the concerned WTRU, perhaps if the corresponding CRC may be scrambled with a transmitting RNTI (in some embodiments, possibly, only if the DCI may include an identity that corresponds to the discovery process for the concerned WTRU). In one example, the same control signaling e.g., DCI, PDCCH and RNTI may be used to schedule a transmitting WTRU and a receiving WTRU. In such cases, the transmitting RNTI for one WTRU may be the same as the receiving RNTI for the target receiving WTRU.

Such parameters may include a RNTI for signaling, activating and/or deactivating a configured resource, e.g., a RNTI for a Semi-Persistent Scheduling of resources for device-to-device transmissions e.g., a SPS-D-RNTI, if any. Such parameters may include a RNTI for scheduling of the DISCH, if configured.

In one or more embodiments, a WTRU may receive scheduling related and/or other configuration parameters (e.g., for a discovery process) according to at least a discovery specific search space. The WTRU may be configured with a discovery-specific search space. Such search space may be determined based on at least one of an identifier specific to device-to-device (e.g., a virtual group ID VGID, a service or a RF identity, a D-RNTI e.g., either a receiving D-RNTI or a transmitting D-RNTI), the number of CCEs in the concerned subframe k, the CCE aggregation level L (e.g., 1, 2, 4, 8, 16 or a subset thereof) and/or a system frame number SFN. Such parameters may be configuration aspects of the WTRU.

For example, the CCEs corresponding to PDCCH candidate m of the discovery-specific search space may be given by:

$$L \cdot \{(Y_k + m) \bmod \lfloor N_{CCE,k}/L \rfloor\} + 1$$

Where for example:

$i = 0, \ldots, L-1$;
$m = 0, \ldots, M^{(L)}-1$ ($M^{(L)}$ is the number of PDCCH candidates in SS e.g., ref 36.213
table 9.1.1-1, or could be a function of the new set of DCIs for discovery);
$N_{cce}$: number of CCEs in sub-frame #k;
$Y_k = (A \cdot Y_{k-1}) \bmod D$
   With A=39827, D=65537;
   $K = \lfloor n_s / 2 \rfloor$, $n_s$ is the slot number within the radio frame;
   $Y_{-1} = VGID$ In addition, the WTRU may be configured with an extended range for PDCCH, e.g., as an extension to the set of Resource Elements (REs) used for PDCCH. Possibly, such extension may be applicable only to the discovery-specific search space. For example, the WTRU may initialize a PDCCH search space using a virtual ID, which search space may or may not overlap the Common Search Space and the WTRU-Specific Search Space.

In one or more embodiments, a WTRU may receive scheduling related and/or configuration parameters (e.g., for a discovery process) according to at least multiple search spaces. For example, a WTRU may be configured with a plurality of search spaces for PDCCH decoding, where each space may be associated to a specific function. For example, successful decoding of a DCI in a first search space for a specific RNTI may indicate that the control signaling is for a discovery signal transmission, while successful decoding of a DCI in a second search space may indicate that the control signaling may be for reception of a discovery signal. For example, two WTRUs that may be expected to participate in the same discovery process may then be configured with the same RNTI for different search spaces, whereby receiving the same DCI may then be interpreted in a different manner, e.g., either as a transmission or as a reception as a function of the given configuration. Possibly, the additional search space may be located in REs different than that the cell's PDCCH. Possibly, the additional search space may be located on the ePDCCH.

In one or more embodiments, a WTRU may receive scheduling related and/or configuration parameters (e.g., for a discovery process) according to at least a type of scheduling for discovery signal and associated parameters. In one or more embodiments, the WTRU may receive a configuration enabling dynamic scheduling for discovery signal. For example, the WTRU may use the received configuration either to acquire further control signaling information (e.g., in DCIs on PDCCH scrambled by D-RNTI, or in discovery signal-specific DCI format(s) scrambled by C-RNTI on PDCCH) by dynamic scheduling in the applicable subframe(s). Examples of such further control signaling content are described herein.

In one or more embodiments, the WTRU may receive a configuration enabling semi-persistent scheduling for discovery signal. For example, the WTRU may behave as described herein. Such configuration may be received either on a broadcast channel or by dedicated signaling. Such configuration may include a SPS-D-RNTI, a physical resource and/or timing information for the subframe applicable for the scheduling information.

In one or more embodiments, a WTRU may receive scheduling related and/or configuration parameters (e.g., for a discovery process) according to at least transmission parameters for discovery signal as described herein.

In one or more embodiments, a WTRU may receive scheduling related and/or configuration parameters (e.g., for a discovery process) according to at least any combinations of the techniques described herein. Possibly, the WTRU may receive timing parameters related to subframe for reception of PDCCH scheduling and timing parameters related to subframe for occurrences of discovery signal transmission. For example, the WTRU may receive DCI scrambled by D-RNTI that schedules a discovery signal transmission for the next possible configured discovery signal occurrence.

In another example, the WTRU may be configured with one or more special radio network identifier associated to a discovery process (e.g., D-RNTI). The WTRU may then receive discovery-related scheduling information over the PDCCH by detecting the D-RNTI on a received DCI.

In one or more embodiments, a WTRU configured with type 2 frame structure (i.e. TDD) may determine that a subframe may be used for discovery as a function of the SFN and as a function of the TDD configuration. For example, a monitoring WTRU may determine that it may receive a discovery signal in a subframe adjacent (e.g., the subframe immediately before) a special subframe in the radio frame according to the SFN function. In some embodiments, this may occur perhaps only if scheduled in a previous subframe according to timing relationship applicable to the concerned TDD configuration. Possibly, the discovery subframe may be either the first occurrence (e.g., subframe 0) of the special subframe in the concerned radio frame, the second occurrence (e.g., subframe 5) (if applicable for the TDD configuration), or both (if applicable for the TDD configuration). This may minimize the amount of DL to UL switching due to D2D communications, as well as to minimize scheduling gaps thereof for LTE TDD transmission.

One or more embodiments contemplate one or more control signaling formats. To support scheduling of device-to-device transmissions, one or more new DCI formats are contemplated. The new (e.g., heretofore undefined for such purpose) DCI format may be designed to carry one or more of the above parameters. For example, the new DCI format may carry discovery signal physical characteristics information, discovery identity and/or physical radio resources information for transmission and/or reception of a discovery signal. In one example, since the scheduling information may be received by a plurality of WTRUs on a shared channel, the scheduling information may not carry an explicit indication of whether or not the WTRU should be transmitting or receiving the discovery signal. Rather, each WTRU may be pre-configured for its operation mode. The scheduling information may be received and dedicated to a WTRU in which case the DCI may contain an explicit indication of whether the scheduling is for reception or transmission purposes.

In some embodiments, a DCI that schedules a device-to-device transmission (such as a discovery signal) may in addition to scheduling information have at least one of the following functionality, possibly one for one or more, or each, discovery process and possibly for multiple processes at once: Activation/deactivation of a discovery process (and/or part of a discovery process such as discovery payload); Association, re-association or de-association (e.g., termination) between a discovery process and an identity; and/or Association, re-association or de-association (e.g., termination) between a service discovery identity and a RF discovery identity; Such DCI may be received by one (e.g., if scrambled by C-RNTI) or a plurality of WTRUs (e.g., if scrambled by D-RNTI in a common search space).

One or more embodiments contemplate one or more timing of discovery signal transmission. Discovery signal transmission timing as a function of applicable control signaling reception Such (possibly discovery signal-specific) DCI may additionally include timing information, either relative to the reception of the DCI, relative to the current period, an absolute value (e.g., a SFN/subframe number) or indicating an upcoming subframe configured for discovery. Possibly, such DCI schedules (in some embodiments perhaps always) the next discovery signal opportunity (as per discovery signal configuration) no earlier than n+x where n is the subframe during which the WTRU received the DCI and x may be a fixed offset (e.g., 4 ms) or signaled in the DCI itself. Possibly, such DCI may schedule a plurality of subframes at once (e.g., multi-subframe scheduling). Possibly, a DCI may include scheduling information for a plurality of discovery signal transmission, possibly indexed using an identity e.g., a RF identity.

In some embodiments, the discovery signal may span a plurality of subframes. In such cases the WTRU may be configured to apply the discovery scheduling information for the entire duration of the discovery signal. Such aspects may be indicated as part of the control information that may schedule the transmission (e.g., inside the DCI, as a function of the search space of the DCI, or as a function of the RNTI).

One or more embodiments contemplate a discovery signal transmission timing as a function of D-RNTI. In some embodiments, the WTRU may be configured to determine the discovery signal scheduling time implicitly based on an identity, for example the D-RNTI. The D-RNTI may be specific to a discovery process. The WTRU may determine a set of subframe(s) to transmit/monitor for the discovery signal by applying the D-RNTI and perhaps other configured parameters such as a cycle length, a subframe offset, etc., to a specific function (e.g., such as would be defined in standards specifications).

For instance, the WTRU may be configured to transmit/monitor for the discovery signal for the subframe s satisfying:

$$[SFN*10+\text{subframe number}]\text{modulo}(N_{d\text{-}cycle})=(\text{D-RNTI})\text{modulo}(N_{d\text{-}cycle})+D_{offset} \quad (2)$$

where $N_{d\text{-}cycle}$ is the discovery signal cycle length and $D_{offset}$ is the discovery signal offset (in one practical example, $D_{offset}$ is not used and may be take value 0). One or both discovery signal cycles and/or discovery signal offset may be configured semi-statically via higher layers.

Similarly, the aforementioned techniques may be applied but as a function of the search space in which the DCI is received, as a function of an identity (e.g., a RF discovery identity), or as a function of the first CCE of the DCI. For example, the WTRU may successfully decode a DCI in subframe n, identify the first CCE of the concerned DCI, and transmit in subframe n+k where k may be a function of the CCE, e.g., based on a table and/or a configuration. The resource index for the transmission of the signal may be a function of the above.

One or more embodiments techniques to determine RF discovery identity for discovery signal transmission. In one or more embodiments, perhaps when a WTRU successfully decodes a DCI on PDCCH which may be applicable to discovery signal, the WTRU may determine the RF discovery identity corresponding to the discovery signal transmission as a function of the first Channel Control Element (CCE) of the concerned DCI. Possibly, the concerned identity may be an index to a physical resource for the concerned transmission. Possibly, the identity may be derived based on, or also in combination with, the RNTI or an index to an RNTI corresponding to the DCI (e.g., an RNTI used to mask the CRC of that DCI) (for example, in case the WTRU blindly decodes using a plurality of RNTIs). Similarly, the above method may be applied as a function of the search space in which the DCI is received or its corresponding RNTI.

In some embodiments, the WTRU may determine the RF discovery identity corresponding to the discovery signal transmission as a function of a characteristic of the received discovery signal (e.g., the scrambling applied to the discovery signal transmission itself) (e.g., blind detection based on discovery signal reception).

In some embodiments, the WTRU may determine the RF discovery identity corresponding to the discovery signal transmission as a function of the payload in the DCI that schedules the discovery signal transmission itself (e.g., the identity or an index thereof may be explicitly signaled).

In some embodiments, the WTRU may determine the RF discovery identity corresponding to the discovery signal transmission as a function of the payload in the DCI that may activate a resource for a discovery signal transmission (e.g., the control signaling may toggle an activation state for a configured discovery signal occasion and signaling explicitly the identity associated to the concerned resource).

One or more embodiments contemplate one or more techniques for semi-persistent scheduling of discovery signal. The WTRU may be configured to acquire further control signaling information by dynamic scheduling in the applicable subframe(s). For example, the WTRU may receive further control signaling in a DCI received on PDCCH and CRC scrambled by D-RNTI and/or SPS-D-RNTI, or in discovery signal-specific DCI format(s) received on PDCCH and CRC scrambled by C-RNTI.

Possibly, the WTRU may subsequently receive an activation command for the corresponding resource(s), similar to semi-persistent scheduling of PD2DCH resources. The WTRU may determine that the received control signal is an activation command for example based on information contained in the DCI (e.g., a 1-bit indication), based on the RNTI (e.g., SPS-D-RNTI) used for decoding, based on the subframe of the reception, or based on the search space on which the WTRU received the control signaling.

Similarly, a WTRU may also receive a deactivation command by similar methods as for the activation command. The WTRU may also release the resources following one or more event trigger such as at least one of:

deactivation of the resource applicable to the device-to-device communication;

detection of loss of proximity;

completion of discovery signal transmissions;

expiration of the resources (e.g., timer-based implicit deactivation);

loss of valid timing e.g., expiry of Time Alignment Timer (TAT) corresponding to the serving cell of the RRC connection; and/or a mobility event with the network or a radio link failure with the network or RLF on the D2D link).

Such activation/deactivation command may be received on PDCCH, either scrambled by C-RNTI (in case of dedicated scheduling) or by D-RNTI.

In some embodiments, the configuration may also include a semi-static resource allocation applicable to a group of WTRUs. For example, the further control signaling information may be received on system information broadcast, e.g., in case of static semi-persistent resource allocation. For example, the WTRU may subsequently receive an activation command for the corresponding resource(s), similar to semi-persistent scheduling of resources for the discovery signal. Similarly, the WTRU may also receive a deactivation command. Such command may be received on a DCI on PDCCH scrambled e.g., by D-RNTI or SPS-D-RNTI (e.g., in the case of discovery scheduling to multiple WTRUs) or by C-RNTI (e.g., for dedicated and/or selective discovery scheduling).

Arbitration and/or allocation of resources may be distributed between participating WTRUs or controlled by one of the WTRUs participating in the discovery process.

In some embodiments, the transmitting WTRU may be configured, perhaps after reception of an activation command, among other scenarios, to start transmitting the discovery signal according to the configured semi-persistent resources and/or parameters configured. In some embodiments, perhaps upon reception of a deactivation command, among other scenarios, the transmitting WTRU may be configured to halt transmission of the discovery signal. In some embodiments, similar configurations may also apply to the receiving WTRU, perhaps except that the receiving WTRU may be configured to monitor for the discovery signal (and might not be configured to transmit it). For example, the WTRU may be configured to transmit/monitor for the discovery signal for the subframe s satisfying equation (2) above.

One or more embodiments contemplate methods to receive parameters associated to a discovery signal transmission. The WTRU may optionally be configured with additional scheduling information or may be configured to receive further control scheduling information which may include one or more of the following, for example: a set of Physical Resource Blocks (PRBs), a Modulation and Coding Scheme (MCS), power control adjustments (TPC), a symbol duration (e.g., in case of a signal that spans over one or more symbols), or the like which the WTRU may use to determine the resource allocation for discovery signal transmissions.

The discovery signal configuration may additionally include characteristics of the signal e.g., pseudo-random sequence generator seed or root for the discovery signal, index to a scrambling sequence, synchronization index, code initialization parameter, signal format (e.g., whether or not there is a payload), Zadoff-Chu root and/or cyclic shift, or the like.

One or more embodiments contemplate WTRU actions upon reception of control signaling applicable to PD2DCH.

Some embodiments contemplate Shared discovery signal scheduling may be interpreted as function of monitoring/discoverable WTRU.

A WTRU may interpret discovery signal scheduling information as a function of its discovery procedure and/or role. For example, a monitoring WTRU may determine that the scheduling is for reception of a discovery signal and may further attempt detection of the discovery signal, perhaps using the appropriate parameters. Similarly, a discoverable WTRU may determine that the scheduling information is for transmission of a discovery signal and may further transmit the discovery signal using the appropriate parameters.

Interpreting the scheduling information may have a configuration aspect. For example, the WTRU may be configured by RRC signaling, or possibly dynamically for instance by means of a MAC Control Element (CE), by means of a DCI, by means of what RNTI is used to successfully decode the concerned DCI, such that it explicitly indicates the mode, e.g., one of transmission or reception. Such mean include an explicit indication bit in the scheduling information (e.g., in the message or an information bit in the DCI).

One or more embodiments contemplate feedback for discovery signal scheduling. A WTRU may transmit uplink HARQ feedback to the network, perhaps when it may successfully receive scheduling information applicable to discovery signal in subframe n. In one example, the WTRU may transmit HARQ feedback in subframe n+4 using a PUCCH resource that in some embodiments may be derived according to one or more legacy methods (e.g., based on the first CCE of the DCI, and/or based on the WTRU's PUCCH configuration).

One or more embodiments contemplate an Acknowledgement of discovery signal scheduling—Discoverable WTRU. In some embodiments, a WTRU (e.g., a discoverable WTRU) that receives scheduling information, e.g., in subframe n applicable for a discovery signal transmission may transmit HARQ ACK for the concerned DCI, for example on PUCCH, e.g., in subframe n+4 (or more generally, after a pre-determined delay).

In some embodiments, a WTRU (e.g., a discoverable WTRU) that receives control scheduling activating a configured resource applicable for discovery signal transmission(s) may transmit HARQ ACK for the concerned DCI on PUCCH. In some embodiments, perhaps only a discoverable WTRU may transmit the HARQ feedback (ACK/NACK), e.g., a WTRU that may transmit on the concerned resource.

In some embodiments, a WTRU (e.g., a discoverable WTRU) that receives control scheduling that deactivates a configured resource applicable for discovery signal transmission(s) may transmit HARQ ACK for the concerned DCI on PUCCH. In some embodiments, perhaps only a discoverable WTRU may transmit the HARQ feedback (ACK/NACK), e.g., a WTRU may previously have transmitted on the concerned resource.

In some embodiments, a WTRU (e.g., a monitoring WTRU) that receives control information applicable for the reception of a discovery signal transmission may not transmit any HARQ feedback for the concerned control information. Possibly, a monitoring WTRU may not transmit any HARQ feedback, e.g., a WTRU that may not transmit on the concerned resource but that may receive a transmission on it.

One or more embodiments contemplate an acknowledgement of discovery signal scheduling—where a monitoring WTRU may indicate RF proximity or not. In some embodiments, a WTRU (e.g., a monitoring WTRU) that receives control information applicable for the reception of a discovery signal transmission may transmit any HARQ feedback for the concerned transmission in a subframe subsequent to the subframe of the scheduled transmission (e.g., n+4 where n is the subframe of the discovery signal transmission). In some embodiments, this may be applied for the cases (and in some embodiments perhaps only such cases) where the scheduling information may be received using a dedicated method (C-RNTI, RRC configuration, etc.). For example, if the WTRU determines that the discovery signal reception is successful (e.g., the WTRU determines that it is in proximity), perhaps according to some pre-defined criteria, it may transmit HARQ ACK on a PUCCH resource in the concerned subframe using a resource derived implicitly based on the first CCE of the corresponding DCI, as a function of the RNTI of the corresponding DCI, or based on the search space (if multiple search space may be configured, e.g., one for each discovery signal or RF identity). In some embodiments, the WTRU may transmit HARQ NACK if it determines that the discovery signal reception is unsuccessful.

Embodiments contemplate one or more techniques for associated payload scheduling transmission and reception. In one or more embodiments, the WTRU may be configured to transmit (and/or receive) a payload associated to a discovery signal. More specifically, the WTRU may be configured with a discovery process for which a payload is configured. In some embodiments, the WTRU may be configured with a discovery signal format which includes discovery sequence and/or payload. The WTRU may then transmit the payload along the discovery sequence in a single discovery signal (e.g., as described herein).

In some embodiments, the payload and/or the discovery sequence might not be transmitted in the same discovery signal format. For example, the WTRU may transmit the payload independently of the discovery sequence, for example at a difference time instant (e.g., subframe) and/or over different resource blocks. In such scenarios, the monitoring WTRU may be configured to attempt decoding of the discovery payload after having first successfully detected the associated discovery sequence.

Embodiments contemplate one or more techniques to determine when to transmit payload. One or more embodiments contemplate techniques for the WTRU to determine when to transmit a discovery payload. One or more of the contemplated techniques may also be applicable for the monitoring WTRU, for example to determine when to monitor for a discovery payload.

Some embodiments contemplate an independent set of parameters. The WTRU may be configured to transmit the discovery payload, for instance according to one or more of the methods described herein for discovery signal transmission. More specifically, the WTRU may be configured with a separate set of independent parameters for the transmission of the discovery payload (e.g., independent or partially independent from the discovery sequence). For example, the WTRU may be configured to transmit the discovery payload periodically, using a different set of resources as the discovery sequence transmission. For one example, the WTRU may be configured with a lower duty cycle for the discovery payload transmission than for the discovery sequence transmission.

Some embodiments contemplate techniques that may be based on a dynamic indication. The WTRU may be configured to determine whether or not to transmit a discovery payload by receiving the information explicitly from a downlink control channel (e.g., PDCCH) sent from the eNB. Similar to what is described herein for a general discovery signal, the WTRU may also be further configured to monitor the PDCCH for a special D2D-Payload-RNTI (DP-RNTI), for example during the subframes allowed for D2D communications. In some embodiments, the WTRU may be configured to monitor the PDCCH for the D-RNTI associated to the discovery process, and may determine whether or not to transmit the associated payload based on the DCI, for example: Based on the DCI format: the WTRU may determine the DCI format blindly and may determine whether the DCI indicates a payload transmission or a discovery sequence transmission; and/or Based on the explicit content of the decoded DCI: the WTRU may decode the D2D DCI and may determine the value of a specific field in the control data, indicating explicitly transmission of a payload.

Some embodiments contemplate techniques based on a periodic ratio. In some embodiments to determine when to transmit the discovery payload, the WTRU may be configured for example with a discovery payload transmission ratio. This ratio (e.g.: Nd:p) may indicate for instance the ratio of number of discovery sequence transmission to the number of discovery payload transmission. The WTRU may then transmit one discovery payload for one or more, or every, Nd:p discovery signal transmission. For example, the WTRU may be configured to transmit the discovery payload in the same physical resource as the discovery sequence. For example, the WTRU may be configured to transmit the discovery payload at the same time (e.g., same subframe) as the discovery sequence but on a different set of physical resources.

Perhaps for the monitoring WTRU to determine when the discovery payload is transmitted, among other scenarios, the cycle may be synchronized at both the transmitter and the receiver to a common reference clock. In one example, the WTRU (transmitting or monitoring) may be configured to use the system frame number (SFN) to determine the start of the discovery payload transmission cycle. For example, the WTRU may be configured to determine the start of the discovery transmission cycle by using a modulo operation on the SFN, for example using additional parameters such as the discovery payload transmission cycle length (e.g., Np-cycle) (e.g., in terms of subframe), the associated D-RNTI or DP-RNTI and/or other potential configured parameters. In one example, the WTRU may determine the subframe for which a discovery payload transmission may be scheduled based on the period discovery subframe configuration in equation (2) and a parameter indicative of the discovery payload cycle relative to the discovery sequence cycle (Np-cycle in the following example):

$$[SFN*10+\text{subframe number}] \bmod (Nd\text{-cycle} \times Np\text{-cycle}) = (D\text{-RNTI}) \bmod (Nd\text{-cycle} \times Np\text{-cycle}) + Dd\text{-offset} \quad (3)$$

In another approach to allow the monitoring WTRU to determine the beginning of the cycle for the discovery payload transmission, the transmitting WTRU may be configured to indicate a count explicitly as part of the discovery sequence. In some embodiments, the WTRU may be configured to append a pre-defined number of count bits to the discovery sequence. A monitoring WTRU may then detect the count bits during the discovery process and may determine the beginning of the cycle for the discovery payload transmission and/or the time for the next transmission of the discovery payload. In some embodiments, the transmitting WTRU may be configured to select one of multiple discovery sequences to indicate a count. In such scenarios, the relationship between the count and the actual discovery sequence may be pre-defined, for example explicitly in the specifications and/or via a relation with the discovery sequence parameters (e.g., with the ZC root, cycle shift in the case of a Zadoff-Chu sequence). The WTRU may be configured to transmit/receive a discovery payload, for example when the count may reach a specific value and/or a specific time after the count has reached a specific value, for example zero.

One or more embodiments contemplate techniques to determine payload transmission parameters. In some embodiments, the WTRU may be configured to transmit the payload over a pre-defined set of resources. More particularly, the WTRU may be configured with a fixed set of PRBs, symbol in the subframe, MCS, and/or payload size. The WTRU may then transmit at the payload at the appropriate time according to one or more of the techniques described herein.

In some embodiments, the WTRU may be configured to determine the payload physical resources for transmission based on the associated discovery sequence physical resources. For example, the WTRU may be configured to transmit the payload over the same set of PRBs as the discovery sequence, but on a different (e.g., preconfigured) OFDM symbol of the subframe. For example, the WTRU may be configured to transmit the payload over the same set of resources (OFDM symbol(s) and PRBs) as the discovery sequence, potentially replacing the discovery sequence transmission. In yet another example, the WTRU may be configured with a resource offset that it may apply to the discovery sequence physical resource index to determine the associated discovery payload resource index. In some embodiments, this offset may fixed and configured via RRC signaling. For example, this offset may depend on time parameters such as the SFN and subframe number, and potentially other parameters such as the D-RNTI for example to randomize the resource among one or more, or all, WTRUs.

In some embodiments, the WTRU may be configured with dynamic payload transmission parameters, for example indicated on the PDCCH on a new (e.g., contemplated) DCI format. The contemplated DCI format may for example indicate the radio resources associated to the payload and/or the payload format (e.g., size of the payload, MCS, etc).

One or more embodiments contemplate techniques associated to discovery payload reception. The WTRU may be configured to receive a discovery payload according to one or more of the techniques described herein.

The WTRU may be configured to first detect a discovery sequence and then determine whether or not to attempt decoding the associated discovery payload. More specifically, the WTRU may be configured to determine to decode the associated discovery payload when one or more of the following conditions are met (in any order or combination): the discovery sequence detected may correspond to a discovery signal configured with a payload; the discovery sequence detected may be associated to a service or service class requiring detection of the associated payload: the WTRU may be configured with a list of discovery signals and associated service class. The WTRU may determine the service class associated to a discovery sequence, for instance by looking up in its configuration; and/or the WTRU may also be configured to determine the service class associated to a discovery sequence based on the property of the detected sequence (e.g., ZC root, cyclic shift, etc) and a pre-defined associated carried out via configuration; the content of the discovery payload associated to the detected discovery sequence may not have been decoded by the WTRU (e.g., may never have been decoded); the content of the discovery payload associated to the detected discovery sequence may not have been read in the last Tpayload_expiry seconds (or other unit of time); the content of the discovery payload associated to the detected discovery sequence may have expired. More specifically, the WTRU may be configured with one or more timer values associated to specific discovery signal and/or discovery signal class. The WTRU may be configured to start the timer when the payload associated to a discovery signal may be read and may perform one or more of the following when the timer expires: erase the content of the payload from the WTRU memory, and/or request the lower layers to re-acquire the payload.

The timer value (e.g., Tpayload_expiry) or other parameters may be configured for a service class to which a discovery signal may belong. In some embodiments, one or more, or each, discovery signal may be configured with a specific value of the timer, where as a special case 0 could indicate that the payload may be read one or more, or every, time and an infinite value could indicate that the payload information may be read once (e.g., only once) and may be maintained in the WTRU memory.

The WTRU may be configured to flush from the payload buffer the content of the payload it may have read from one or more of the discovery signal, perhaps when one or more of the following conditions may be met (in any order or combination): the WTRU may be indicated by the network to flush the payload buffer explicitly via RRC signaling or L1/L2 (e.g., MAC control element); the WTRU may move to E-UTRA RRC Idle mode; the WTRU may change cell; and/or the WTRU may change discovery area.

Embodiments contemplate one or signal structures for payload transmission. The WTRU may transmit and/or receive discovery payload, or any other type of information for the purpose of device-to-device communication, among other reasons, according to one of the already defined uplink or downlink physical channels. For instance, the payload may be processed in the same way as the PUSCH, the PUCCH, and/or the PDSCH physical channel.

The WTRU may also transmit (and/or receive) the payload according to a modified physical channel processing compared to existing channels, perhaps to ease implementation of the transmitter or at the receiver. For instance, the WTRU could transmit the payload according to the same processing as for PUSCH, but the step of "transform precoding" may be modified such that no DFT operation may take place on modulated symbols prior to their application to the input of the OFDM modulator, for one or more, or all SC-FDMA symbols. For instance, such modification may be applied for SC-FDMA symbols carrying information (e.g., perhaps only for such symbols and/or not reference signals). In such scenarios, no equalization may be required at the receiver, perhaps simplifying the processing at the WTRU receiver.

One or more embodiments contemplate one or more sequential discovery procedures in a given resource based on activation/deactivation. For example, a WTRU may receive a configuration on the broadcasted system information, e.g., in a SIB specific to D2D Discovery configuration. The configuration may include: A timing for a resource allocation for discovery signal, periodic and fixed in time. For example, the periodicity of the resource may be e.g., DCycle=100 ms with offset DOffset and the subframe number may then be given by [SFN*10+subframe number] modulo (DCycle)=DOffset). For example, the cycle DCycle may be signaled to be 10, such that the cycle may be exactly one frame long; In the corresponding radio frame, e.g., subframe #5 (corresponding to DCycle=5 for instance) may be a discovery signal occasion (as possibly also indicated in the configuration e.g., by a bitmap, or specified/known by the WTRU); The applicable PRB(s), or resource index (e.g., depending on the type of signal), for the resource allocation for discovery signal in the corresponding subframe; A SPS-D-RNTI with parameters to derive scheduling occasion(s) for discovery signal. A DCI scrambled with SPS-D-RNTI may subsequently be used for the activation/deactivation of the resource. For example, the periodicity of the resource may be e.g., DCycle=100 ms with offset DOffset and the subframe number may then be given by [SFN*10+subframe number] modulo (DCycle)=DOffset). In one practical example, the cycle DCycle may be signaled to be 10, such that the cycle is exactly one frame long; and/or In the corresponding radio frame, e.g., subframe #5 (corresponding to DCycle=5 for instance) may be a discovery signal occasion (as possibly also indicated in the configuration, e.g., by a bitmap, and/or specified/known by the WTRU).

In some embodiments, the resource allocated for discovery signal may correspond to a MBSFN subframe, e.g., same resource may be used across multiple cells (e.g., in a discovery area) and occurring at the same time. This may enable RF discovery across cell boundaries in a coordinated manner.

In some embodiments, a WTRU may have acquired the discovery signal configuration. The WTRU may move to a discoverable state (possibly triggered by an application in the WTRU, through an API), and may request the broadcast of an identity to the network, for example by transmitting a RRC message that requests RF discovery resources for a given discovery identity. In some embodiments, the discoverable WTRU may receive a confirmation of the request by RRC signaling. The discoverable WTRU may decode PDCCH for SPS-D-RNTI in a subframe indicated by the configuration.

Other WTRUs that may have acquired the discovery signal configuration may have the discovery function enabled (e.g., possibly triggered by an application in the WTRU, through an API). Such monitoring WTRUs may decode PDCCH for SPS-D-RNTI in a subframe indicated by the configuration. A WTRU that may successfully decode a DCI PDCCH scrambled by SPS-D-RNTI, which DCI may indicate the activation of a resource for a concerned identity, may determine further actions as a function of whether the WTRU is a monitoring WTRU or a discoverable WTRU.

The discoverable WTRU may determines that the identity indicated in the DCI may correspond to the identity it sent in the discovery request. The discoverable WTRU may transmit a HARQ ACK in subframe n+4 upon reception of the activation command in subframe n. The discoverable WTRU may transmit a discovery signal in the discovery signal resource and/or in the subframe(s) indicated by the discovery signal configuration, perhaps in some embodiment, for a limited time and/or until the next discovery signal scheduling occasion.

The monitoring WTRU(s) may determine that the identity indicated in the DCI may correspond to the identity it is interested in. If so, the monitoring WTRU(s) may try to decode any transmission of a discovery signal in the discovery signal resource and/or in the subframe(s) indicated by the discovery signal configuration. Otherwise, the WTRU(s) may decode the next discovery signal scheduling occasion.

Perhaps if the monitoring WTRU may determine that it has detected a discovery signal, it may perform further actions, e.g., report to the network, initiate a discovery procedure, etc.

In the next discovery signal scheduling occasion, WTRUs that monitor the PDCCH for SPS-D-RNTI may decode a DCI indicating the activation of the configured resource, for either the same identity (the RF discovery is given a longer time to complete) or for a different identity (a new discovery procedure is started in which case the previous procedure is terminated). In some embodiments, a DCI indicating deactivation of the resource for the current procedure may be received, which also may terminate the procedure. In some embodiments, the validity of the activation may expire following a certain amount of time.

One or more embodiments contemplate a sequential discovery procedures in a given resource based on solicited transmission requests. A WTRU may receive a configuration on the broadcasted system information, e.g., in a SIB specific to D2D Discovery configuration. The configuration may include: A timing for a resource allocation for discovery signal, periodic and/or fixed in time. For example, the periodicity of the resource may be e.g., DCycle=320 ms with offset DOffset and the subframe number may then be given by [SFN*10+subframe number] modulo DCycle=DOffset; In the corresponding radio frame, e.g., subframe #5 (corresponding to DCycle=5 for instance) there may be a discovery signal transmission opportunity (as possibly also indicated in the configuration e.g., by a bitmap, or index specified/known to the WTRU); The applicable PRB(s), or resource index (depending on the type of signal), for the resource allocation for discovery signal in the corresponding subframe; and/or The DCI Format(s) monitored by a WTRU that may carry a Discovery signal transmission request. For example, the Discovery signal transmission request may correspond to a N=1, 2, . . . bit long field signaled as part of the DCI Format. Or, the Discovery signal transmission request may be encoded as a set of 1 or more well-defined codepoint(s) as part of the information signaled through the DCI Format(s) to the WTRU. Or, the Discovery signal transmission request may correspond to a special RNTI, e.g., D-RNTI when the DCI Format may be decoded by the WTRU.

In some embodiments, a WTRU may have acquired the discovery signal configuration. The WTRU may move to a discoverable state (e.g., possibly triggered by an application in the WTRU, through an API), and may request the broadcast of an identity to the network, for example by transmitting a RRC message that requests RF discovery resources for a given discovery identity. In some embodiments, the discoverable WTRU may receive a confirmation of the request by RRC signaling.

The discoverable WTRU may decode PDCCH for occurrences of DCI's that carry, represent or otherwise encode information corresponding to a Discovery signal transmission request in a subframe indicated by the configuration.

Other WTRUs that may have acquired the discovery signal configuration may have the discovery function enabled (e.g., possibly triggered by an application in the WTRU, through an API). Such monitoring WTRUs may decode PDCCH in subframe(s) indicated by the configuration.

A WTRU that successfully decodes a DCI that carries, represents or otherwise encodes information corresponding to a Discovery signal transmission request may determine further actions as a function of whether the WTRU is a monitoring WTRU or a discoverable WTRU.

The discoverable WTRU may transmit a HARQ ACK in subframe n+4 upon reception of the DCI carrying the Discovery signal transmission request in subframe n.

The discoverable WTRU may transmit a discovery signal in the discovery signal resource and in the subframe(s) indicated by the discovery signal configuration. In some embodiments, it may transmit the discovery signal once (perhaps only once), perhaps for a limited number of times (perhaps only for a limited number of times) and/or as a function of the DL subframe where the request was received when compared to the next occurring or allowed discovery signal scheduling occasion(s).

The monitoring WTRU(s) may determine that the identity indicated in the DCI may correspond to the identity it is interested in. If so, the monitoring WTRU(s) may try to decode any transmission of a discovery signal in the discovery signal resource and/or in the subframe(s) indicated by the discovery signal configuration. In some embodiments, the WTRU(s) may decode the next discovery signal scheduling occasion.

Perhaps If the monitoring WTRU determines that it has detected a discovery signal, it may perform further actions, e.g., report to the network, initiate a discovery procedure, etc.

Embodiments contemplate that by using one or more contemplated techniques as described herein, discovery signal(s) and discovery procedures may be efficiently multiplexed even in the presence of many devices, and/or used transmission resources at a cell or a system level may be staggered in time, and/or low overhead may be maintained.

One or more embodiments contemplate that by using the techniques described herein, the network may schedule other transmissions in the concerned resource(s), perhaps if discovery resources may not be activated or in use according to network implementation behavior.

One or more embodiments contemplate techniques for discovery signal transmission and reception. Embodiments recognize that at a high-level, the discovery procedure may involve the transmission of a discovery signal by a first device with the objective of being detected by a second device. The discovery signal may be used for a number of purposes, including synchronization, power measurement, identification, and/or potentially to carry payload information.

In one or more embodiments, the discovery signal may be carried on a special channel, the Physical Device-to-Device Channel (PD2DCH). The signal may be mapped directly to physical resources, similar to sounding reference signals, for instance. The techniques described herein may be applicable to both cases where the discovery signal may be carried over the PD2DCH or directly mapped to physical resources. In some embodiments it may be assumed that the transmit/receive WTRU may have been configured to use the proper physical resources.

Embodiments contemplate one or more signal structures. The discovery signal may comprise of a number of parts, one or more, or each, may be targeted at fulfilling a specific purpose. The following parts may be included in a discovery signal, in any order or combination:

Guard time
Synchronization part
Discovery sequence
Payload
Reference symbols

Figure 2:
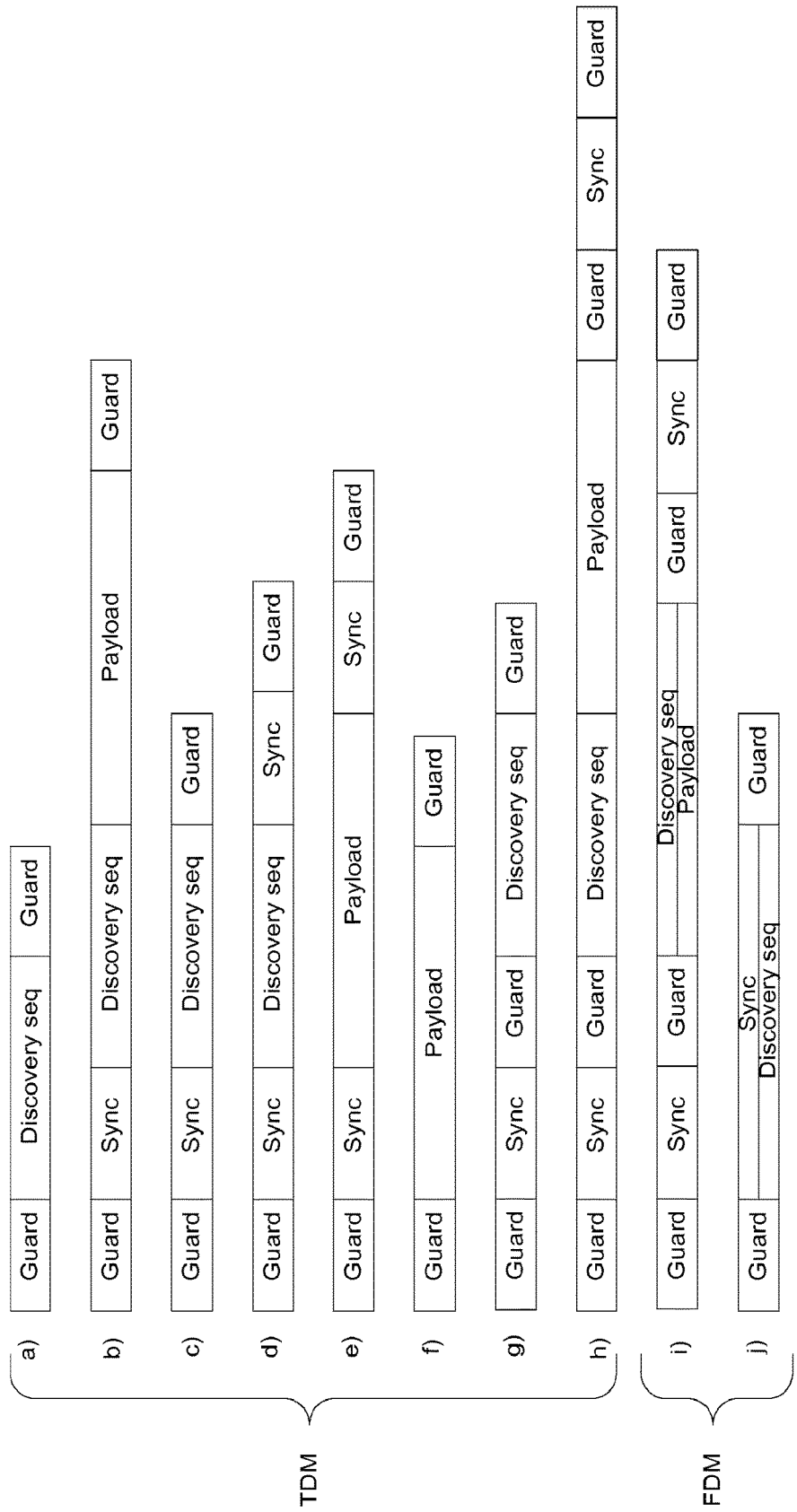
FIG. 2 illustrates conceptual example combinations of discovery signal parts (with TDM, FDM and combinations of TDM and FDM).

In some embodiments, the guard time may or may not be considered part of the discovery signal. In some embodiments, the reference symbols may or may not be considered parts of the non-Guard parts. In some embodiments, reference symbols may be present in the synchronization, discovery sequence and/or payload parts. Different techniques may include various combinations of the aforementioned parts. FIG. 2 shows a list of example possible conceptual combinations forming a discovery signal. For example combination (a) comprises two guard parts and a discovery sequence part.

In some embodiments, the term "discovery sequence" may be used to describe a particular sequence of symbols that may be used for discovery. This term may be used interchangeably with "discovery signal" as used herein, including where reference to a discovery signal may or may not include the discovery sequence and in some embodiments the synchronization, payload and/or guard time.

In some embodiments, one or more combinations of discovery signal parts (e.g., discovery signal format) may be supported and/or configured. For example, the WTRU may be configured to support a number of discovery signal formats for discovery operations under network coverage and/or another set of discovery signal formats for operations under no network coverage. In another example, the WTRU may be configured with discovery signal formats with discovery sequence and/or payload, with discovery sequence but without payload, or with payload without a discover sequence.

In some embodiments, the guard part (or guard period, or equivalently guard time) may provide sufficient time for the WTRU to reconfigure its radio for discovery signal reception/transmission, to avoid overlap with other signals and/or to provide sufficient time for signal propagation. In some embodiments, the guard times may not be considered part of the discovery signal as during these guard time there may be no actual signal transmission.

In some embodiments, the guard part may be to separate in time from other parts of the discovery signal. In such examples, the WTRU may use a guard time to separate the synchronization code part from the other parts (e.g., see FIG. 2 g)-i)). This approach may, for example, reduce the buffer size requirement at the WTRU, and/or to allow time for configuring the WTRU for monitoring the discovery sequence and/or payload after detection of a synchronization code signal (or discovery signal in the case where there may be a guard between the discovery sequence and the payload).

One or more embodiments contemplate a synchronization code. In LTE networks, the devices may be synchronized on the uplink in such a way as to align (e.g., as much as possible) the UL OFDM symbols and/or subframes at the receiving eNB. This synchronization may be useful in keeping OFDM demodulation efficient and in reducing the overhead associated to transmission of the cyclic prefix (CP). To maintain the synchronization, the eNB may issue timing advance (TA) commands to one or more, or each, WTRU connected to it. The value of the TA may depend on the WTRU distance to the cell, or more specifically the RF propagation time. While the WTRUs in the same cell may be synchronized at the eNB, there may be no timing advance for the radio link between WTRUs and thus due to TA and propagation delays the WTRU receiving the discovery signal may require additional reference symbols to acquire the discovery signal synchronization.

In the presence of a network infrastructure, the WTRU may be synchronized to the network and thus the synchronization search window may be smaller than the case where there may be no network infrastructure present. In some embodiments it may be useful to provide for a relatively fast synchronization of the discovery signal to improve the detection process.

The discovery signal may contain a special synchronization code. This synchronization code may be used for example by the Monitoring WTRU to accelerate and/or simplify the synchronization process. Another use for the WTRU receiving the signal may be that the search window may be reduced which as a result may simplify the detection and also may reduce battery consumption.

In some embodiments for including a synchronization code in a discovery signal, the WTRU may transmit one or more separate synchronization code separately (on an independent OFDM symbol) from the other discovery signal parts (e.g., discovery sequence, payload). The WTRU may be configured to transmit a synchronization code during an OFDM symbol carrying a synchronization code, and in some embodiments only during such OFDM symbols (e.g., transmission of other signals or information on a different set of RB).

In some embodiments for including a synchronization code in a discovery signal, the WTRU may be configured to multiplex the synchronization code with other control or data information within a given OFDM symbol. In this example solution, the WTRU may be configured, for instance, to transmit the synchronization code on a specific subset of RBs and the other control or data information on a separate (potentially adjacent) subset of RBs. This concept is illustrated in FIG. 2 j), for example.

The synchronization code may be generated by the WTRU from one or more pre-defined sequence (e.g., explicit from the specifications); or using a parameterized sequence, for instance a Zadoff-Chu or pseudo-random sequence (e.g., m-sequence, or Gold sequence) generated using for instance a pseudo-random sequence generator.

The WTRU may be configured with the parameters to use for the synchronization code, for instance via RRC signaling or pre-configured in the WTRU. In some embodiments, one or more of the sequence parameter may be determined based on local WTRU parameters such as the WTRU identity, cell Identity or other known parameters. The WTRU receiving the sequence may be configured to blindly search for a synchronization code from a reduced set of synchronization codes, for instance.

The WTRU may be configured with a set of synchronization codes that may be shared by one or more, or multiple, WTRUs transmitting discovery signals. In some embodiments, the WTRU may receive the information on the set of synchronization codes via the SIBs. The WTRU may be further configured to choose a specific synchronization code among the set of configured values. The WTRU may, for example, perform a selection of a synchronization code at one or more, or every, discovery signal transmission. The WTRU may be configured to select a synchronization code using one or more of the following techniques, for example: in some embodiments for synchronization code selection, the WTRU may be configured to randomly choose one of the configured synchronization code(s); in some embodiments for synchronization code selection, the WTRU may be configured to choose a synchronization code based on a configured identity, for example the WTRU C-RNTI. More specifically, and using C-RNTI as an example, and perhaps assuming there are Nsync codes configured, the WTRU may select the synchronization code(s) with index sc_index=C-RNTI mod Nsync; in some embodiments, the WTRU may be configured to select the synchronization code(s) based on the identity of the cell it may be associated with (e.g., camped on in Idle mode, or connected to in connected mode). For example, the WTRU may be configured to select the synchronization code based on the physical-layer identity and/or physical-layer cell identity; and/or in some embodiments, the WTRU may select the synchronization code based on the discovery service associated to the discovery signal. One or more of these example techniques for selection of a synchronization code(s) may also apply to the selection of the discovery sequence(s).

One or more embodiments contemplate a discovery sequence. The discovery sequence may be used for the purpose of identification of the device and/or service, and/or for the receiving WTRU (or equivalently the monitoring WTRU) to measure its receive power to report either a proximity indication and/or a direct measurement to the network/application. In some embodiments, the discovery sequence may also be used for synchronization and/or channel estimation purposes.

In some embodiments, the discovery sequence may be derived from existing sequences such as the Zadoff-Chu, or pseudo-random (e.g., m-sequences, Gold sequences, etc.). In some embodiments, the WTRU may be configured to use a single bit/tone on a given resource element (RE) as a discovery sequence (in some embodiments the discovery sequence may no longer be a "sequence", however for simplicity of presentation the term "sequence" may be generalized to also include this single bit/tone approach). In some embodiments, a set of bit sequences may be defined explicitly in the specifications. In some embodiments, the discovery sequences may be indexed. The discovery sequence index may then be linked to the device or service identification via higher layer association. In one example, the discovery sequence may be designed with special considerations for robustness to frequency offsets. Embodiments recognize that the WTRUs may have a lower requirement on frequency offset than eNBs, which may make reception of the discovery signal more challenging.

In one example of indexing, in the case of the Zadoff-Chu sequence, the WTRU may be configured to index a set of Zadoff-Chu sequences based on a known rule linking for example a set of roots and cyclic shifts to a specific index. Similarly, pseudo-random sequences may be parameterized by a start time index and/or an initialization value(s) for the random generator(s). Similar concept may also apply for example to the single tone approach, where a rule associating available RE for discovery to an index may be defined.

The WTRU may be configured for the association from the specifications or via RRC signaling. In one example the WTRU may be configured via higher layers to use a subset of all discovery sequences defined (or perhaps only all discovery sequences defined). This subset may be determined for example by the network (e.g., eNB) based on the number of discovery signals needed for a specific service/geographical area.

The WTRU may be configured by the network to use a specific discovery sequence (e.g., via a dedicated configuration). The WTRU may be configured with a set of discovery sequences to be used, for example, via the SIBs and/or dedicated RRC signaling. The WTRU may be configured to select the discovery sequence for transmission using, for example, one or more of the approaches described herein for synchronization code selection.

The WTRU may be configured, for example, to select the discovery sequence(s) for transmission based on the selected synchronization code(s). In some embodiments, the WTRU may be configured to select the discovery sequence randomly from a subset of the configured set of discovery sequences to be used indexed by the synchronization code. More specifically, the WTRU may determine the subset of discovery sequence(s) from which to choose from based on the synchronization code(s). The WTRU may select, for example randomly, one or more discovery sequences to use for transmission from the determined subset of discovery sequences.

In some embodiments, the WTRU may be configured to choose a discovery sequence(s) based on a configured identity, for example, the WTRU C-RNTI. More specifically, and using C-RNTI as an example, assuming there are Ndisc discovery sequences configured, the WTRU may select the discovery sequence(a) to transmit with index ds_index=C-RNTI mod Ndisc.

In some embodiments, the design of the discovery sequence may depend on variety of factors. For example, if many discovery sequences at a time may be detected by a single WTRU it may be useful to choose a type of sequence that may be relatively easily generated at the local WTRU (e.g., pseudo-random sequences). On the other hand, it may be useful to keep the orthogonality between sequences low for improved detection performance. In such cases it might be useful to use a discovery sequence derived from constant amplitude zero autocorrelation (CAZAC) (e.g., Zadoff-Chu) sequences because of the favorable auto-correlation properties. Further, the length of the sequence may also depend to some extent on the expected range supported for discovery. Long range may require long sequences with appropriately long cyclic prefix to support propagation delays and channel delay spread. In some cases (e.g., Zadoff-Chu sequences), longer sequences may also allow to derive a higher number of orthogonal signals which may improve the scalability of the technique.

In some embodiments, the WTRU may be configured to transmit the discovery sequence using redundancy. Using redundancy for discovery sequence may extend the range of the discovery by using the same base discovery sequence, for example. In one example, the WTRU may be configured with a base discovery sequence and may be configured (e.g., via higher-layers or in a fixed way in the specifications) to transmit one or more repetitions of this base sequence. For example, the WTRU may be configured to repeat the base sequence using one or more of the following approaches:

Frequency domain redundancy. The WTRU may be configured to repeat the sequence in the frequency domain, that is, over a separate set of RBs;

Symbol-level redundancy. The WTRU may be configured to repeat the sequence in the time domain, for example using the same bandwidth but transmitted across different set of OFDM symbols.

Subframe-level redundancy. The WTRU may be configured to repeat the sequence in the time domain, for example using the same bandwidth but transmitted across different set of subframes.

The receiving WTRU may be configured to accumulate the energy across one or more, or all, repetition for improved detection.

One or more embodiments contemplate a discovery payload. The discovery signal may carry a discovery payload. The discovery payload may also be protected for integrity using conventional CRC. In addition, to protect against channel errors, the discovery payload may be encoded with using an encoding technique such as turbo coding, convolutional coding, block coding (e.g., Reed-Muller), or other form of coding.

One or more embodiments contemplate a discovery payload presence indication. The transmit WTRU may be configured to indicate the presence of a discovery payload in the discovery signal by using a special value of the discovery sequence or synchronization code. For example, the transmit WTRU may be configured to select a synchronization code from a pre-defined set of synchronization codes when also transmitting a discovery payload in the same discovery signal. The indication may occur in a previous discovery signal with pre-defined timing rules, perhaps to avoid ambiguity. The same concept may also be applied for the discovery sequence when the WTRU may indicate the presence of a discovery sequence. In some embodiments, the WTRU may transmit the payload at a pre-defined time instant after transmitting the discovery signal/sequence (in some embodiments, the payload may no longer be considered part of the discovery signal).

A discovery payload may be present in a subset of pre-defined or configured subframes (or perhaps only in such a subset). In such cases, the transmitting WTRU (or equivalently the discoverable WTRU) may be configured to transmit a discovery payload during these subframes (or perhaps only during these subframes).

The receiving WTRU may be configured to determine whether or not a discovery payload is present in a discovery signal. For example, using the synchronization code example described herein, the receiving WTRU may be configured to determine the presence of a discovery payload by determining the sequence code and whether or not it may belong to a subset indicating the presence of a discovery payload or not. In this example, the WTRU may attempt to detect one or more synchronization codes from different subsets and then determine (for example by using a threshold) the set of synchronization codes present and for one or more, or each, detected case whether or not the associated discovery signal carries a discovery payload. A similar approach when using the discovery sequence is also contemplated.

In some embodiments, the receiving WTRU may determine that a discovery payload may be present when detecting the discovery signal/sequence. The WTRU may be configured to attempt decoding a payload after a pre-defined time instant after detecting the discovery signal/sequence.

In some embodiments, the receiving WTRU may be configured to determine the potential presence of a discovery payload by determining whether or not the current subframe may allow for discovery payload transmission. In such subframes, the receiving WTRU may be configured to attempt decoding the discovery payload. In one alternate approach, the WTRU may try to determine the potential presence of a payload perhaps if the signal associated with that device is above a threshold.

The receiving WTRU may be configured to determine the integrity of the payload by using the CRC. In the case the CRC test passes, the WTRU may be configured to deliver the payload data to higher layers (which may include applications). The WTRU may be configured to indicate to the higher layers that no discovery payload was detected successfully in the event where the CRC does not pass.

One or more embodiments contemplate handling of discovery payload modulation, coding and retransmission. In one or more embodiments, the WTRU may be configured to transmit or receive with a fixed discovery payload size and/or an associated modulation and coding scheme. The configuration may be fixed in the specifications, or semi-static and received via higher layer signaling (e.g., RRC signaling).

In some embodiments, the WTRU may be configured to transmit or receive with a dynamic discovery payload size, and potentially different modulation and coding scheme. In one example the WTRU may be configured with one or more different discovery payload sizes (and associated modulation and coding schemes). The transmit WTRU may select the discovery payload size for example based on the amount of data received from higher layers to be carried by the discovery payload. In one example, the different discovery payload sizes and associated modulation and coding schemes may be indexed (e.g., discovery payload index) from a known table.

In some embodiments, the transmit WTRU may indicate the discovery payload index explicitly in a control part associated to the discovery payload (e.g., the control part may precede the discovery payload data part and not be encoded in the same way). The receiving WTRU may then determine the actual discovery payload size and its associated modulation and coding scheme by detecting the discovery payload control part.

In some embodiments, the receiving WTRU may perform a blind decoding on a limited set of possible payload sizes and/or modulations schemes.

In some embodiments, the transmit WTRU may be configured with an association between a discovery payload index and a synchronization code, discovery sequence, or both. The transmit WTRU may then be configured to select the synchronization code and/or discovery sequence based on the discovery payload index. The receiving WTRU may determine the discovery payload size and/or associated modulation and coding scheme by detecting the synchronization code and/or discovery sequence first.

The transmit WTRU may be configured to transmit the same discovery payload data more than one time to improve reliability. In one approach, the WTRU may retransmit the same coded bits for one or more, or each, retransmission. In one example, the retransmission may be dynamically scheduled by the network or based on a periodic pattern, configured by the network. In another approach, the WTRU may retransmit a different set of coded bits, for instance using similar incremental redundancy rules as in the existing specifications. The redundancy version schedule may be pre-defined (e.g., based on subframe index or other time variable), or dynamically scheduled by the network explicitly.

In some embodiment, the transmit WTRU may apply scrambling to the discovery payload part. Embodiments contemplate the potential large number of transmitting WTRUs. In one example, the scrambling code or parameter may depend on one or more of the following: Synchronization code; Discovery sequence index; Cell-ID (the cell where the WTRU is located or attached to); WTRU identity (e.g., some RNTI, or IMSI or other identity); and/or Service identity (e.g., as configured or associated by the network).

One or more embodiments contemplate a payload content. The transmit WTRU may be configured to transmit information on the payload. The transmit WTRU may for example transmit one or more of the following information in the payload: Device status: e.g., busy, open for connection request, in or out-of coverage, etc.; Sensor measurement(s) (e.g. Device-related information (e.g., WTRU battery level; WTRU Temperature); Attached accessory readings (e.g. Oxygen tank level (e.g., fireman); Outside air quality (e.g., $CO_2$ level, etc.); Fuel level; Environmental information: temperature, humidity, etc.; User-related information (e.g., Pulse rate; Blood oxygen level or other information; Pressure; Body temperature; Sugar level; Etc.)); Cluster status: e.g., in a public safety deployment, the master WTRU of a cluster may provide information on its cluster (number of WTRUs, current traffic load, etc. The information carried on the payload may be configured by the network or be application-specific. The WTRU may be configured with a set of pre-defined payload sizes and associated fields (e.g., payload format). In one example the transmit WTRU may be configured with a specific payload format and the receiving WTRU may be configured to blindly detect the format from a finite list of possible supported format.

Upon detection of the payload, the receiving WTRU may be configured to report the content of the payload to the higher layers (e.g., application, etc.). In one approach, correct reception of the payload may trigger the receive WTRU to transmit a report to the network, for instance indicating correct reception and reporting additional measurements and/or values contained in the payload.

One or more embodiments contemplate mapping to physical resources and reference symbols. One or more embodiments contemplate mapping of discovery signal to physical resources. One or more embodiments contemplate mapping of the D2D discovery signal(s) to physical resources.

In some embodiments, a discovery signal from one or discovery signals from multiple users may be transmitted in a designated portion of a subframe designated and configured as transmission opportunity for D2D discovery signals. The designated portion carrying discovery signals may follow the design principles described herein, e.g., by assigning appropriate guard periods (in time domain) and/or guard regions (in frequency domain) that may allow unimpeded transmission and reception even in the presence of timing uncertainty and/or oscillator inaccuracy.

Figure 3:
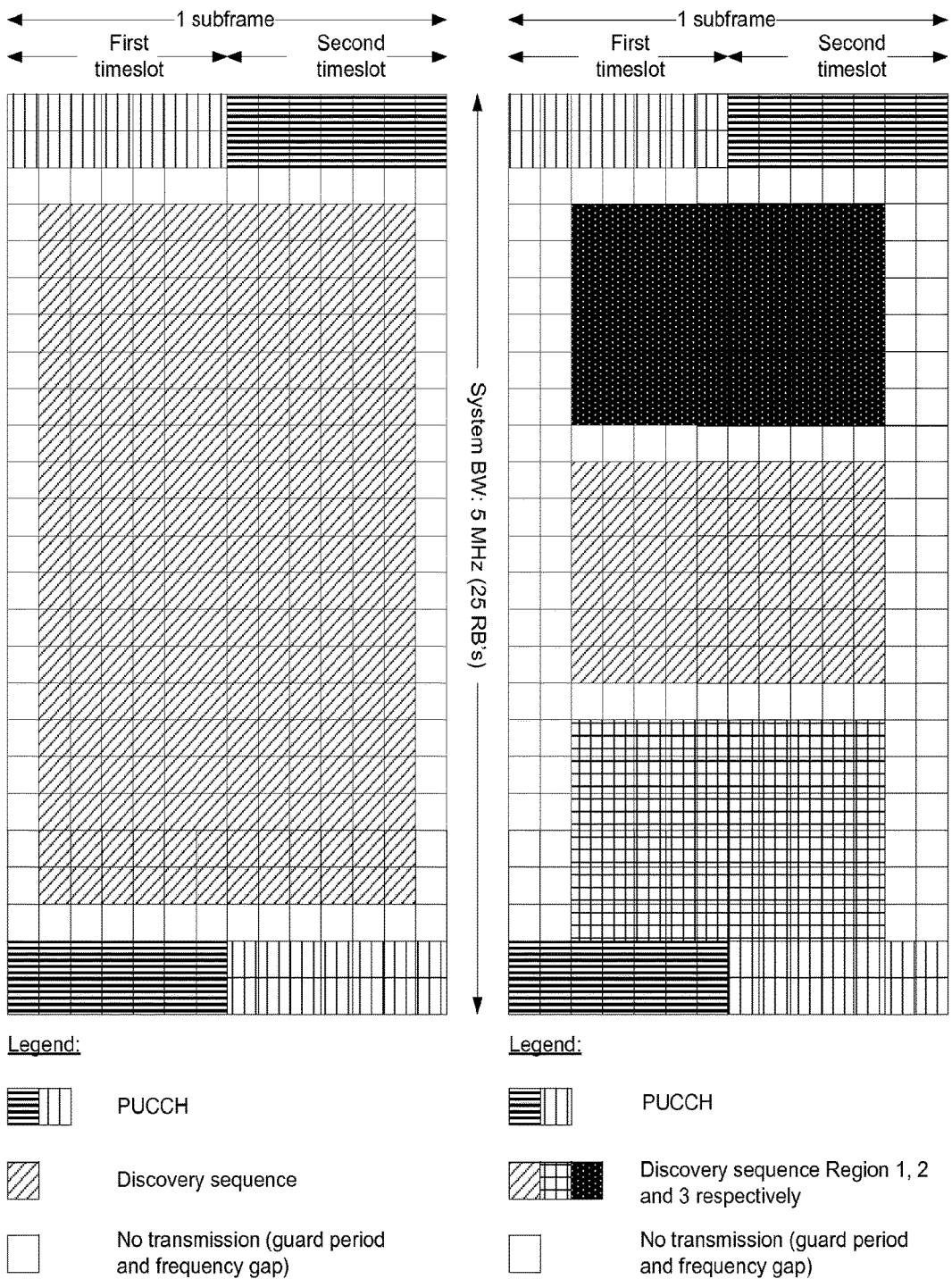
FIG. 3 illustrates an exemplary mapping of discovery signals to physical resources in the presence of PUCCH transmissions on the band edge.

In FIG. 3, two exemplary embodiments using an UL subframe in the case of 5 MHz UL system BW are shown to illustrate the principles of operation.

In the first example, the discovery signal may be transmitted in a subframe designated or configured as transmission opportunity for D2D discovery as a single Tx opportunity (left part of FIG. 3). In this case, the discovery signal sequence occupies 19 RB's while leaving 180 kHz left and right of the occupied BW as frequency guard. 1 OFDM symbol preceding and 1 OFDM symbol following the actual discovery signal transmission format is left as guard time. It is possible that one single WTRU transmits its discovery signal using these reserved resources. It is also possible that multiple WTRUs transmit their respective discovery signals into the designated resources by judicious signal design allowing for simultaneous correlation and/or detection for the presence of such signals by monitoring WTRU(s).

In this example, it should be understood that the discovery signal could be comprised of multiple components such as described herein, e.g., it could comprise of either one or a combinations of synchronization signals, discovery signal sequences, data-carrying payload and/or pilot sequences.

The occupied bandwidth (BW) by the discovery signal may vary as a function of the available system BW. For example, the WTRU may determine the applicable transmission BW of the discovery signal as a function of either one or a selected combination of parameters such as the system BW, size of the PUCCH or reserved region, and/or the signaled or the configured transmission BW. Similarly, if the discovery signal occupies a subset of the system BW (perhaps only such BW), the center BW for the discovery signal transmission may either be configured as part of the transmission parameters, or be subject to allocation rules as described herein.

In the second example (e.g., right part of FIG. 3), possibly more than 1 designated transmission opportunity for D2D discovery exist per subframe. The multiplexing capacity for D2D discovery signals may be increased, which may be useful in TDD systems where a limited number of UL subframes may be available. A first WTRU may transmit its discovery signal in Region 1, whereas a second WTRU may transmit its discovery signal in Region 2. Similarly to the first example, it is possible to vary occupied BW as a function of parameters, affecting the size and number of available transmission opportunities for D2D signals in a given subframe. Like in the first example, it is possible that multiple WTRU's transmit their respective discovery signals in a given designated D2D discovery signal region by judicious signal design allowing for simultaneous correlation and/or detection for the presence of such signals by monitoring WTRU(s). When multiple D2D discovery transmission opportunities per subframe are supported, the Tx opportunities for each D2D discovery region may be allocated in time first and then in frequency. This may be useful if time multiplexing may not be sufficient to hold all opportunities of a D2D configuration needed for a certain density value $D_{RA}$ without overlap in time. To illustrate this principle, when a given D2D discovery signal region occupies 6 RB's transmission BW, frequency multiplexing of multiple such D2D regions may be done by:

$$n_{PRB}^{D2D} = \begin{cases} n_{PRBoffset}^{D2D} + 6\left\lfloor \frac{f_{D2D}}{2} \right\rfloor, & \text{if } f_{D2D} \bmod 2 = 0 \\ N_{RB}^{UL} - 6 - n_{PRBoffset}^{D2D} - 6\left\lfloor \frac{f_{D2D}}{2} \right\rfloor, & \text{otherwise} \end{cases}$$

where $N_{RB}^{UL}$ is the number of UL resource blocks, $n_{PRB}^{D2D}$ is the first physical resource block allocated to the D2D region under consideration and where the parameter D2D-FrequencyOffset, $n_{PRB\ offset}^{D2D}$ is the first physical resource block available for the D2D discovery signal expressed as a physical resource block number configured by RRC and fulfilling $0 \leq n_{PRBoffset}^{D2D} \leq N_{RB}^{UL} - 6$.

The WTRU may be configured to select the set of PRBs to be used for discovery transmission. In some embodiments, the WTRU may be configured to transmit (and/or receive) a discovery signal of a predetermined bandwidth $N_{RB}^{D2D}$, for example $N_{RB}^{D2D} = 6$ PRBs (to continue with the same example as above). The WTRU may be configured with a number of D2D regions in a given subframe(s), and/or may be configured to determine the set of D2D regions available based on one or more of: the system bandwidth, the discovery signal bandwidth, the PUCCH region, and/or the guard bands, etc.

The Transmit WTRU may be configured to select the D2D region from the set of D2D regions available based on one or more of the following techniques: The WTRU may be configured with a specific D2D region (e.g., for a specific discovery signal) and may transmit the discovery signal in that D2D region; and/or The WTRU may be configured to alternate D2D regions, for example when transmitting the discovery signal. This may be achieved for example using a pre-determined hopping sequence or, for example, based on a random selection. In an example of a random selection approach, the WTRU may be configured to initialize the seed of the pseudo-random number generator (e.g., an m-sequence generator) using, for example, an identity associated to the WTRU (e.g., C-RNTI or D2D identity).

One or more embodiments contemplate simultaneous transmission of control and D2D signaling. In some embodiments, the mapping of discovery signal(s) in subframe(s) designated or configured as transmission opportunity for D2D discovery may allow for simultaneous transmission of control signals such as PUCCH. DL scheduling and their corresponding A/N transmission in UL subframes may remain un-impeded by the configuration and actual use of UL resources made available for D2D services. Even legacy WTRU's that do not support D2D may still be scheduled in DL subframe n−4, perhaps if UL subframe n is configured as transmission opportunity for WTRU's supporting D2D. The ability to frequency-multiplex control signals such as PUCCH with concurrent transmissions of discovery signals in the same subframe may be supported (and perhaps guaranteed) as long as the signal formats may allow for sufficient guard separation.

In one example, a transmission opportunity for discovery signals may be configured or allocated to first WTRU. The WTRU may transmit the discovery signal in subframe n while a second WTRU that received DL data in subframe n−4 may transmit a PUCCH carrying A/N in the outer BW PUCCH region.

In another example, a WTRU supporting concurrent transmission of a first D2D discovery signal and a second PUCCH signal in the same subframe may transmit both simultaneously.

One or more embodiments contemplate scrambling. In some embodiments, transmission of a discovery signal or portions thereof may be scrambled by a cell or service specific scrambling code. Interference as seen during demodulation and decoding of such a transmitted signal may be averaged and/or randomized.

For example, in order to transmit a discovery signal, a WTRU may initialize the scrambling sequence generator with $c_{init} = n_{D-RNTI} \cdot 2^{14} + q \cdot 2^{13} + \lfloor n_s/2 \rfloor \cdot 2^9 + N_{ID}^{cell}$ at the start of one or more, or each, subframe where $n_{D-RNTI}$ corresponds to the RNTI associated with the D2D transmission opportunity, where $n_s$ is the subframe number and $N_{ID}^{cell}$ is the serving cell ID. Such as described herein, use of the scrambling generator applied to portions or the entirety of a discovery signal, pilot signal, data payload, etc. may be realized through initialization or signaling as part of the transmission configuration and/or indicated through DL control signaling messages such as DCI's.

The parameter q may be related to the transmission layer. In some embodiments, a WTRU may use a single layer for transmitting a discovery signal, which may correspond to a fixed value, e.g., q=0. In the context of discovery with non-WTRU specific discovery resource allocation, embodiments recognize that multiple devices may transmit simultaneously on the same resources. In such scenarios, and others, it may be useful for the WTRUs to use different scrambling sequences to whiten the interference. Embodiments also recognize, perhaps from the monitoring WTRU perspective, performing blind scrambling sequence detection (e.g., even from a small subset of values) may be quite computationally intensive.

Embodiments contemplate one or more techniques for scrambling that may provide capability for WTRU-specific scrambling, perhaps without the implied complexity for the monitoring WTRU. In such scenarios, and others, the WTRU transmitting the discovery signal may be configured to base the initialization of the scrambling sequence generator with a parameter that may be associated with, and/or derived from, one or more WTRU-specific sequence(s) that may be transmitted on the discovery signal, such as the synchronization code, discovery sequence, and/or other pilot sequence, or the like.

In some embodiments, the WTRU may be configured to initialize the scrambling generator using the following formula:

$$c_{init} = n_{UE} \cdot 2^{14} + q \cdot 2^{13} + \lfloor n_s/2 \rfloor \cdot 2^9 + N_{ID}^{cell}$$

where $n_{UE}$ is a WTRU-specific parameter that may be derived from discovery signal parameters. For example, $n_{UE}$ is a 16 bit-long bit stream that may be a concatenation of one or more bit-values, including, for example: An identity known to one or more, or all, Monitoring WTRUs. This identity may be configured for a given service, and/or may be common to one or more, or all, WTRUs in the cell (e.g., broadcasted on the SIBs); An index associated to a WTRU-specific discovery signal parameter, for example one or more of: The synchronization code index; The discovery sequence index; and/or The DMRs (pilot) sequence index.

Also by way of example, the WTRU may be configured with a common 16 bit identity (e.g., via the SIBs) for $n_{UE}$ and may use a WTRU-specific signal parameter replacing the $n_s$ parameter in the scrambling formula above.

The monitoring WTRU may determine the scrambling generator initialization string by determining one or more of (in any order): The cell ID of the discovery signal (e.g., this may be carried out via the D2D resources assigned in one or more, or each, specific cell, and/or via association of the synchronization code/discovery sequence to a specific cell ID); The discovery signal parameters such as the synchronization code index, discovery sequence index, and/or demodulation pilots index. The WTRU may determine the value of $n_{UE}$ by concatenating the relevant discovery signal parameter to a configured identity. The WTRU may determine the value of $n_s$ based on the discovery signal parameters detected; and/or In some embodiments, for example perhaps if useful, the slot number within a radio frame, $n_s$ may be determined by the WTRU, for example, by associating the signal of interest to its source cell. In such scenarios, among others, the WTRU may acquire the timing of the associated cell. In some embodiments, the Transmit and/or Receive WTRUs may be configured to use a fixed value of $n_s$ (e.g. $n_s=0$), for scrambling discovery signals, and/or to improve the range of the discovery signal outside of its own cell, for example.

In some embodiments, the WTRU may be configured to determine the scrambling generator initialization value based on pre-configured default values and/or values stored in the WTRU USIM, for example, perhaps in scenarios where the WTRU may be outside of network coverage. The WTRU may determine the frame timing and/or slot numbers from a cluster head (CH) synchronization signal.

One or more embodiments contemplate Tx Diversity. In some embodiments, devices that support transmissions of discovery signals from more than one antenna port may use a Tx diversity transmission scheme for these D2D signals. The link robustness for the transmitted discovery signal or portions thereof may be improved resulting in an increased discovery range. Given that feedback from the receive WTRU may not be assumed available to the transmit WTRU, open-loop multiple antenna transmission schemes such as Tx diversity or alike schemes may be suitable for transmission of discovery signals.

In some embodiments, the transmit WTRU supporting N=2 antenna ports may alternate transmissions of the discovery signal between successive occurrences of D2D signal transmission opportunities between the available antenna ports, e.g., in a first subframe #5 of frame #1 it may use a first antenna port, in the next following D2D transmission opportunity subframe #5 of frame #2 it may use the second antenna port.

In some embodiments, the transmit WTRU supporting N=2 antenna ports may simultaneously transmit the discovery signal or portions thereof using a block encoding scheme. For illustration purposes and as example, the transmission scheme used may be SFBC or STBC where symbols, REs or designated portions of a discovery signal may be block-encoded and then mapped to the available N=2 antenna ports.

In some embodiments, the transmit WTRU supporting N=2 antenna ports may simultaneously transmit the discovery signal or portions thereof using different set(s) of frequency/time resources for each antenna port in a given D2D transmission opportunity. For illustration purposes, a first Discovery sequence region or code or index resource may be used for transmission of the discovery signal from the first antenna port, and a second Discovery sequence region or code or index resource may be used for transmission of the discovery signal from the second antenna port.

In some embodiments, the transmit WTRU supporting N=2 antenna ports may transmit a discovery signal from a first antenna port while transmitting a time-delayed or phase-adjusted discovery signal from a second antenna port.

The aforementioned embodiments may be extended to more than N=2 antennas, and that for one or more, or all, time-switched, block coded or orthogonal resources assignment multiple antenna transmission schemes described. Furthermore, it is not necessary that the use of multiple antenna transmission may be known to the receiving WTRU. For example, for time-switched antenna diversity, the receiving WTRU may be unaware that these transmissions originate from 2 different antenna ports, e.g., it may simply see more diversity while decoding the signal. For other examples, such as the block coding multiple antenna schemes, design of the discovery signal or portions thereof may allow for different pilot or channel estimation sequences or indices that may allow for separate demodulation and recombining of a discovery signal sent using more than one antenna port by the transmitting device.

In some embodiments, the use of an open-loop multiple antenna or Tx diversity transmission scheme may be configured in a transmitting WTRU through the use of signaling messages such as RRC or DCI. For example, the network as part of the configuration signaling for D2D transmissions configures a transmitting WTRU to use or not to use Tx diversity in case the device supports multiple antenna transmission. Similarly, the use of an open-loop multiple antenna or Tx diversity transmission scheme may be signaled to a receiving device through the use of signaling messages such as RRC or DCI, in order to allow the receiving WTRU to configure its receiver accordingly for channel estimation and recombining purposes while demodulating a received discovery signal. In some embodiments, the design of the discovery signal sequence or portion thereof may allow for explicit determination by the receiving WTRU whether open-loop multiple antenna transmission may be in use on a given discovery signal transmission or not. For example and for illustration purposes, the discovery signal transmission from different antenna ports may be distinguished by a receiving WTRU through the use of different scrambling sequences, different sequence values, and/or different resource indices as part of the discovery signal.

One or more embodiments contemplate reference symbols. Reference symbols may be used for channel estimation purposes, for example to demodulate the payload correctly, or for other measurements (e.g., RSRP). The transmit WTRU may be configured to transmit reference symbols along one or more parts of the discovery signal. For example, the WTRU may be configured to transmit reference symbols in the payload part but not in the other parts. The WTRU may be configured to transmit reference symbols along the discovery sequence.

In some embodiments, the receive WTRU may be configured to measure the quality of the reference symbols and report a measurement to the network (e.g., RSRP, CQI, or other). In some embodiments, the receive WTRU may report a channel quality measurement back to the transmit WTRU in preparation for direct communications.

In some embodiments, the receive WTRU may use the reference symbols to demodulate the discovery payload.

Figure 4:
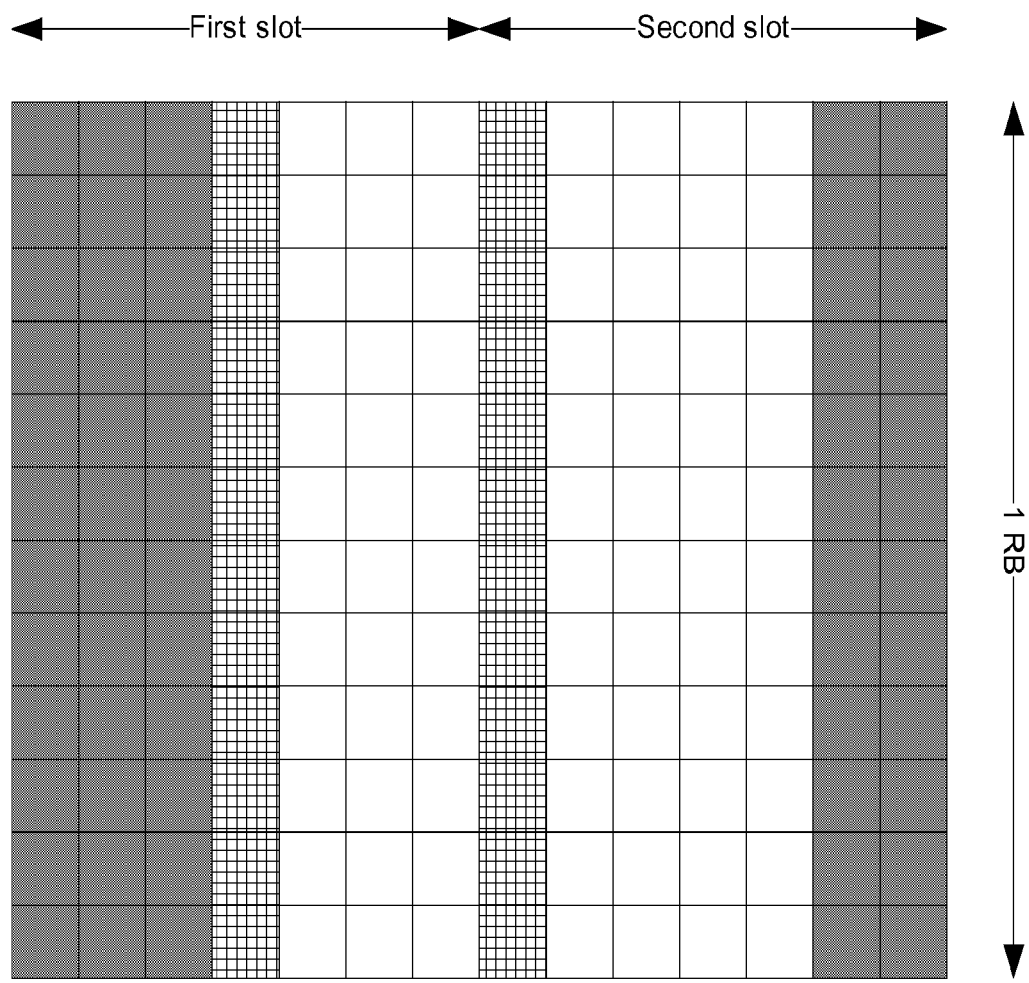
FIG. 4 illustrates an example of reference symbols mapped to OFDM symbol.
Figure 4:
Figure 4:
Figure 4:

One or more embodiments contemplate one or more techniques for transmission of reference symbols. In one or more embodiments for transmission of reference symbols, the WTRU may transmit reference symbols in one or more pre-determined specific OFDM symbols during the discovery signal transmission. The set of OFDM symbols in which the transmission of reference symbols takes place may be pre-determined. The set of OFDM symbols may depend on a parameter associated to (or identifying) the discovery signal, such as an index or an identity. In this approach, the OFDM symbol carrying the reference signal may carry a reference signal and perhaps no other data/control information. This concept is illustrated in FIG. 4, where in that example two of the symbols in the discovery signal are dedicated to reference symbols (here as an example the fourth symbol of the first slot and the first symbol of the second slot). In this example the discovery signal has two guard periods and a number of symbols which may be used for transmission of one or more of the discovery signal parts discussed above, that is a discovery sequence, a payload, a synchronization part, a transmission gap (DTX), etc.

Figure 5:
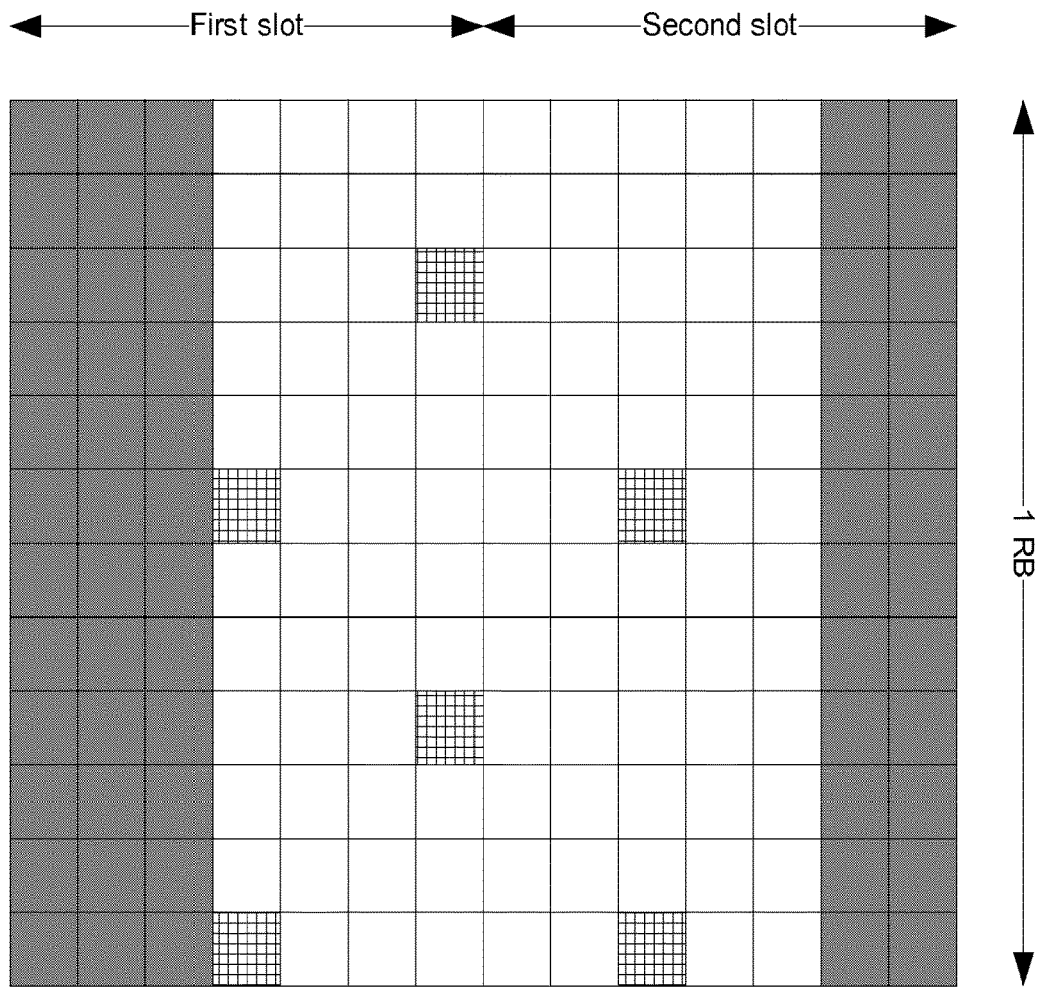
FIG. 5 illustrates an example of reference symbols mapped across multiple OFDM symbols.
Figure 5:
Figure 5:
Figure 5:

In some embodiments for the transmission of reference symbols, the WTRU may be configured to transmit the reference symbols along the content of the discovery signal. In this approach, OFDM symbol carrying the discovery signals may also carry reference symbols. This concept is illustrated in FIG. 5, where three symbols are carrying reference symbols in some subcarriers but also other data in other subcarriers. In the example in FIG. 5, the fourth and seventh symbol in the first slot and the third symbol in the second slot carry reference symbol multiplexed with other information. The reference symbols may be multiplexed with other data such as discovery sequence, synchronization sequence, payload (data), or even transmission gap (DTX). Likewise, the other OFDM symbols free of reference symbols (symbols 5 and 6 in the first slot and symbols 1, 2 4 and 5 in the second slot in this example) may also carry one or more of a discovery sequence, a synchronization sequence, a payload (data), or even a transmission gap (DTX).

Embodiments contemplate one or more techniques for reference symbol generation. The actual reference symbol sequence may be generated by the WTRU based on one or more of the following approaches: Zadoff-Chu (ZC) sequence; PN-sequence (e.g., m-sequence, Gold-sequence or other); Pre-defined sequence (e.g., fixed in the specifications).

In some embodiments, any ZC, PN sequence or other may need to be parameterized or initialized using a specific set of one or more values. For the purpose of the reference symbol, the WTRU may use one or more of the following elements to determine the initialization/parameters of the reference sequence: The WTRU C-RNTI; The associated D-RNTI; The eNB cell ID; A set of dedicated parameters indicated on an RRC message; Based on the parameters indicated in the SIBs; and/or A parameter associated to, or identifying, the discovery signal, such as an index. This parameter may be indicated by physical layer signaling or configured by higher layer signaling.

In one example based on the ZC sequence, the WTRU may determine length of ZC sequence based on the discovery signal bandwidth for example as configured by the network or as fixed in the specifications (e.g., for each possible discovery signal bandwidth). The root of the ZC sequence and/or the cyclic shift may be determined based on a modulo operation with the D-RNTI.

In some embodiments, the WTRU may also be configured with one or more of the following parameters: Maximum number of ZC root sequences available; List of allowed ZC root sequences; List of allowed cyclic shifts (for each ZC root allowed, or common to all ZC roots); Maximum number of cyclic shifts per ZC root; Cyclic shift minimum distance; and/or Maximum number of sequences available to use.

The WTRU may further determine the maximum number of ZC sequences that may be available (e.g., in the case where it is not explicitly configured) based on one or more of the aforementioned parameters. For example, the WTRU may determine the number of ZC sequences available based on the number of roots and a number (e.g., a maximum number) of cyclic shifts available per ZC root. The WTRU may then further determine the actual ZC sequence index to use based on the associated D-RNTI, for example using a modulo operation such as:

$$\text{SequenceIndex}=(\text{D-RNTI})\text{modulo}(\text{maximum number of ZC sequences available}) \quad (4)$$

The WTRU may then determine the root and the cyclic shift from the SequenceIndex (e.g., using the parameters configured and a known relation in the specifications).

In another example based on the PN-sequence, the PN-sequence may be initialized based on the D-RNTI. For example, and depending on the size of the required initialization sequence, part of the D-RNTI may be used, or an extended D-RNTI (e.g., circular extension) may be used for initialization.

Figure 6:
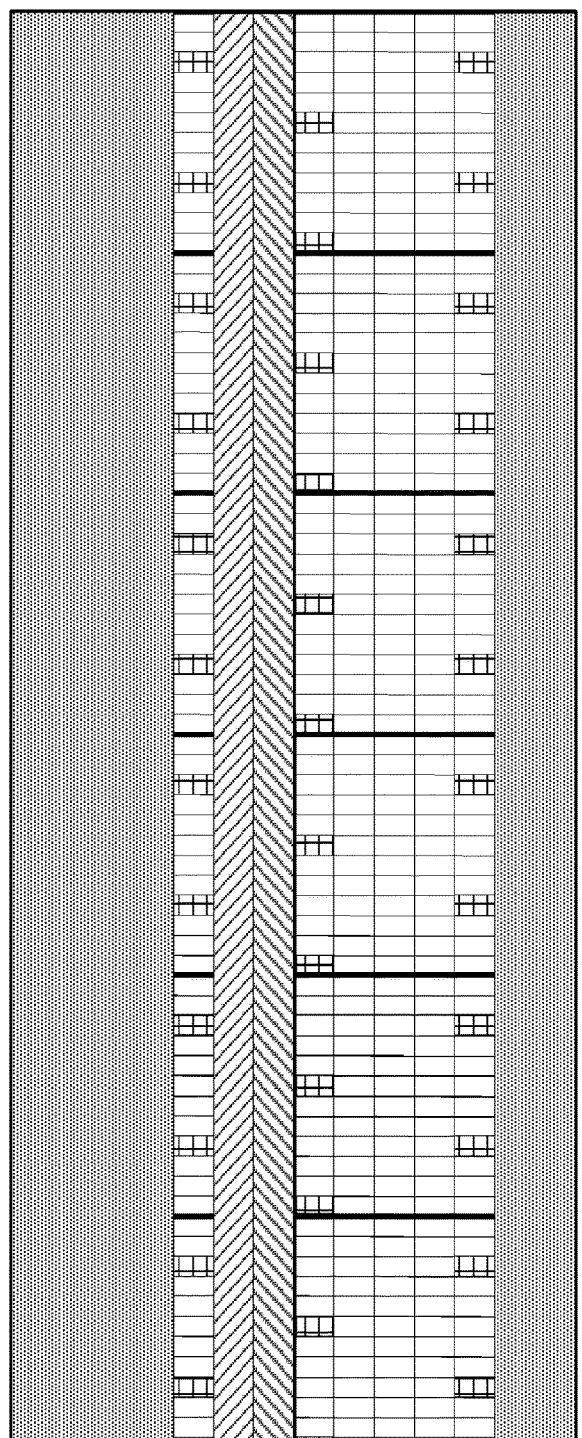
FIG. 6 illustrates an exemplary discovery signal structure.

Embodiments contemplate one or more techniques for a discovery signal. In some embodiments, for a discovery signal as illustrated in FIG. 6, the WTRU may be configured to transmit a discovery signal that may include a series of OFDM symbols carrying one or more of:

A first guard periods (e.g., at the beginning);
A content part: carrying one or more of:
　Reference symbols;
　DTX;
　Discovery sequence; and/or
　Payload
A synchronization signal; and/or
Another content part, carrying one or more of:
　Reference symbols;
　DTX;
　Discovery sequence; and/or
　Payload For example, the WTRU may be configured to transmit the discovery sequence in the first content part, and/or a payload in the second content part.

The WTRU may be further configured to transmit the reference symbols in the same location as the downlink CRS. This may simplify the receiver WTRU implementation.

In some embodiments, the WTRU may be configured with a special discovery signal format carrying a payload and perhaps no discovery sequence. This special format may include one or more of the following elements: Guard period (beginning); Reference symbols; Payload; and/or Guard period (end). In some embodiments, the reference symbols may be used for demodulation of the payload.

In some embodiments, the WTRU may be configured with a special discovery signal format for use when not under network coverage. For example, this special discovery signal format may include a regular discovery signal format with the addition of, for example, one or more of the following: additional guard subcarriers to account for possible frequency synchronization errors; and/or additional reference symbols for improved synchronization.

Embodiments contemplate one or more techniques for determining the discovery signal format.

One or more embodiments contemplate that the WTRU may be configured to determine the discovery signal format to use (either for transmission or for reception/monitoring) based on one or more measurements.

In some embodiments, the WTRU may be configured to determine whether or not it may be under LTE network coverage and may determine the appropriate discovery signal format (or other related parameter) to use. This may be applicable, for instance, to WTRUs that may be configured with Public Safety (PS) operations. In one example, the WTRU may determine that it may not be under network coverage if one or more of the following factors may be met in any order or combination (one or more, or all, factors may be supplemented by the use of a timer): the WTRU may be a PS WTRU; the WTRU might not find any cell by measurements of PSS/SSS before a predefined amount of time may have elapsed; the WTRU might not be allowed to camp on any cell (e.g., none of the cells found are suitable); and/or the WTRU may not have found a cell to camp for a specific amount of time.

In scenarios in which the WTRU may determine that it might not be under network coverage, the WTRU may determine the discovery signal format and/or transmission parameters to used based on one or more of the following (in any order or combination): Based on the USIM configuration; Based on a predefined format, e.g., in the specifications; and/or Based on higher layer configurations.

When the WTRU may determine that it may be under network coverage, the WTRU may be configured to perform discovery operations after being indicated so by the network (e.g., perhaps only after being so indicated), e.g., via RRC configurations. For instance, the WTRU may perform one or more of these tasks: WTRU may connect to the network and transmits its capabilities via RRC signaling; WTRU may receive a synchronization and timing advance from the network; WTRU may receive discovery or direct communications parameter/configuration from the network, e.g., via RRC signaling/SIBs; and/or WTRU may apply the configuration and/or perform discovery actions according to configuration.

In some embodiments, the WTRU may be configured to perform discovery monitoring based on configuration stored either in the USIM for a particular PLMN and/or based on the application layer. The WTRU may determine one or more discovery parameters for monitoring (e.g., perform open discovery) e.g., from the SIBs. In one example, the WTRU may be configured to not transmit any discovery signal in E-UTRA RRC Idle mode.

In some embodiments, the WTRU may be configured to determine the cell parameters and select the discovery signal format based on one or more measurements or on one or more cell parameter. For example, the WTRU may be configured to use a specific discovery signal format based on the PRACH configuration (e.g., based on the PRACH preamble format, the PRACH configuration index, or other PRACH related parameter). This may be useful for at least the reason that the PRACH configuration may be related to the size of the cell and, in some embodiments, perhaps to the discovery signal desired range.

Embodiments contemplate one or more techniques for determining service and/or device identity from the discovery signal. In some embodiments, the identification of the device transmitting the signal may be carried out explicitly for example by transmitting an identifier in the payload part, or implicitly for example via the discovery sequence. For example, the set of discovery sequences may be ordered and/or indexed. The device identity may then be linked to the discovery sequence. This association may be explicit for example based on network configuration (e.g., the transmitting WTRU may be configured by the network to use a specific discovery sequence) or implicit for example based on other known WTRU parameters for instance the device IMEI, or C-RNTI or other.

In some embodiments, the service identity associated to a discovery signal or process may also be transmitted explicitly or linked to a discovery sequence or set of discovery sequences (e.g., specific root, physical resource, etc.).

Embodiments contemplate one or more WTRU actions related to discovery signal. A WTRU configured to receive or configured to transmit a discovery signal may be configured to perform one or more functions, perhaps prior to the discovery event (for illustration, a discovery event may refer to the transmission of a discovery signal and/or the reception of a discovery signal). In some embodiments, the WTRU may be configured to determine whether or not to receive or transmit a discovery signal, perhaps when the WTRU radio hardware may also be needed for other uses. Further, the discovery signal may be transmitted on the UL or DL frequency. Perhaps depending on the design, the transmit or the receive WTRU may perform a number of reconfigurations. One or more embodiments contemplate that the WTRU may be configured to perform one or more of functions described further herein.

One or more embodiments contemplate that a WTRU may be configured to determine a discovery event priority. In some embodiments, the WTRU may be configured to determine, for example based at least in part on pre-defined rules, whether or not the discovery event may take precedence over other transmission/reception. In the case where the discovery event may take precedence, then the WTRU may carry on one or more other contemplated functions. Otherwise, the WTRU may not receive/transmit the discovery signal and may proceed in the conventional way.

In one example, the WTRU may be configured to transmit the discovery sequence on the UL frequency. If the WTRU may be scheduled at the same time for transmission of the discovery signal and other uplink signal such as the PUSCH, or PUCCH, the WTRU may determine which signal has priority.

For example, the WTRU may be configured (e.g., fixed in the specifications or via higher-layer signaling) with one or more of the following rules: PUSCH and/or PUCCH have higher priority over transmission of discovery signal; PUSCH and/or PUCCH have higher priority over (this instance of) periodic transmission of discovery signal; Scheduled (e.g., over PDCCH) transmission of discovery signal has higher priority over PUCCH and/or PUSCH; and/or Periodic transmission of discovery signal has higher priority over PUCCH and/or PUSCH.

In some embodiments, such prioritization rules in the WTRU may also account for possibly different types of control information (e.g., A/N, CSI, SR) colliding with UL discovery signal transmission opportunities, e.g., UL subframes where a discovery signal may be transmitted. For example, a WTRU determining that an UL subframe where a discovery signal may be transmitted may also correspond to the transmission opportunity for periodic CSI on PUCCH, may drop the CSI transmission in that subframe and may transmit the discovery signal.

By way of further example, a WTRU determining that an UL subframe where a discovery signal is to be transmitted may also correspond to a subframe where it may send A/N on PUCCH, may transmit A/N together with the discovery signal in such a subframe when the design of the discovery signal format may allow for that possibility. If the PUCCH and the discovery signal may be transmitted concurrently and independently by a WTRU in a subframe, the WTRU may send both signals in such a subframe, perhaps in some embodiments subject to transmit power prioritization rules.

In another example, the WTRU may be configured to receive the discovery sequence on the UL frequency. If the WTRU may be scheduled at the same time for reception on the downlink frequency, the WTRU may determine which signal may have priority. For example, the WTRU may be configured (e.g., fixed in the specifications or via higher-layer signaling) with one or more of the following rules:

Downlink control (e.g., PDCCH for HARQ-ACK, etc.) and/or data (e.g., PDSCH) have higher priority over reception of discovery signal;

Downlink control (e.g., PDCCH for HARQ-ACK, etc.) and/or data (e.g., PDSCH) have higher priority over (this instance of) periodic reception of discovery signal;

Scheduled (e.g., over PDCCH) reception of discovery signal has higher priority over reception of downlink control (e.g., PDCCH for HARQ-ACK, etc.) and/or data (e.g., PDSCH); and/or Periodic reception of discovery signal has higher priority over downlink control (e.g., PDCCH for HARQ-ACK, etc.) and/or data (e.g., PDSCH).

In the case where the WTRU receives two contradicting scheduling indications by the network, the WTRU may be configured to ignore one of the scheduling indications as determined by the described rules.

The previous example may be extended to the case where the discovery signal is transmitted/received on the DL frequency. In such cases the aforementioned rules may be inverted. For example the rules for UL transmission may apply for example to DL reception and the rules for UL reception may apply to DL transmission.

One or more embodiments contemplate that a WTRU may be configured to reconfigure its radio. In some embodiments, the WTRU may be configured to reconfigure its radio for transmission/reception of the discovery signal.

In an example, the WTRU may be configured to receive the discovery signal on the UL frequency. The WTRU may be configured to reconfigure its radio to receive the discovery signal on the UL frequency. In some embodiments, the WTRU may reconfigure the radio before the discovery signal may be expected to be received in order to receive it in its entirety. In reconfiguring, the WTRU may carry out one or more of these functions (in any order or combination): stop transmission on the UL frequency, stop reception on the DL frequency, switch the receive frequency to the UL, for example.

By way of further example, the WTRU may be configured to transmit the discovery signal on the DL frequency. The WTRU may be configured to reconfigure its radio to transmit the discovery signal on the DL frequency. In some embodiments, the WTRU may reconfigure the radio before the discovery signal may be transmitted in order to transmit it reliably. In reconfiguring, the WTRU may carry out one or more of these functions (in any order or combination): stop transmission on the UL frequency, stop reception on the DL frequency, configure the radio for transmission on the DL frequency.

One or more embodiments contemplate that a WTRU may be configured for transmission/reception of a discovery signal. In some embodiments, the receiving WTRU may be configured to monitor for the discovery signal, and the transmitting WTRU may be configured to transmit the discovery signal. In some embodiments, this function may be conducted for a predetermine amount of time.

One or more embodiments contemplate that a WTRU may be configured to Reconfigure a radio (e.g., back to previous state). In some embodiments, the WTRU may be configured to reconfigure the radio back to a normal state of operations. For example, the WTRU may be configured to perform one or more of the following functions (perhaps depending on the role): stop transmitting/monitoring the discovery signal, reconfigure the radio (e.g., perhaps if necessary or useful) and/or resume normal operations (e.g., reconfigure the frequency for transmission/reception depending on the configuration).

In some embodiments, the reconfiguration of the radio may time (e.g., to allow for transient in the electronics to complete). In some embodiments, a WTRUs may be configured to apply the reconfiguration during the guard times associated to the discovery signals. The WTRU may also be configured to reconfigure the radio before and/or after a discovery subframe, which in some embodiments may imply that the guard subframes may not be used or might not be reliable.

Embodiments contemplate one or more WTRU actions that may be related to multi-signal reception. Embodiments recognize that in classic cellular systems, a WTRU might receive and decode one signal at a time that may be transmitted by an eNB (e.g., perhaps may only receive and decode such a signal at a time). In D2D, it may be useful for a WTRU to receive multiple parallel signals that may be transmitted by multiple D2D WTRUs. Embodiments contemplate one or more techniques to perform efficient reception and decoding of those signals. As used herein, indexes i, j, k, etc., may represent null or positive integers whereas I, J, K, etc., may represent a set of indexes, e.g., I=1:N, J={[2:5]∪[8]∪[10:13]}, etc.

Figure 7:
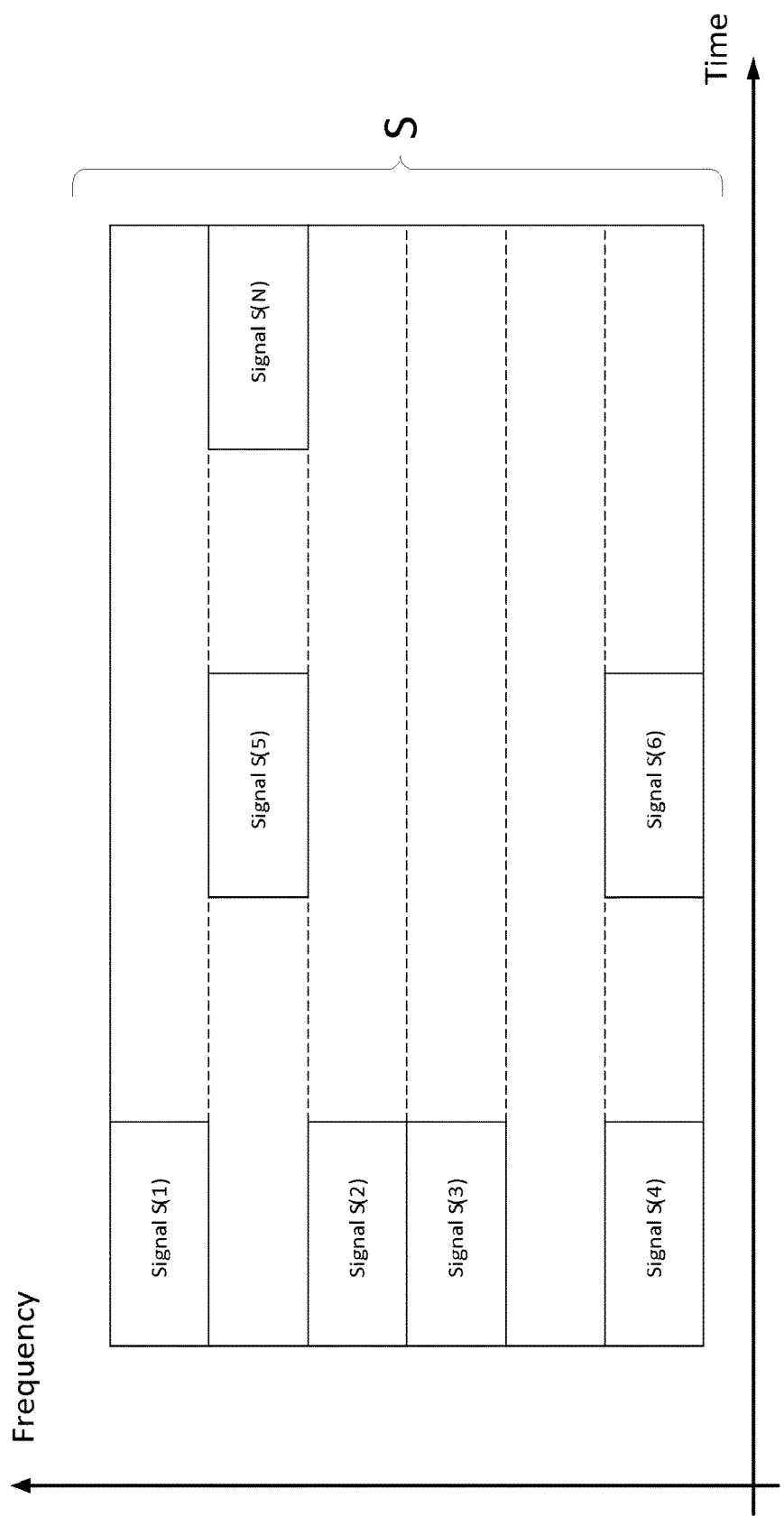
FIG. 7 illustrates an example frequency/time representation of LTE D2D signals.

A WTRU may be scheduled to receive and decode a D2D signal S. This signal S may be composed of a set of signals S(J). FIG. 7 illustrates an example for S and S(J) where J=1:N. This set of signals S(J) may be transmitted by a set of D2D WTRUs WTRU(K). In some embodiments, the WTRU may be configured with the complete or partial mapping between S(J) and WTRU(K), e.g., which signal may have been transmitted by which WTRU. In some embodiments, the WTRU may be configured to perform blind decoding and might not have any knowledge about the transmitter of one or more, or each, signal.

Embodiments contemplate one or more implementations for multi-signal reception in LTE D2D. A D2D WTRU receiver may contain a set of processing modules M(L) that may be applied in at least one of the following domains: RF, time, frequency, log-likelihood ratio, and/or bit. One or more, or each module M(i) may be configured by a set of parameters P(i), which may include, for example, a parameter specific to the state of each module, e.g.: a frequency offset, a time offset, a gain power or offset, AGC state, and/or various window timing values, etc. The WTRU may be configured to assign a configuration P(i, j) to a set of parameters P(i). For example, P(i,0) may correspond to configuration that may be optimized for eNB DL signal decoding and P(i,5) may be a configuration optimized for WTRU(5) signal decoding.

Figure 8:
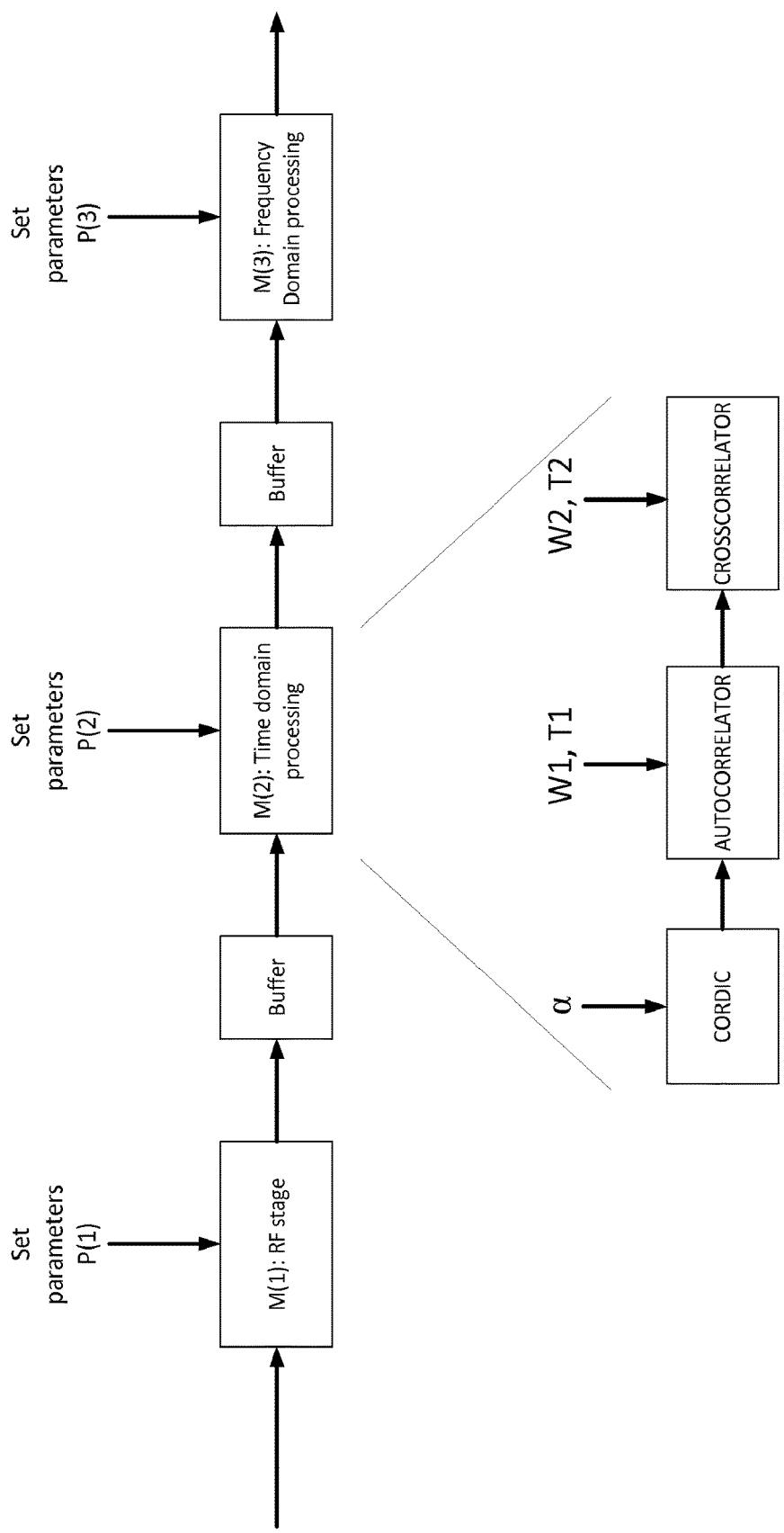
FIG. 8 illustrates an example of a multi-signal receiver.

FIG. 8 illustrates an example of a multi-signal receiver. In FIG. 8, a receiver front-end may be defined by a RF stage M(1) followed by a time domain processing module M(2) and a frequency domain processing module M(3). The RF stage may include at least one of the following modules: AGC, filter, ADC, oscillator. The time domain processing module may include a CORDIC for frequency offset compensation, an autocorrelator and/or a crosscorrelator for time synchronization. The set of parameters P(2) associated to M(2) may contain α (angle to be applied in the CORDIC), W1 (window start/end to trig/stop autocorrelation function), T1 (Threshold for autocorrelation function), W2 (window for crosscorrelation), T2 (Threshold for crosscorrelation).

Embodiments contemplate that one or more, or each, module of a WTRU may be configured to decode a D2D signal S. In some embodiments, the WTRU may configure a set of modules M(I) with the configuration used for an eNB signal decoding: P(I)=P(I,0). In some embodiments, the WTRU may configure a set of modules M(I) with the configuration that may be used for eNB signal decoding combined to a set of offsets Δ(I): P(I)=P(I,0)+Δ(I). For one or more, or each, parameter of P(I), the offset may be statically defined and/or provided by eNB. For example, a WTRU may be configured to offset an AGC configuration, perhaps based on a maximum discovery range and/or based on the GPS location of WTRU(j), among other scenarios. Also by way of example, a WTRU may be configured to offset a synchronization window (such as W1 in the example provided in FIG. 8) by a D2D timing advance value that may be provided by the eNB.

A WTRU may be configured to determine P(I), perhaps based on reception of previous D2D signals. One or more embodiments contemplate a configuration of P(I) based on D2D signal S(j) (e.g., perhaps in some embodiments on a single such signal). In some embodiments, the WTRU may be configured to determine P(I) for reception of a specific WTRU(k). For example, a WTRU may be configured to update an AGC range, perhaps based on the measured power of S(k) that may be associated to WTRU(k).

Embodiments contemplate a configuration of P(I) based on multiple D2D signals S(J). In some embodiments, the WTRU may be configured to determine P(I) for reception of a set of WTRUs WTRU(K). In some embodiments, the WTRU may configure P(I) as a linear combination of the parameters that may be optimized for one or more, or each, WTRU reception such as:

$$P(I) = \sum_J \alpha_k P(I, k, T) + \Delta(I)$$

Where, for example:
I represents the set of modules to be configured;
J represents the set of WTRU signals that may be used for parameter optimization/tuning;
P(I, k,T) represent the set of parameter values that may be optimized for signal reception associated to WTRU(k);
T represents the time window that may be used for the determination of P(I,k), for example if T=0.2 s any signal received more than 0.2 s ago might not be used for parameter optimization/tuning;
α is a vector representing linear weights applied to a set of parameters P(i); and/or
Δ represents an offset vector that may be applied to one or more, or each, parameter, Δ may be statically defined and/or provided by the eNB.

A WTRU may be configured to reset P(I, k,T) based on one or more of the following triggers: Saturation indication; Discovery success rate drops; and/or Sequential/adjacent measurements show a difference above a predetermined threshold.

In some embodiments, perhaps where a WTRU may perform several iterations of a signal S decoding (e.g., on a set of periodic subframes), among other scenarios, the WTRU may be configured to use a configuration P(I, k) that may be optimized for reception of a specific WTRU(k) for some decoding iterations (e.g., in a set of subframes) and/or to use a configuration P(I, 1) that may be optimized for reception of a specific UE(1) for other decoding iterations (e.g., in another set of subframes). In some embodiments, this approach may be extended to any number of WTRU signals to be decoded.

Figure 9:
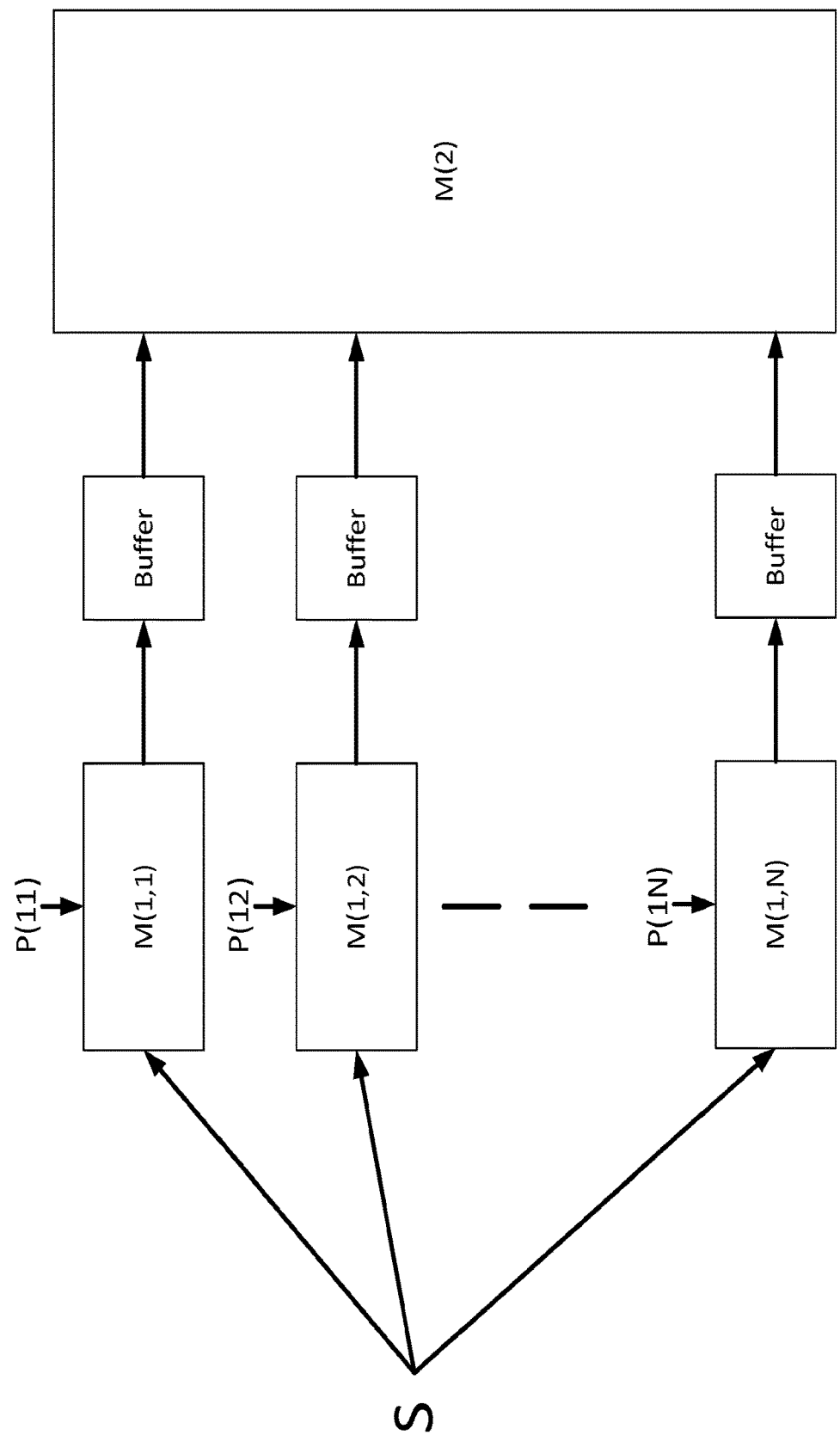
FIG. 9 illustrates an example of parallel processing for LTE D2D signal decoding.

One or more embodiments contemplate multi-signal processing, including parallel processing. In some embodiments, multiple signals may be decoded in parallel in an example module M(i). A module M(i) may contain multiple parallel processing sub-modules (an example of which is illustrated in FIG. 9). The WTRU may be configured to apply a specific configuration to each sub-module. This configuration may be computed as explained further herein.

Figure 10:
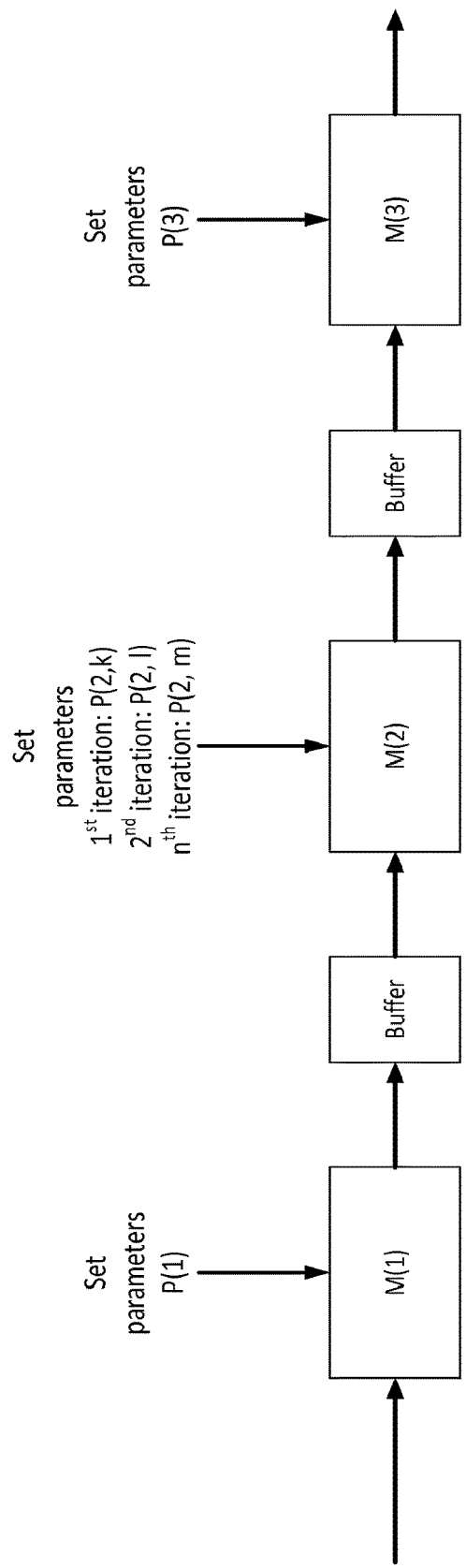
FIG. 10 illustrates an example of multiple module configurations that may be used in sequential processing.

Embodiments contemplate sequential processing, for example where multiple signals may be decoded sequentially. The WTRU may be configured to apply a configuration P(i,k) for a module M(i), perhaps in order to decode WTRU(k) and/or to perform N processing iterations in M(i+1), among other scenarios. The WTRU may be configured to perform one or more, or each, processing iteration with a different configuration P(i+1, 1). FIG. 10 illustrates an example of this approach.

In some embodiments, the WTRU may be configured to determine P(i+1, 1) as described in further detail herein. In some embodiments, the WTRU may be configured to determine P(i+1,l) to completely or at least partly compensate for processing in M(i) which may have been performed with a configuration that may be optimized for another WTRU. For example, a synchronization point may be selected for WTRU(k) in the time domain (M(2)) and CORDIC may be applied on a frequency domain signal to perhaps compensate for a timing shift (e.g., which may be equivalent to a slope in the frequency domain) for UE(l), among other reasons.

Embodiments recognize that a potential problem that may be associated with sequential processing may be the limitation on buffer size which may limit the maximum number of processing iterations that may be performed in M(i+1). The WTRU may be configured to apply one or more of the following of an example technique:
Compute the maximum number of iterations N available for M(i) based on current receiver load and latency
Partition the set of parallel signals to be decoded in N groups
Partition may be based on signal information such as:
Last successful signal decoding
Signal measurements (power, timing, etc); and/or
Signal decoding priority
Etc.

Compute optimal configuration P(i, k), P(i, l), P(i, m), etc. for one or more, or each, group of signals (as described herein); and/or Perform sequential processing on S for one or more, or each, configuration.

Embodiments contemplate successive signal cancellation, for example where multiple signals may be decoded sequentially and/or one or more, or each, decoded signal may be removed from the initial signal. In some embodiments, the WTRU may be configured to perform one or more of the in an example technique:

Buffer signal S the input of a module M(i);
Process S with parameters P(j) in module M(i) where P(j) may be optimized for decoding of WTRU(j);
Remove S(j) from signal S; and/or
Process S with parameters P(k) in module M(i) where P(k) may be optimized for decoding of WTRU(k).

Figure 11:
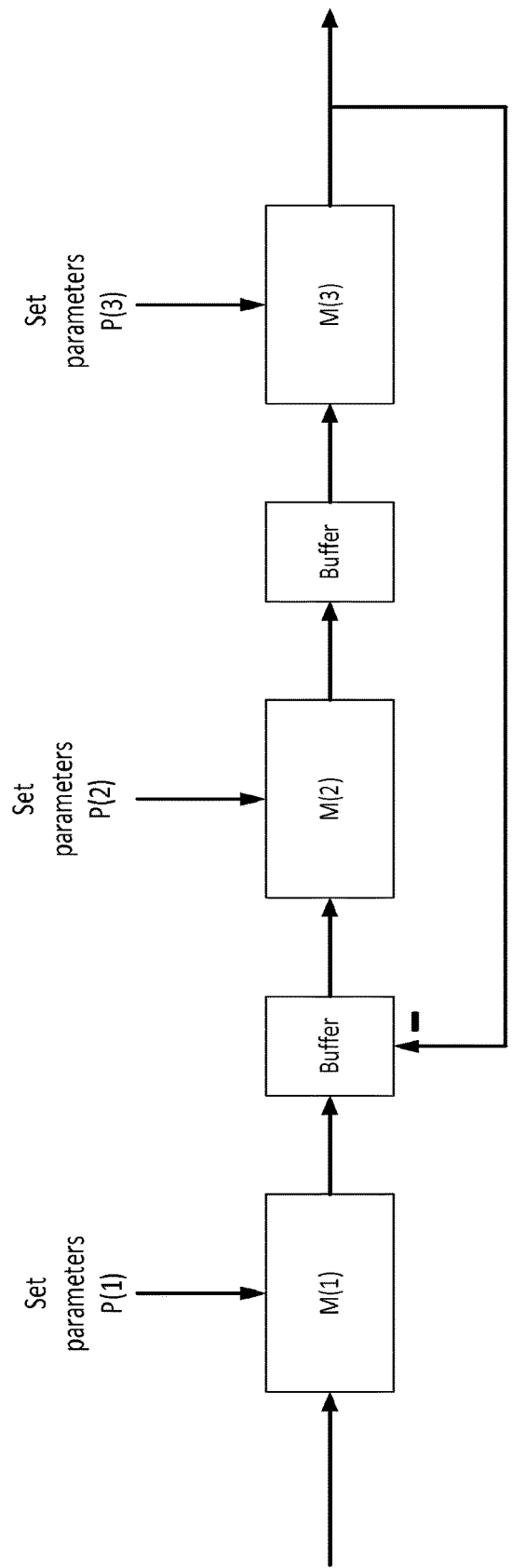
FIG. 11 illustrates an example of successive signal interference cancellation applied to D2D.
Figure 12:
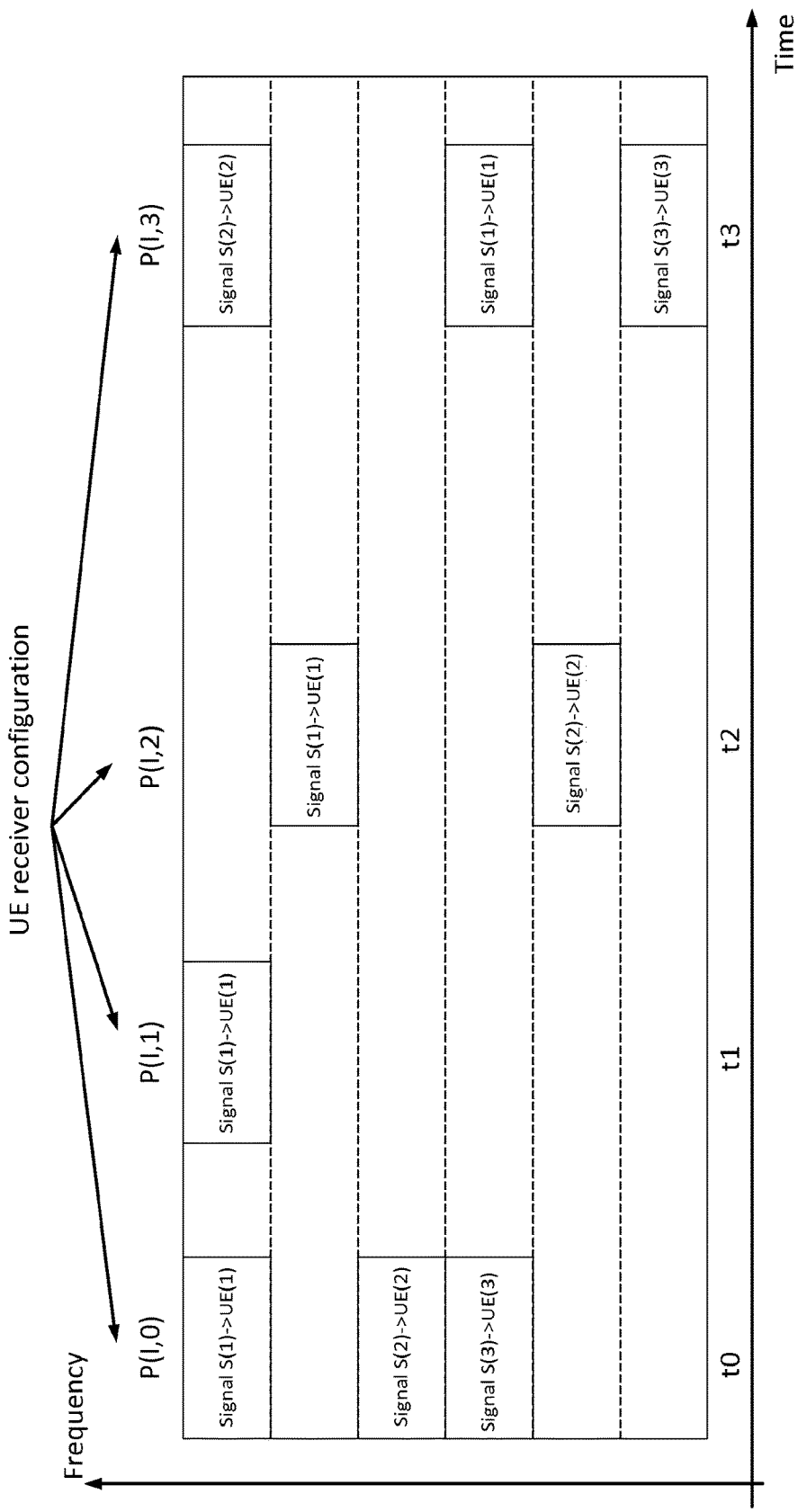
FIG. 12 illustrates an example of multi-signal scheduling mapped to WTRU transmitters.

Embodiments contemplate one or more WTRU receiver configurations for LTE D2D multi-signal reception. In one or more embodiments, a WTRU may be configured to decode a combination of parallel D2D signals as illustrated in the example of FIG. 11. The WTRU may be configured with the scheduling information of a signal mapped to one or more WTRU transmitters. The WTRU may be configured to apply a receiver configuration P(I,0) at t0 where P(I,0) may be the configuration that may be optimized for eNB signal reception. The WTRU may be configured to perform an initial measurement at t0 of power (Pi), frequency offset ($\Delta$fi), and/or timing reference (Ti) for one or more, or each WTRU transmitter (UE1-3).

The WTRU may be configured to determine a weighting factor ($\alpha$i) for one or more, or each, user based on power measurement, for example:

$\alpha 1 = P1/(P1+P2+P3)$;
$\alpha 2 = P2/(P1+P2+P3)$; and/or
$\alpha 3 = P3/(P1+P2+P3)$.

The WTRU may be configured to apply a receiver configuration P(I,1) at t1 where P(I,1) may be the configuration optimized for UE(1) reception, for example:

AGC level based on P1;
Timing reference=T1; and/or
Frequency offset to compensate=$\Delta$f1.

The WTRU may be configured to apply a receiver configuration P(I,1) at t1 where P(I,1) may be the configuration optimized for UE(1) reception, for example:

AGC level based on P1;
Timing reference=T1; and/or
Frequency offset to compensate=$\Delta$f1.

The WTRU may be configured to apply a receiver configuration P(I,2) at t2 where P(I,2) may be the configuration optimized for UE(1) and UE(2) reception such as for example:

AGC level based on max(P1,P2);
Timing reference=min(T1,T2); and/or
Frequency offset to compensate=$(\Delta f1 + \Delta f2)/2$.

The WTRU may be configured to apply a receiver configuration P(I,3) at t3 where P(I,3) may be the configuration optimized for UE(1), UE(2) and UE(3) reception such as for example:

AGC level based on max(P1,P2,P3);
Timing reference=$\alpha 1 T1 + \alpha 2 T2 + \alpha 3 T3$; and/or
Frequency offset to compensate=$(\alpha 1 \Delta f1 + \alpha 2 \Delta f2 + \alpha 3 \Delta f2)$.

The WTRU may be configured to perform an initial measurement at t3 of power (Pi), frequency offset ($\Delta$fi), and/or timing reference (Ti) for one or more, or each WTRU transmitter (UE1-3).

The WTRU may be configured to determine a weighting factor ($\alpha$i) for one or more, or each, user based on power measurement, for example:

$\alpha 1 = P1/(P1+P2+P3)$;
$\alpha 2 = P2/(P1+P2+P3)$; and/or
$\alpha 3 = P3/(P1+P2+P3)$.

The WTRU may be configured to repeat the one or more of the same techniques for other reception instances.

One or more embodiments contemplate detection and/or measurement of discovery signals. The WTRU may detect the presence and/or timing of a discovery signal by measuring at least one synchronization signal that may be part of (or associated to) the discovery signal. The WTRU may perform these measurements during time windows provided by higher layers. For instance, the WTRU may be configured with a set of subframes in which a synchronization signal may be present.

In some embodiments, the WTRU may determine an identity associated to the discovery signal based on a property of the detected synchronization signal(s).

In some embodiments, the WTRU may determine, from a property of the discovery signal, information on the time or approximate time at which other signals and/or payload information may be received from the device transmitting the discovery signal. This information may be useful in case a device may transmit payload information with a low periodicity (such as several tens of seconds). The receiving device may use this information to determine the time at which it may initiate one or more reception procedures to detect the payload and/or other signals. The receiving device may interrupt one or more reception procedures (e.g., enter a low activity state), until this time, perhaps to reduce battery consumption, among other reasons.

In some embodiments, a specific detected ZC root sequence, and/or a specific detected cyclic shift of a ZC root sequence, may indicate a minimum duration for which the device transmitting the discovery signal may not transmit payload and/or other signals. For instance, a first value of a ZC root sequence (or other property, such as a Gold sequence and/or a frequency-domain position) may indicate that the payload might not be transmitted for at least 10 seconds (among other contemplated time periods). After detecting this value the receiving device may enter a low activity state for 10 seconds and may then initiate reception procedures to decode the payload. A second value of a ZC root sequence may indicate that the payload may not be transmitted for at least 20 seconds, for example (among other contemplated time periods).

One or more embodiments contemplate the determination of discovery signal received power and/or quality. A WTRU may perform and/or report to the network at least one type of measurement on a discovery signal. A type of measurement may correspond to an estimate of the received power of the discovery signal. Such measurement may be referred to as Discovery Signal Received Power (or DSRP) in the description herein.

In some embodiments, the received DSRP power measurement may be determined by averaging the power contributions of the resource elements corresponding to a designated set of signal components constituting the discovery signal. Such components may include one or more, or all, of the resource elements corresponding to:

Reference signal(s)
Synchronization signal(s)
Discovery sequence(s); and/or
Payload In some embodiments, the averaging of power contributions of resource elements representative of the DSRP measurement on a received discovery signal may be done in a linear domain. Perhaps if more than one Rx antenna may be used by the monitoring WTRU, the averaging of power contributions may be done across the Rx antenna ports.

In some embodiments, the DSRP measurement may be taken over a designated or configured bandwidth when compared to the overall system bandwidth (or in some embodiments perhaps only over such bandwidth).

In some embodiments, the received DSRP power measurement may be determined by averaging the power contributions of discovery signal components over a designated or configured subset of time symbols for discovery signal transmission opportunities.

In some embodiments, a type of measurement may correspond to an estimate of the received quality of the discovery signal, that may be referred to as Discovery Signal Received Quality (DSRQ) by way of example and not limitation.

For example, such a DSRQ measurement may be determined in part from the DSRP defined herein and/or additional measurements.

By way of further example, the DSRQ may be determined as the ratio N×DSRP/RSSI where RSSI may be determined by linearly averaging the total received power in the time symbols where at least one resource element may have been used for the determination of DSRP. The value N may correspond to the number of resource blocks used for the determination of RSSI.

One or more embodiments contemplate discovery signal timing. A type of measurement may correspond to an estimate of the received timing of the discovery signal. Such measurement may be referred to as Discovery Signal Timing (or DST), for example, in the description herein.

The timing may correspond to a time difference (Td−Tref) between the start of the reception of the discovery signal or of one component thereof (Td) and the start of the reception of a second signal (Tref). The component of the discovery signal that may be used for determining Td may correspond to at least one of:

Reference signal
Synchronization signal
Payload

The start of the reception of one of the aforementioned signals may correspond to the start of a specific time symbol where the signal may be present, such as the first time symbol.

Td may be determined as the start of a subframe whose timing may have a known relationship compared to a measured component of the discovery signal. For instance, if a reference signal part of the discovery signal may be defined to be transmitted in the third symbol of a subframe, the WTRU may determine Td by measuring the start of the reception of the reference signal and subtracting a duration corresponding to three symbols.

The start of the reception of the second signal (Tref) may correspond to the start of one subframe (or one frame) from a serving cell of the WTRU. The serving cell of the WTRU may be at least one of: The primary serving cell; and/or A serving cell operating on the same carrier as the one from which the discovery signal is received. The subframe (or frame) may correspond to at least one of: The subframe (or frame) during which the discovery signal reception starts; The subframe (or frame) during which the discovery signal reception ends; The subframe (or frame) whose starting time is the closest to Td.

One or more embodiments contemplate at least one measurement configuration. The WTRU may perform at least one of the aforementioned measurements on a discovery signal, perhaps assuming at least one of the following characteristics: An identity associated to the discovery signal; A property of a reference signal that is part of the discovery signal, such as an initial value of a pseudo-random sequence generator used for the reference signal sequence; A set of resource elements in which a part of the discovery signal may be found; At least one subframe in which the discovery signal may be found; and/or A time at which a part of the discovery signal starts.

At least one of the aforementioned characteristics may be determined as a function of a second characteristic. For instance, the initial value of the pseudo-random generator may be determined from the identity.

At least one of the aforementioned characteristics may be pre-determined or obtained from higher layer signaling. For instance, the set of resource elements in which the reference signal may be present may be pre-determined. In another example, the identity associated to the discovery signal may be provided by higher layer signaling.

At least one of the aforementioned characteristics may be determined from a synchronization signal part of (or associated to) the discovery signal. For instance, the identity may be determined from the synchronization signal as part of a detection procedure described herein. The timing of the start of the reference signal(s) may be determined based on the timing of a synchronization signal. For instance, the reference signal timing may be determined as an offset added to the timing of a synchronization signal. The offset may be smaller or larger than the duration of a sub-frame.

One or more embodiments contemplate measurement reporting. The measurement and/or reporting of discovery measurements may be managed and/or controlled by the measurement subsystem of the RRC protocol. In this case, discovery signal resources may be included into a measurement object, or a new (e.g., heretofore undefined for this purpose) type of measurement object may be defined. The reporting configuration may use existing events or newly defined events, for example.

In some embodiments, an event that may trigger transmission of a measurement report may be when the Discovery Signal Timing becomes lower (or higher) than a threshold (plus possibly a positive or negative hysteresis).

Embodiments contemplate WTRU operations outside network coverage. In some embodiments, the WTRU may be pre-configured with a set of rules and/or parameters for discovery, for example in scenarios in which the WTRU may be operating outside of network coverage (e.g., the WTRU may be with default parameters in the specifications and/or with configuration stored in the WTRU memory or in its USIM, for example). The WTRU may use these parameters for transmission/reception of discovery signals.

The WTRU may be configured to monitor for a synchronization signal (e.g., transmitted from another WTRU nearby or a cluster head (CH)). The WTRU may then derive parameters for discovery (e.g., frame and/or subframe timing, and/or cell identity values, etc.) from the CH signal.

Embodiments contemplate one or more discovery signal WTRU techniques, including techniques that may include a non WTRU-specific allocation and/or a WTRU-specific sequence. In some embodiments, the Monitoring WTRU may determine which subframe(s) may carry discovery signals (e.g., discovery subframe) perhaps via RRC signaling and/or the SIBs. The Monitoring WTRU may determine the discovery signal physical layer parameters from the SIBs and/or based on the system bandwidth and/or other fixed values. The WTRU may perform one or more of the following:

- Upon a discovery subframe, the monitoring WTRU may tune its receiver to the UL frequency and may attempt to detect discovery signals in the discovery regions;
- The WTRU may detect the synchronization code from a list of possible synchronization codes (e.g., associated to the cell ID);
- The WTRU may acquire the discovery sequence (and/or DMRS) from the list of possible values and/or may determine the indices associated to the synchronization code(s) and/or discovery sequence/pilot configuration.
- The WTRU may determine the subframe number associated to the discovery transmission, which may imply the WTRU acquiring the cell frame and/or subframe timing of the cell to which the discovery signal may be associated;
- The WTRU may estimate the channel using the known pilots/synchronization symbols;
- The WTRU may determine and/or may apply the scrambling generator parameters; and/or
- The WTRU may decode the discovery signal payload.

Embodiments contemplate one or more discovery signal WTRU techniques, including techniques that may include a non WTRU-specific allocation and/or a non WTRU-specific sequence. In some embodiments, the Monitoring WTRU may determine which subframes may carry discovery signals (e.g., discovery subframe) for example via RRC signaling and/or the SIBs. The Monitoring WTRU may determine the discovery signal physical layer parameters from the SIBs and/or based on the system bandwidth and/or other fixed values. The WTRU may perform one or more of the following:

- Upon a discovery subframe, the monitoring WTRU may tune its receiver to the UL frequency and may attempt to detect discovery signals in the discovery regions;
- The WTRU may detect the synchronization code from a list of possible synchronization codes (e.g., associated to the cell ID);
- The WTRU may estimate the channel using the associated discovery sequence/pilots and/or synchronization symbols;
- The WTRU may determine the subframe number associated to the discovery transmission, which may imply the WTRU acquiring the cell frame and/or subframe timing of the cell to which the discovery signal may be associated;
- The WTRU may determine and/or apply the scrambling generator parameters; and/or
- The WTRU may decode the discovery signal payload.

Figure 13:
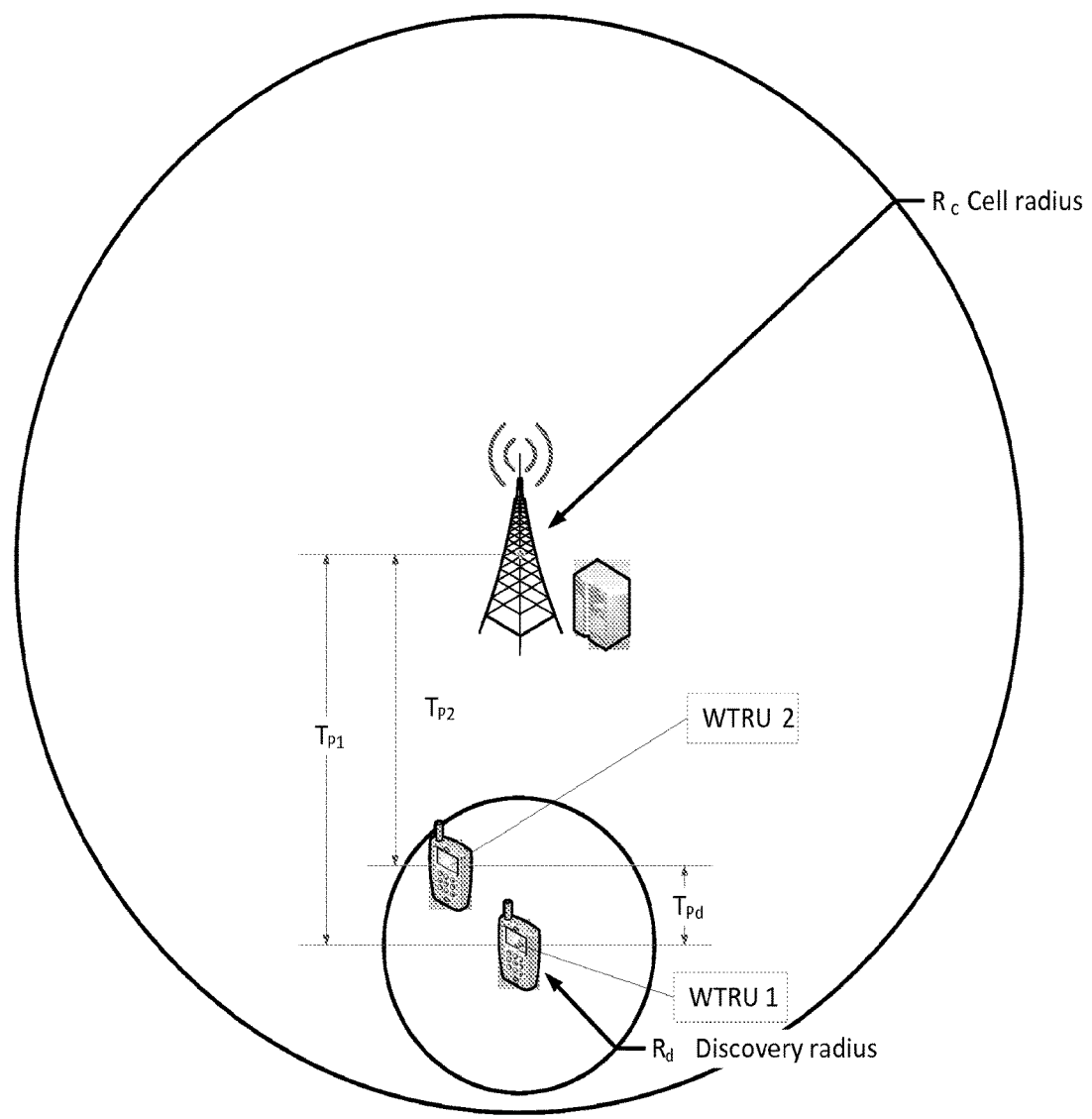
FIG. 13 illustrates an example topology using time division multiplexing (TDM).
Figure 14:
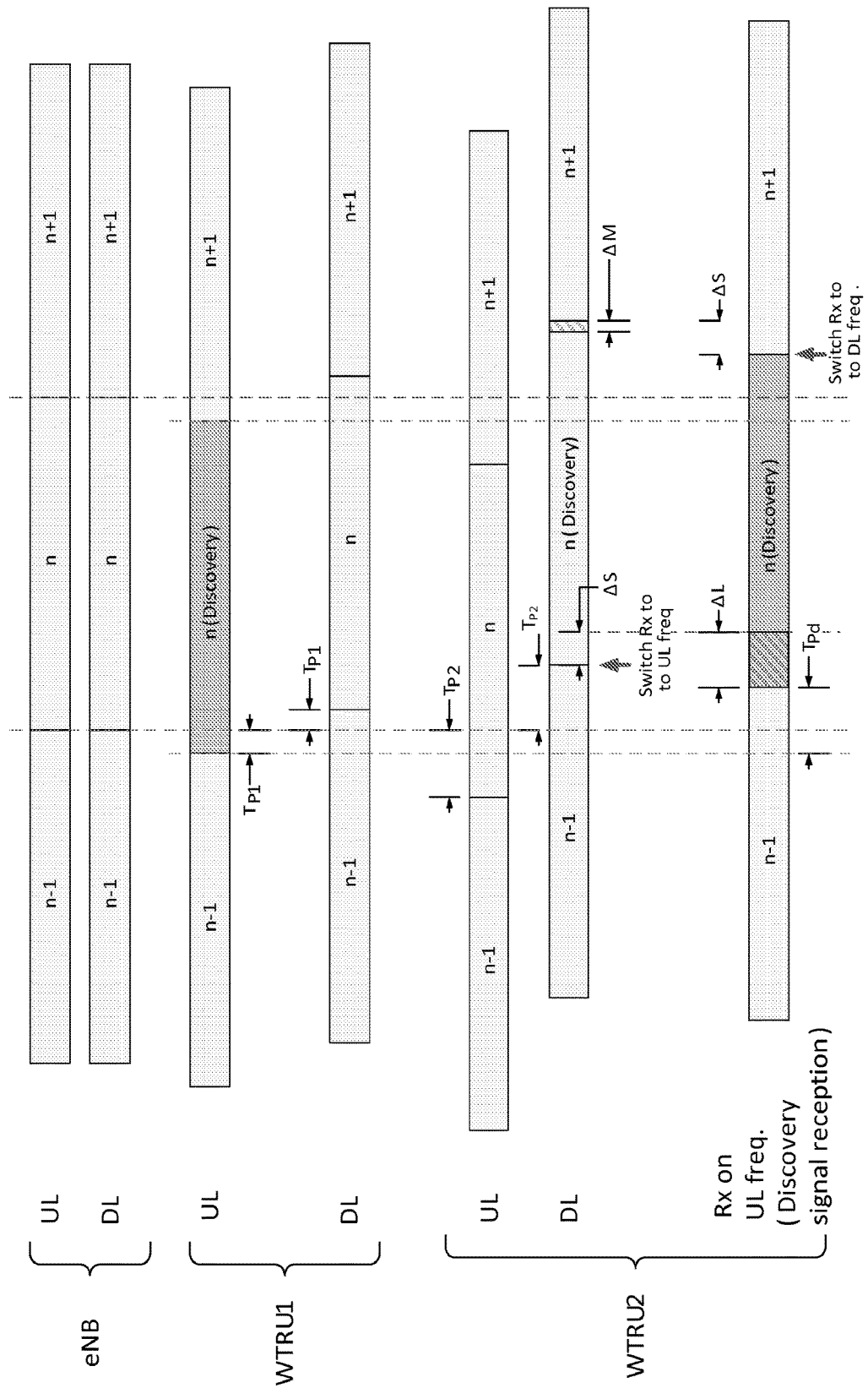
FIG. 14 illustrates an example timing related to the example topology of FIG. 13.

FIG. 13 illustrates an example cellular network based on time division multiplexing (TDM). FIG. 14 illustrates example timing related to the example topology network of FIG. 13.

As shown in FIG. 13, a discoverable WTRU (WTRU1) may transmit a discovery signal to a monitoring WTRU (WTRU2). It may be assumed that the subframes (n−1) and (n+1) are adjacent to the discovery subframe (n), which may be scheduled for network communications (discoverable and monitoring WTRUs). To avoid interference on subframe (n+1), it may be assumed that the discoverable WTRU may use its uplink (UL) timing for the discovery signal.

The terminology used herein may include, for example, $R_c$, the cell radius/range, $R_d$, the discovery radius and/or range, $T_{P1}$, the propagation delay between the eNB and WTRU1, $T_{P2}$, the propagation delay between the eNB and WTRU2, and $T_{Pd}$, the propagation delay between WTRU1 and WTRU2. The delay spread may be a part of the propagation delay. The terminology may further include, for example, $\Delta S$, the frequency switching latency (downlink (DL) to UL frequency or UL to DL frequency), $\Delta L$, the receiver (Rx) corrupted time at the start of discovery signal, and $\Delta M$, the Rx corrupted time at the end of the discovery signal. If a dedicated transceiver is used for the discovery signal, the value of $\Delta S$ may be null.

As illustrated in the FIG. 14, the signal corruption impact may be computed using the following equations:

$$\Delta L = \Delta S + T_{P1} + T_{P2} - T_{Pd} \qquad (5)$$

$$\Delta M = \Delta S + T_{Pd} - T_{P2} - T_{P1} \qquad (6)$$

In equation (5), as $T_{O1}$ increases, WTRU1 may send its discovery signal (e.g., on its UL timing) earlier, e.g., during the reception of subframe (n−1) by WTRU2. As $T_{P2}$ increases, WTRU2 may receive its DL subframe later. This may result in WTRU2 having less time to switch on UL frequency and receive the discovery signal. The switching latency $\Delta S$ may be added to the reception delay. The propagation delay between WTRU1 and WTRU2, $T_{Pd}$, may compensate the three other quantities, as it may delay the arrival of the discovery signal at WTRU2.

In equation (6), $T_{Pd}$ may delay the end of the discovery signal reception. $\Delta S$ may be used for correct reception of DL subframe (n+1) on the DL frequency. $T_{P1}$ may advance the discovery signal transmission and the end of its reception. $T_{P2}$ may delay the arrival of DL subframe (n+1) at WTRU2 and may provide more time to complete reception of the discovery signal reception (or for the start of DL subframe (n+1) reception). For WTRUs attached to the same cell, $T_{Pd}$ may be bounded by $(T_{P1}+T_{P2})$. $\Delta L$ may be greater than or equal to $\Delta S$, and/or, $\Delta M$ may be less than or equal to $\Delta S$.

Figure 15:
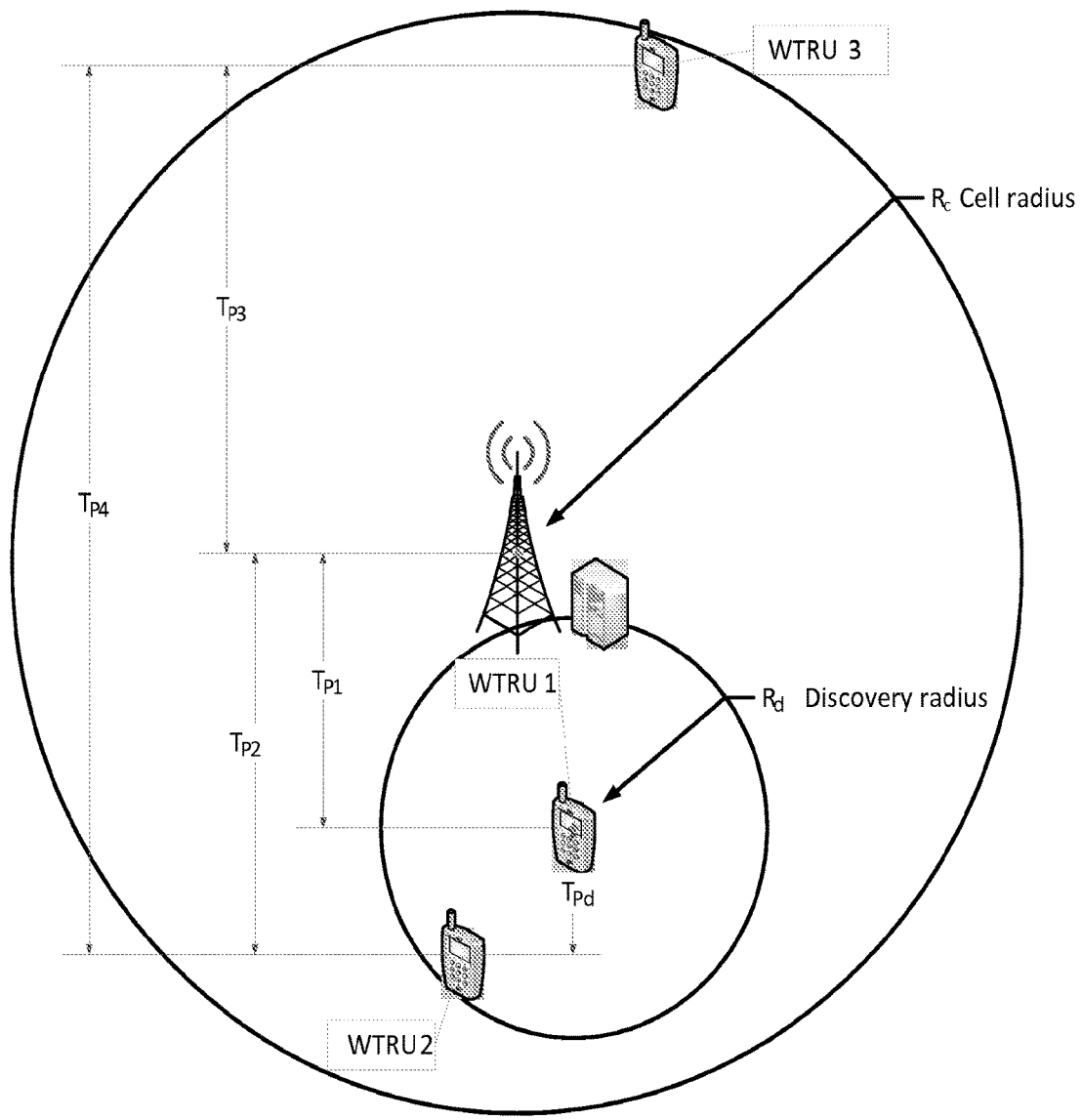
FIG. 15 illustrates an example topology using frequency division multiplexing (FDM).
Figure 16:
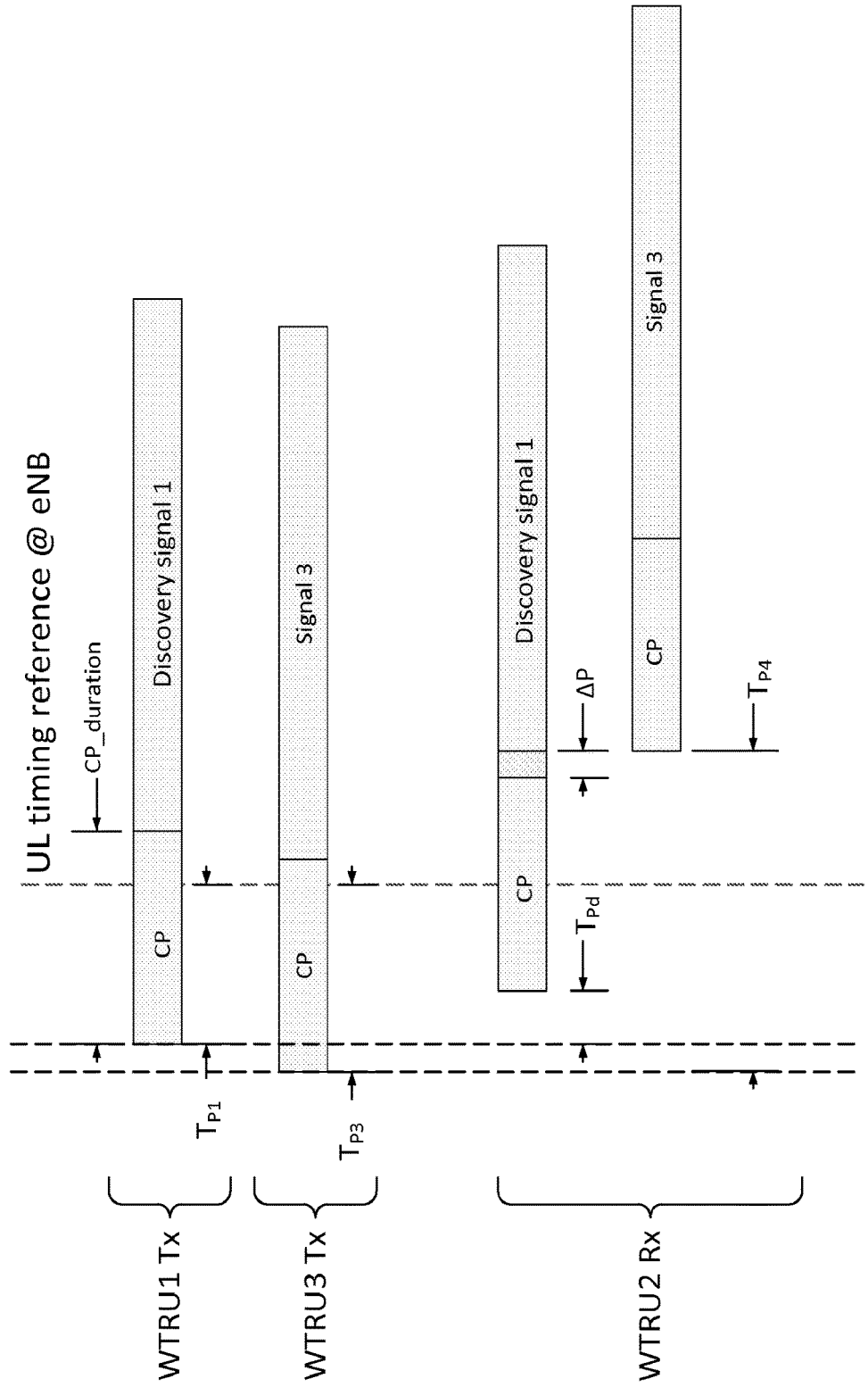
FIG. 16 illustrates an example timing related to the example topology of FIG. 15.

FIG. 15 illustrates an example topology based on frequency division multiplexing (FDM). FIG. 16 illustrates example timing related to the example topology network of FIG. 15. As illustrated in FIGS. 15 and 16, $T_{pi}$ may be the propagation time values for each WTRU, WTRUi.

As illustrated in FIG. 16, $\Delta P$ may represent the orthogonality loss between two FDM signals (e.g., the signal section outside the cyclic prefix of both signals) and may be computed by equation (7):

$$\Delta P = T_{P4} - T_{Pd} + T_{P1} - T_{P3} - \text{CP\_duration} \qquad (7)$$

For WTRUs attached to the same cell, $T_{Pd}$ may be bounded by $(T_{P2}+T_{P3})$. The equation (7) may become:

$$\Delta P \leq T_{P1} + T_{P2} - T_{Pd} - \text{CP\_duration} \qquad (8)$$

A worst case may appear when $T_{Pd}$ may be approximately equal to 0. As compared to the network case (where the receiver may be at the cell center), the maximum propagation time $T_{P4max}$ may be doubled so that the usual LTE cyclic prefix duration may be too short.

The LTE reference signals may be, for example, based on Zadoff-Chu sequences. A Zadoff-Chu (ZC) sequence of length $N_{ZC}$ may be defined as:

$$x_u(m) = \begin{cases} e^{-j\frac{\pi u m^2}{N_{ZC}}} & \text{when } N_{ZC} \text{ is even} \\ e^{-j\frac{\pi u m(m+1)}{N_{ZC}}} & \text{when } N_{ZC} \text{ is odd} \end{cases} \quad m = 0, 1, \ldots, (N_{ZC} - 1) \qquad (9)$$

where u, the sequence root, may be relatively prime to $N_{ZC}$ (e.g., when the common divisor of u and $N_{ZC}$ may be 1).

For a fixed u, a ZC sequence may have a periodic auto-correlation property (e.g., the periodic auto-correlation may be zero for time shifts other than zero). For different u, ZC sequences may not be orthogonal, but may exhibit low cross-correlation. If the sequence length $N_{ZC}$ is selected as a prime number, there may be $(N_{ZC}-1)$ different sequences with periodic cross-correlation of $1/\sqrt{N_{ZC}}$ between any two sequences, regardless of time shift. A set of orthogonal signals may be generated by defining cyclic time shifts of the same ZC sequence. This approach may be used in LTE networks.

Figure 17:
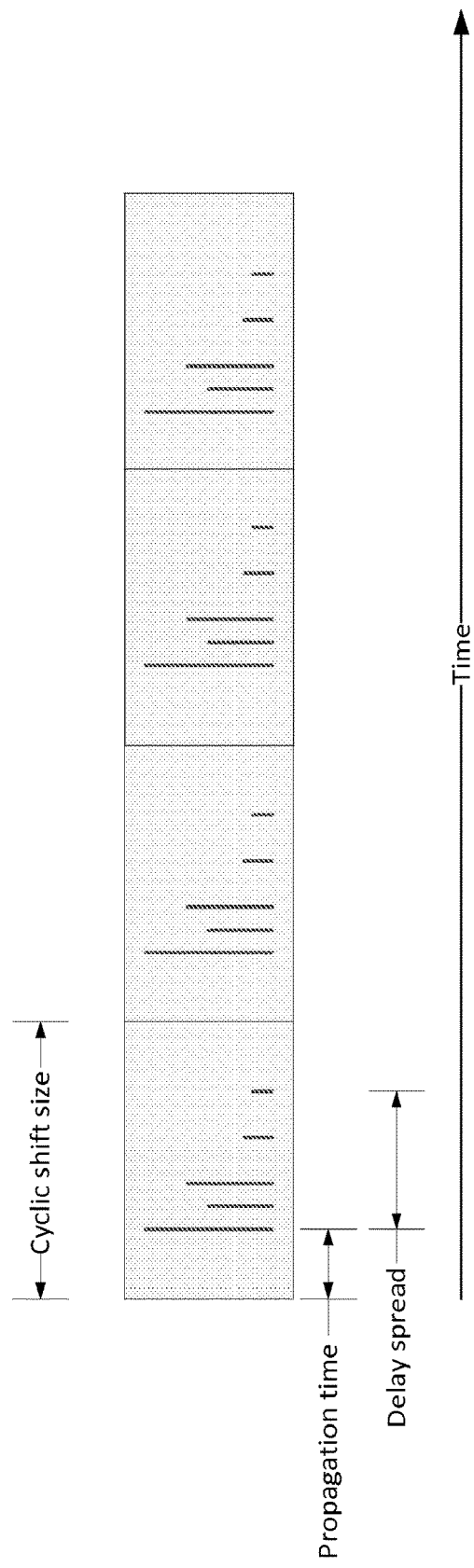
FIG. 17 illustrates an example cyclic shift dimensioning in the case of example code division multiplexed (CDM) signals.

As illustrated in FIG. 17, the propagation time difference (including delay spread) between two CDM signals may be lower than the cyclic shift size, e.g., to maintain the orthogonality. For the topology described in FIG. 15, the cyclic shift size ($\Delta CS$) minimum value may be restricted as provided by equation (10):

$$\Delta CS > T_{P1max} + T_{P2max} \qquad (10)$$

The restriction of the cyclic shift size may impact the maximum number of orthogonal signals available for a given ZC sequence size.

The timing procedures illustrated in FIGS. 14 and 16 may present challenges, including how the discovery signal reception corruption (e.g., generated by propagation time and switching latency), and/or the signal orthogonality loss (discovery and network) (e.g., generated by propagation time and multiplicity of synchronization references), may be avoided or minimized.

If FDM multiplexing between network communications and discovery signals is used, a near-far effect may be experienced by the eNB receiver for discoverable WTRUs close to the eNB. The maximum transmit power of discovery signals at a WTRU may be reduced based on the WTRUs distance from the eNB to preserve the correct reception of network communications. This may result in unfair discovery ranges based on the WTRU location.

The level of interferences at the cell edge may be much higher than at its center. Even if transmit power of a WTRU is higher at the cell edge, the signal to interference plus noise ratio (SINR) of the discovery signal, as seen by monitoring WTRUs, may be lower.

The power control procedures may present challenges, including the handling of discovery signal interferences on the network communications (e.g., the near-far effect that may result by the eNB reception), and/or to ensure fair and pre-determined ranges of the discovery signals.

The term "device" may, for example, refer to a wireless transmission/reception unit, such as a WTRU, a client, a network adapter, and the like. The term "device" may refer to fixed or mobile relays, femtocells, small cells, and Home eNB's, for instance, in circumstances when these nodes behave according to rules similar to that of a WTRU.

The term "network" may, for example, refer to an element or function of a wireless network infrastructure that may have the capability of controlling transmission and/or reception of devices (e.g., WTRUs), or may transmit signals used for reference by devices. Examples of network elements may include an eNB, MME, S-GW, and the like. The term "network" may refer to a device that may have a network capability in a context. For instance, in some public safety applications it may be possible that a device may take a network role for certain functionalities, e.g., providing a synchronization reference.

Figure 20:
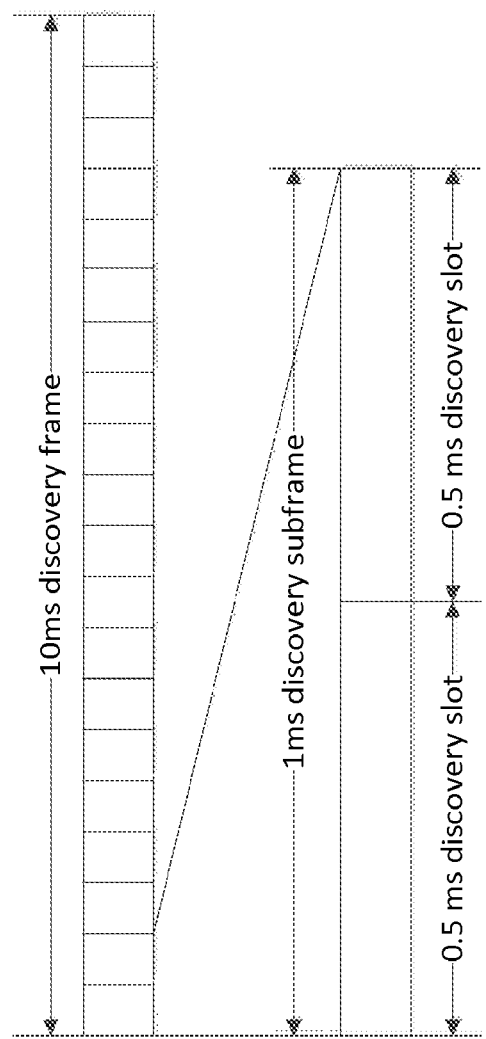
FIG. 20 illustrates example discovery radio frame(s).

Methods related to discovery signal timing may be provided. The methods may be performed by a transmitting WTRU, a discoverable WTRU, a receiving WTRU, and/or a monitoring WTRU. The discovery signal transmission and reception and D2D communications may take place following a discovery frame. In the context of LTE, the discovery frame may last 10 ms, and may be divided into 10 1 ms discovery subframes. A discovery subframe may include 2 discovery slots. The relation between the discovery frame, discovery subframes and discovery slots is illustrated in FIG. 20.

The WTRU may or may not simultaneously transmit a conventional signal in a conventional uplink subframe and a discovery or a D2D communication signal in a discovery subframe. The WTRU, under network coverage, may be configured to use the downlink radio frame (e.g., from the eNB to which it is connected to or camped), as a reference for the discovery frame timing.

Figure 21:
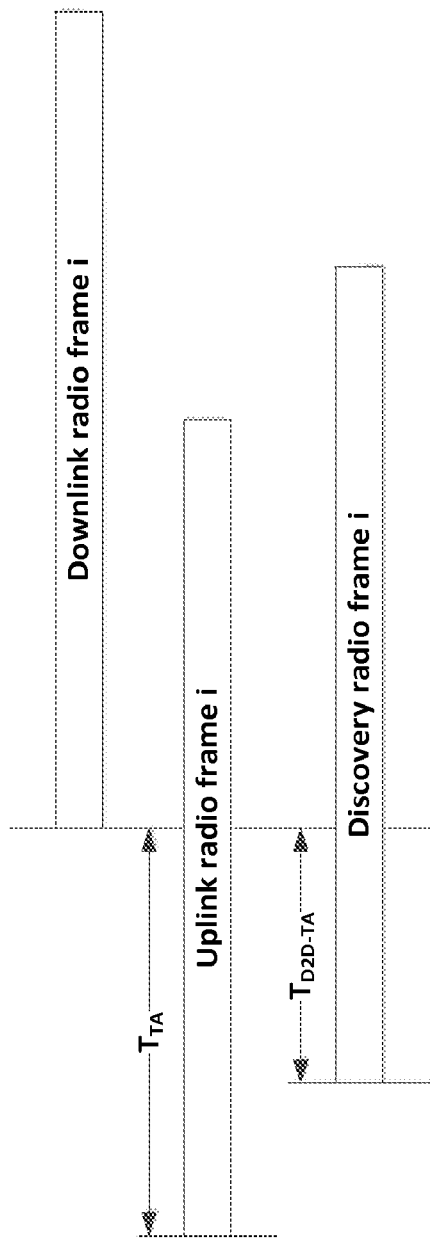
FIG. 21 illustrates example discovery radio frame time alignment.

The discovery frame timing may be determined. The WTRU may be configured to apply a timing advance to the discovery frame (e.g., a D2D timing advance, "D2D-TA"). FIG. 21 illustrates the timing of the discovery radio frame with respect to the timing of the downlink radio frame and the timing of the conventional uplink radio frame from the WTRU's point of view. In FIG. 21, $T_{TA}$ may represent the time alignment (e.g., in seconds) for the uplink radio frame, and $T_{D2D-TA}$ may represent the time alignment (e.g., in seconds) for the discovery radio frame.

The WTRU may be configured to determine the timing advance to the discovery frame (e.g., the value of the D2D-TA ($T_{D2D-TA}$)). For example, the WTRU may be configured to determine the value of the D2D-TA via explicit configuration. The WTRU may be configured explicitly, for example via RRC signaling, with a specific value for D2D-TA. The value of the D2D-TA may be fixed in the specifications. The WTRU may receive a D2D-TA configuration explicitly from another WTRU, for example, via a direct WTRU-to-WTRU (e.g., D2D) communication link.

For example, the WTRU may be configured to determine the value of the D2D-TA via implicit configuration. The WTRU may be configured to determine the value of the D2D-TA for example based one or more other implicit parameters. The WTRU may be configured to determine that the discovery radio frame may be aligned to the uplink radio frame (e.g., $T_{D2D-TA}=T_{TA}$). The WTRU may be configured to determine that the discovery radio frame may be aligned to the downlink radio frame (e.g., $T_{D2D-TA}=0$). The WTRU may be configured to determine that the discovery radio frame may be aligned to the uplink radio frame with an additional offset (e.g., $T_{D2DOffset}$) that may be fixed in the specifications or dynamically configured by higher layers. For example, the D2D-TA value may be obtained as $T_{D2D-TA}=T_{TA}+T_{D2DOffset}$.

The WTRU may determine the value of D2D-TA, for example, based on the WTRU state. The WTRU may determine that when the WTRU has no valid timing advance (e.g., the WTRU is not in connected mode, or its timing advance validity timer has expired) the discovery frame timing may be aligned to the downlink frame timing (e.g., $T_{D2D-TA}=0$). The WTRU may determine that when the WTRU has a valid timing advance, the discovery frame timing may be aligned to the uplink radio frame timing (e.g., $T_{D2D-TA}=T_{TA}$).

For example, the WTRU may be configured to determine the value of the D2D-TA based on cell configuration and/or WTRU measurements. The WTRU may be configured to determine the value of the D2D-TA for example based on one or more WTRU measurements.

The WTRU may use the downlink radio frame as a reference and may determine the value of $T_{D2D-TA}$ from that reference point. The WTRU may determine an offset relative to the uplink radio frame timing $T_{D2DOffset}$. For simplicity, the determination is described in the context where the WTRU determines the timing offset relative to the downlink radio frame. The method also applies to determining an offset relative to the uplink radio frame timing. For example, the WTRU may use one or more of the measurements or approaches in any order or combination to determine the discovery radio frame timing ($T_{D2D-TA}$).

The WTRU may determine the value of $T_{D2D-TA}$ based on cell-related parameters signaled on the SIBs. The WTRU may determine the value of $T_{D2D-TA}$ based on the PRACH configuration index. More specifically, the WTRU may be configured with a table associating a set of one or more fixed $T_{D2D-TA}$ values to a corresponding set of PRACH configuration parameters. The WTRU may determine the value of $T_{D2D-TA}$ by using the PRACH preamble format as an index in this pre-configured table.

The WTRU may be configured to determine the value of $T_{D2D-TA}$ based on the frame structure. For example, the WTRU may be configured for a special value of $T_{D2D-TA}$ or a special offset for frame structure 1 and another value for frame structure 2 (TDD).

The WTRU may be configured to determine the value of $T_{D2D-TA}$ based on the cyclic prefix used in the cell. For example, the WTRU may be configured for a special value of $T_{D2D-TA}$ or a special offset for normal cyclic prefix and another value for extended cyclic prefix.

The WTRU may be configured to determine the value of $T_{D2D-TA}$ for example based on one or more pathloss measurements. For example, the WTRU may determine the difference in pathloss between the two closest cells and determine an adjustment to $T_{D2D-TA}$ based on the pathloss differential.

The WTRU may be configured to determine the value of $T_{D2D-TA}$ based on the receive downlink frame timing difference between one or more cells (for example using the Reference signal time difference (RSTD) measurement). For example, the WTRU may determine the difference in reception timing between the two closest cells and determine the value of $T_{D2D-TA}$ based on the measured time difference.

The WTRU may be configured to use a different reference source for timing. For example, this approach may be used in the context where the WTRU is not under network coverage. This approach may be used for direct WTRU communications. These example methods may also be applicable to determine the WTRU downlink radio frame or uplink radio frame timing.

In an example, the WTRU may be configured to determine the discovery radio frame timing based on a GNSS measurement. The WTRU may be configured to determine the discovery radio frame based on the GPS timing, for instance. The WTRU may be pre-configured (e.g., via its subscription or its USIM or via an application layer configuration) to align its discovery radio frame timing on a specific subset of geo-stationary satellites.

The WTRU may be configured to determine the discovery radio frame timing based on another WTRUs discovery radio frame. The WTRU may be configured to monitor for discovery signals and may be configured to align its discovery radio frame to a selected WTRU synchronization. The WTRU may be configured to select the source for timing reference based on received signal power. The WTRU may be configured to select the source for timing reference based on the signal content or characteristic (e.g., signal root sequence or cyclic shift).

Operations may change, for example, from a subframe where conventional operations are taking place (e.g., communications with eNB) to a subframe where D2D related operations are taking place (e.g., transmission/reception of discovery signal, D2D communications) and vice-versa.

Due to propagation delay, different WTRU positions, and the different time alignment between WTRUs in a cell, for a receiving WTRU, the uplink radio frame timing of another transmitting WTRU may be unaligned with its uplink or downlink radio frame. This difference in alignment in D2D operations may be problematic. For example, the misalignment inter-subframe interference due to the overlap between a D2D signal and a conventional signal belonging to different subframes, and/or less of OFDM orthogonality leading to additional interference. To mitigate these potential issues, the WTRU may be configured with a discovery frame timing. The WTRU may perform actions related to changes of mode of transmission/reception to and from a discovery subframe.

Figure 22:
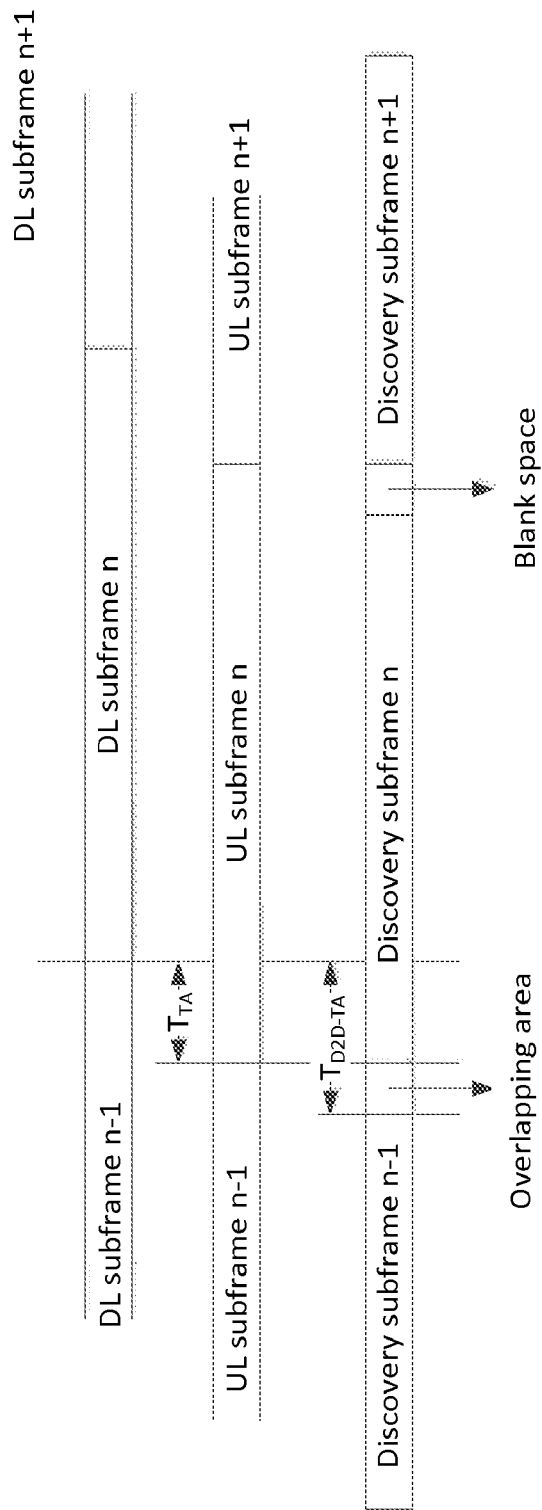
FIG. 22 illustrates example overlapping and blank areas in discovery subframe(s).

For example, the D2D transmission may take place on the same frequency as the uplink transmission in FDD or in an uplink subframe in TDD operations. The discovery subframe, if not time-aligned to the uplink subframe, may overlap with the adjacent uplink subframe. For example, if the difference between $T_{D2D-TA}$ and $T_{TA}$ is positive as illustrated in FIG. 22, the discovery subframe #n may overlap in time with the uplink subframe #n−1. As shown in FIG. 22, discovery subframe #n may not overlap with uplink subframe #n+1 leaving a blank space between the time the WTRU transmits discovery subframe #n and the time the WTRU transmits uplink subframe #n+1.

Figure 23:
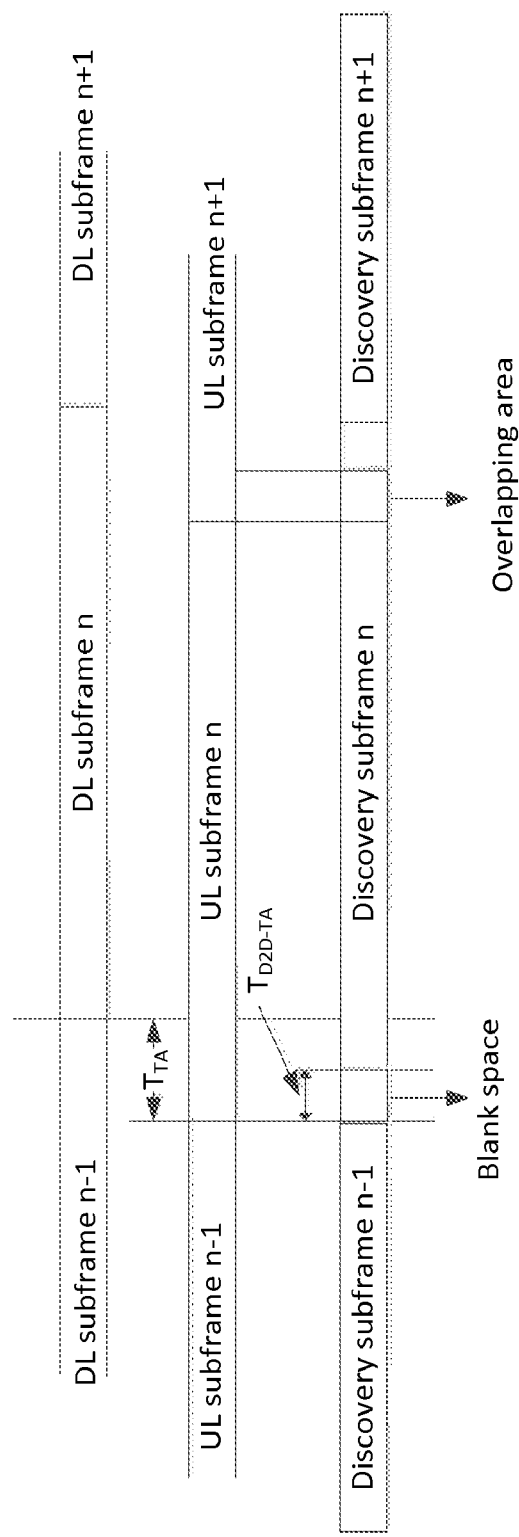
FIG. 23 illustrates example overlapping and blank areas in discovery subframe(s).

When the $T_{D2D-TA-TTA}$ difference is negative as illustrated in FIG. 23, the discovery subframe #n may overlap in time with the uplink subframe #n+1. As shown in FIG. 23, discovery subframe #n may not overlap with uplink subframe #n−1 leaving a blank space between the time the WTRU transmits uplink subframe #n−1 and the time the WTRU transmits discovery subframe #n.

Overlapping transmissions may be reduced or avoided. The WTRU may be configured to not transmit the last k OFDM symbols of the uplink subframe preceding transmission of a discovery. More specifically, and referring to FIG. 22, the WTRU may be configured to avoid transmitting the last k OFDM symbols of uplink subframe #n−1, when the WTRU is configured to transmit on the discovery subframe #n.

The value of k may be configured by higher layers, or the WTRU may determine the value of k by rounding up to the next OFDM symbol time the difference in timing alignment values between $T_{TA}$ and $T_{D2D-TA}$. The time alignment difference may be quantized and expressed in integer numbers of OFDM symbols.

In an example, the WTRU may be configured to not transmit the SRS when it scheduled in the last OFDM symbol of an uplink subframe preceding transmission of a discovery subframe. Reducing the PUSCH and PUCCH by one OFDM symbol when SRS is transmitted may be applied even if the SRS is not being transmitted.

The PUSCH transmission on the uplink subframe may be adjusted to a smaller number of OFDM symbol, for example, by puncturing the coded bits, or by reducing the transport block size according to the reduced size subframe. PUCCH transmission may be adjusted to a smaller number of OFDM symbol, for example, by puncturing the coded bits, or by reducing the transport block size according to the reduced size subframe.

The WTRU may be configured to refrain from transmitting in the discovery subframe during the overlapping period. Priority may be given to the conventional uplink transmission. The WTRU may be configured to not transmit the discovery subframe during the overlapping period and begin transmission immediately after the overlapping period has ended. The WTRU may be configured to determine a number of OFDM symbols associated to the overlapping period (e.g., by rounding up the difference in time advanced to the next OFDM symbol time duration) and may not transmit the first OFDM symbols of the discovery subframe.

The WTRU may be configured with a discovery subframe where the first part of the special subframe may include a guard period of a fixed value (e.g., expressed in an integer number of OFDM symbols). The WTRU may be configured to use the discovery subframe when changing from a conventional uplink subframe to a discovery subframe. The WTRU may be configured with a discovery subframe with a predefined number of OFDM symbols reserved (e.g., not transmitted) at the beginning and/or end of the special discovery subframe.

While the methods/approaches are described in the context of a positive difference between $T_{D2D\text{-}TA}$ and $T_{TA}$, they may be applicable in a context of negative difference between $T_{D2D\text{-}TA}$ and $T_{TA}$, by appropriately changing the part of the subframe where overlapping may occur.

When the WTRU is configured to receive discovery signals and/or on the UL frequency or in the UL subframe in TDD operations, the WTRU may be configured to determine when to start and/or stop monitoring the discovery signals or the D2D communications. The WTRU to determine and/or adjust a discovery signal power. For example, let $P_{DISC}(i)$ denote the discovery signal power transmitted by the WTRU, where i may represent an index. The index may correspond, for example, to one or more of, a frame number, a subframe number, a discovery resource index (subframe, symbol, etc), or a discovery signal sequence index. To guarantee quality of service and minimize interference to the network or to other WTRUs a discoverable WTRU may be configured to operate using a minimum and/or maximum power limit for a discovery signal. For example, the minimum and maximum power may be related to minimum and maximum discovery performances or any proximity criteria (QoS, range, success rate in a given context, etc).

The WTRU may be configured to limit the discovery signal power (e.g., $P_{DISC}(i)$), for example, by a minimum discovery signal power (e.g., $P_{MIN,d}$). The WTRU may determine the value of $P_{MIN,d}$ using one or a combination of the following. The WTRU may receive the value of $P_{MIN,d}$ from the network for example via PHY, MAC or RRC signaling. The WTRU may determine the value of $P_{MIN,d}$ for example via a configuration transmitted on the SIBs. The WTRU may determine the value of $P_{MIN,d}$ based on the last transmission power for data or control network channel. For example, $P_{MIN,d}$ may correspond to the value of the last PUCCH transmitted. The WTRU may determine the value of $P_{MIN,d}$ for example based on other combination of parameters.

When configured with a minimum discovery signal power, the WTRU may be configured to not decrease the discovery signal power below this limit. For example, when the WTRU determines that the discovery signal power after a power update will become smaller than the minimum discovery signal power limit, the WTRU may perform one or more of the following, in any order or combination. The WTRU may set the discovery signal power to the minimum discovery signal power value (e.g., $P_{DISC}(i)=P_{MIN,d}$). The WTRU may halt accumulation of negative TPC commands. The WTRU may accumulate negative TPC commands as in normal operations but the WTRU may be configured to not apply the TPC commands to the discovery signal power update. More specifically, the WTRU may set the discovery signal power to the minimum discovery signal power (e.g., $P_{DISC}(i)=P_{MIN,d}$) and store in a virtual power value (e.g., $P_{DISC\_V}(i)$) the results from the TPC commands accumulations. The WTRU may apply the TPC commands received to $P_{DISC\_V}(i)$, thereby maintaining a virtual transmitted power. The WTRU may be configured to set the value of the discovery signal power to $P_{DISC\_V}(i)$ when the latter becomes higher than $P_{MIN,d}$ (e.g., when $P_{DISC\_V}(i) > P_{MIN,d}$, then $P_{DISC}(i)=P_{DISC\_V}(i)$). The WTRU may send a report to the network indicating that $P_{MIN,d}$ has been reached. This report may be transmitted through PHY, MAC or RRC signalling. The WTRU may be configured to transmit the report only after the minimum discovery power has been used for a configured amount of time (e.g., time-to-trigger). The report may include a power increase request. The WTRU may halt the discovery process and stop transmitting discovery signals. The WTRU may report this event to higher layers (e.g., to the network, application layer, etc.) The WTRU may be configured to release the resources associated to the discovery process/discovery signal transmission and report the even to the network. The WTRU may wait for a configured amount of time and request a new discovery process to the network. The WTRU may be configured to begin monitoring one or more configured D2D high interference (HI) indicator, for example transmitted by the network (e.g., SIB, etc). Upon a determination that the D2D HI is no longer indicating the presence of high interference, the WTRU may transmit a new discovery process request.

The transmission power of a discovery signal may be limited by a maximum discovery signal power $P_{MAX,d}$. In an example, the maximum discovery signal power may be limited to avoid interference with the eNB of serving or adjacent cells or to not interfere with other discovery signals. The WTRU may determine the value of $P_{MAX,d}$. The WTRU may receive the maximum discovery signal power configuration from the network, for example via RRC or other (e.g., MAC, PHY, SIB, etc) signaling. The WTRU may set the maximum discovery signal power value to $P_{CMAX}(i)$, the maximum power defined for a WTRU data or control network channel. The WTRU may determine the value of the maximum discovery signal power for example as a function of the last transmission power for data or control. For example, $P_{MAX,d}$ may be derived from the last PUSCH power applied by the WTRU.

A power update may not increase the discovery signal power above this limit. When a WTRU computes a transmit power reaching this value, the WTRU may apply one or more procedures. For example, the WTRU may set the discovery signal power to the maximum discovery signal power value (e.g., $P_{DISC}(i)=P_{MAX,d}$). The WTRU may halt accumulation of positive TPC commands. The WTRU may accumulate positive TPC commands as in normal operations but the WTRU may be configured to not apply the TPC commands to the discovery signal power update. More specifically, the WTRU may set the discovery signal power to the maximum discovery signal power (e.g., $P_{DISC}(i)=P_{MAX,d}$) and further store in a virtual power value (e.g., $P_{DISC\_V}(i)$) the results from the TPC commands accumulations. The WTRU may apply the TPC commands received to $P_{DISC\_V}(i)$, thereby maintaining a virtual transmitted power. The WTRU may be configured to set the value of the discovery signal power to $P_{DISC\_v}(i)$ when the latter becomes lower than $P_{MAX, d}$ (e.g., when $P_{DISC\_v}(i) < P_{MAX, d}$, then $P_{DISC}(i)=P_{DISC\_v}(i)$). The WTRU may send a report to the network indicating that $P_{MAX, d}$ has been reached. This report may be transmitted through PHY, MAC or RRC signalling. In an example, the WTRU may be configured to transmit the report only after the maximum discovery power has been used for a configured amount of time (e.g., time-to-trigger). The WTRU may start to scan a network message indicating the procedure to follow (e.g., stop the procedure or increase the power by X dB). The WTRU may start a counter and stop the procedure if it did not receive any network message when the counter reached a given value. The WTRU may halt the discovery process and stop transmitting discovery signals. The WTRU may report this event to higher layers (e.g., to the network, application layer, etc.) The WTRU may be configured to release the resources associated to the discovery process/discovery signal transmission and report the even to the network. The WTRU may wait for a configured amount of time and request a new discovery process to the network.

A WTRU reaching $P_{MIN, d}$ and/or $P_{MAX, d}$ may be configured to transmit a scheduling adjustment message for its discovery signal. For example, the WTRU may request a bandwidth extension or reduction or a change in the number of discovery signal repetition factor.

The WTRU may determine the discovery signal transmission power. The WTRU may determine the discovery signal transmission power based on one or more parameters or factors, in any order or combination.

The transmission power of a discovery signal may be a function of a nominal power (e.g., $P_{N\_DISC}$) and one or more discovery signal power adjustment factors (e.g., $\Delta_j$). For example the WTRU may calculate the discovery signal transmission power (e.g., $P_{DISC}(i)$) based on the following equation (expressed in dBm):

$$P_{DISC}(i)=\max(P_{MIN,d},\min(P_{MAX,d},P_{N\_DISC}+\Sigma\Delta_j)) \quad (11)$$

The selection of the discovery signal power adjustment factors (e.g., power mode) may be based on discovery WTRU role and/or discovery type of resource.

The WTRU may determine the nominal power $P_{N\_DISC}$. For example, the WTRU may be configured with a fixed $P_{N\_DISC}$ value for example in the specifications. The WTRU may be configured dynamically/semi-statically with a $P_{N\_DISC}$ value, for example, via the network. The configuration may be signaled via RRC signaling (e.g., via dedicated signaling or via the SIB), MAC-layer signalling (e.g., via a MAC CE), and/or PHY (e.g., through PDCCH for example using a new DCI format with explicit power indication).

The WTRU may determine the value of $P_{N\_DISC}$ for example based on the current power applied to a network channel or to a signal such as PUSCH, PUCCH, SRS, PRACH, etc. For example, $P_{N\_DISC}$ may be derived from the last SRS power applied by the WTRU.

The nominal power may be specific to the network, cell, WTRU and/or to discovery process. Its value definition may be associated with a validity period. For example, the WTRU may be configured to determine a new value of $P_{N\_DISC}$ upon change of best cell, or after a timer has expired. The nominal power may be associated with a discovery process, and the WTRU may be configured to acquire it at the start of a new discovery process.

The nominal power may be provided via, and/or may refer to a reference signal bandwidth. For example, $P_{N\_DISC}$ may refer to the power for a resource block (RB), or a subcarrier, and/or a predefined value. The WTRU may be configured to adjust the transmit power relative to the discovery signal bandwidth (e.g., by scaling the nominal power by the ratio of discovery signal bandwidth to this reference bandwidth). This may also be achieved via one of the factors $\Delta_j$.

More than one nominal value may be defined such that the WTRU may select one of them for the discovery signal. The WTRU may select a nominal power value based on a discovery service class, for example corresponding to a QoS, a range, or any proximity criteria defined for the on-going discovery process. The WTRU may be configured with multiple, such as three, values of nominal power, for example associated to a minimum, medium and maximum discovery range (e.g., corresponding to 3 different service classes). The nominal power values may include static parameters and/or dynamic parameters provided by the RRC.

The WTRU may determine the service class for example by reading the discovery process properties as configured by higher layers or by the application layer.

The WTRU may be configured with one or more discovery signal power adjustment factors (e.g., $\Delta_j$). The factors may be static/semi-static, computed by the WTRU or dynamically provided by the network through RRC (e.g., a SIB), MAC (e.g., a MAC CE) or PHY (e.g., through PDCCH) commands. They may be specific to the network, cell, WTRU or to discovery process. For example, the WTRU may be configured to determine a new value of one or more discovery signal power adjustment factors upon change of best cell, or after a timer has expired. In an example, one or more discovery signal power adjustment factors may be associated to a discovery process, and the WTRU may be configured to acquire it at the start of a new discovery process.

In an example, the WTRU may be configured with one or more cell-specific parameters associated with a discovery signal power adjustment factor via an additional IE in SIB2, for example. An IE such as the IE Discovery_ConfigCommon as a part of the RadioResourceConfigCommon IE in SIB2 may be used to carry the relevant information. The WTRU may be configured with other parameters associated to a discovery signal power adjustment factor via an IE such as Discovery_ConfigDedicated, received as part of the RRCConnectionSetup message.

Discovery signal power adjustment factors may be denoted as $\Delta j$, where each factor may be associated with a different index j.

The WTRU may determine a discovery signal power adjustment factor based on one or more discovery signal properties or characteristics. For example, the WTRU may determine the discovery signal power adjustment factor based on one or more of the following (in any order or combination), discovery signal format, discovery signal MCS, payload, discovery signal role, discovery signal bandwidth, and/or other factors.

The WTRU may be configured with one or more discovery signal format or type. The WTRU may determine the discovery signal format to use for a discovery process. In this context, the WTRU may determine the discovery signal transmission power $P_{DISC}(i)$ based on the discovery signal format. In an example, the WTRU may be configured with a discovery signal power adjustment factor for each of the discovery signal format configured. The WTRU may determine the value of the discovery signal power adjustment factor based on the discovery signal format.

The WTRU may be configured with one or more discovery signal properties such as MCS or number of bits in payload. In this context, the WTRU may determine the discovery signal transmission power $P_{DISC}$ (i) based on those properties. The WTRU may compute an MCS adjustment factor with $$\Delta_{j\_MCS} = \Delta_{MCS} = 10 \log 10(2^{BPRE \times Ks} - 1) \quad (12)$$

where, j_MCS may correspond to the (arbitrary) index for this discovery signal power adjustment factor, $\Delta_{MCS}$ may correspond to the discovery signal power adjustment factor for the discovery signal MCS, BPRE may correspond to the number of bits per resource element in the discovery signal, and Ks may correspond to an implementation factor taking into account the performance degradation in a WTRU receiver.

The WTRU may be configured with a discovery role (e.g., discoverable or monitoring). In this context, the WTRU may determine the discovery signal transmission power $P_{DISC}$ (i) based on its discovery role.

The WTRU may be configured with a discovery signal bandwidth. The discovery signal bandwidth may not be a dynamic factor. The WTRU may adjust $P_{DISC}$ (i) with an offset related to the signal bandwidth. For example, the offset may correspond to the bandwidth of the transmission expressed in one or a combination of, the number of signal resource blocks, the number of signal subcarriers and/or a multiple of the signal bandwidth used for $P_{N\_DISC}$ computation.

The WTRU may compute the discovery signal power adjustment factor to keep the discovery spectral power density constant independently of its bandwidth. For example, the WTRU may acquire a nominal power referenced to a specific signal bandwidth N. The WTRU may compute that the allocated discovery signal bandwidth is M times the reference bandwidth. The WTRU may apply a positive offset equal to 10 log 10(M) to the discovery signal power. The discovery signal power may be kept constant whatever is the signal bandwidth. A WTRU may be configured to not apply this factor.

The WTRU may use other parameters such as the repetition factor or frequency hopping mode to compute discovery signal power adjustment factor.

The WTRU may be configured to compute a path loss compensation adjustment factor to determine $P_{DISC}$(i). To carry out such path loss compensation, the WTRU may be configured to estimate a path loss to a reference signal, and apply the compensation to the transmitted signal.

The WTRU may be configured to estimate and use the path loss to the serving cell for path loss compensation purposes. This may ensure that the serving cell may monitor the discovery signal. The WTRU may be configured to estimate and use the path loss to another WTRU for path loss compensation purposes. This may ensure that a target WTRU receives the signal properly for communications purposes or for mutual discovery purposes. The WTRU may be configured by the network with a specific reference signal source (e.g., serving cell, other cell, other WTRU). For example, the signaling of reference signal source may be implicit, for example, based on specified rules (e.g., WTRU always use the serving cell or strongest cell as a reference signal for path loss compensation). The signaling may be explicit, for example, via RRC signaling. The reference signal source may be dynamically provided by MAC or PHY signalling (e.g., in the discovery grant DCI within PDCCH). The reference signal source may be received via a WTRU discovery signal, (e.g., detected by the WTRU).

The WTRU may be configured to partially compensate for the path loss. The WTRU may be configured with a fractional path loss compensation factor (a) to apply.

The WTRU may determine the actual path loss adjustment factor for example by using this formula (e.g., in dBm):

$$\Delta_{j\_PLC} = \Delta_{PLC} = \alpha \times (P_{DISC,Tx} - P_{DISC,Rx}) \quad (13)$$

where j_PLC may correspond to the (e.g., arbitrary) index for this discovery signal power adjustment factor, $\Delta_{PLC}$ may correspond to the discovery signal power adjustment factor for the path loss compensation, $P_{DISC, Tx}$ may correspond to the reference signal transmit power, and $P_{DISC, Rx}$ may correspond to the estimate of the reference signal received power measured at the WTRU. The WTRU may be configured with a value of the reference signal transmit power $P_{DISC, Tx}$, for example by using one or more of, static parameter, configured by RRC, and/or dynamically provided by physical layer signalling (e.g., in the discovery grant DCI within PDCCH).

The WTRU may be configured to determine the reference signal transmit power for example from a payload in carried as part of another WTRU discovery signal. The reference signal transmit power (e.g., another WTRU's discovery signal) may be embedded in the discovery signal (within the signal payload or determined implicitly based on the discovery signal properties). In an example of implicit discovery signal power indication, the discoverable WTRU may select the cyclic shift index or the sequence root of a Zadoff-Chu sequence based on a Tx power offset from a predefined nominal value (e.g., [−6, −3, 0, +3, +6] dB). The mapping table may pre-defined in the specifications or provided by higher layers. The WTRU may be configured to determine the discoverable WTRU discovery signal cyclic shift index and determine the transport power offset from the lookup table.

The WTRU may determine $P_{DISC, Rx}$ based on receive power measurements. For example, the WTRU may be configured to determine $P_{DISC, Rx}$ based on RSRP measurements on one or several iterations from the discovery signal. The WTRU may be further configured to use measurements filtered by higher layers.

The WTRU may determine the use of fractional or full path loss compensation based on the type of discovery resources that are used. In an example, the WTRU may be configured with a discovery grant corresponding to a code division multiplexing resource. The WTRU may be configured to apply full path loss compensation.

A WTRU may be configured to determine and apply a discovery signal power adjustment factor related to interference in its vicinity (e.g., $\Delta_{Interf}$). The adjustment factor may be determined such that discovery range may be relatively constant regardless of the WTRU location in a cell. The WTRU may use one or more of the following approaches to determine the interference-related discovery signal power adjustment, in any order or combination.

The WTRU may determine the amount of discovery signal power adjustment to apply based on measurements.

The WTRU may determine the adjustment factor based on the path loss measured from the serving eNB. For example, a higher path loss may be indicative of the WTRU being closer to the cell edge, and thus more susceptible to interference. The WTRU may be configured with a table mapping one or more path loss thresholds to corresponding adjustment factors. Table 2 is an example of a mapping between path loss measurements and corresponding discovery signal power adjustment. The values in the table (e.g., the set of PLx, where x is a pathloss measurement threshold index and the actual values of $\Delta_{Interf}$) may be populated, for example, via higher layers. In an example, the WTRU may be configured with one or more PL and $\Delta_{Interf}$ pair and be configured to interpolate the discovery signal power adjustment factor based on the measured PL measurement.

TABLE 2

Example path loss mapping table to discovery signal power adjustment

| Path loss measurement (PL) range | Discovery signal power adjustment factor ($\Delta_{Interf}$) |
|---|---|
| PL < PL1 | −6 dB |
| PL1 ≤ PL < PL2 | −3 dB |
| PL2 ≤ PL < PL3 | 0 dB |
| PL3 ≤ PL < PL4 | +3 dB |
| PL4 ≤ PL | +6 dB |

The WTRU may determine the adjustment factor based on the timing advance value from the serving eNB. For example, a higher timing advance may be indicative of the WTRU being closer to the cell edge, and thus more susceptible to interference. The WTRU may be configured with a table mapping one or more timing advance thresholds to corresponding adjustment factors. Table 3 is an example of a mapping between timing advance values and corresponding discovery signal power adjustment. The values in the table (e.g., the set of TAx, where x is a timing advance threshold index and the actual values of $\Delta_{Interf}$) may be populated for example via higher layers. In an example, the WTRU may be configured with one or more TA and $\Delta_{Interf}$ pair and be configured to interpolate the discovery signal power adjustment factor based on the TA value.

TABLE 3

Example timing advance mapping table to discovery signal power adjustment

| Timing advance range | Discovery signal power adjustment factor ($\Delta_{Interf}$) |
|---|---|
| TA < TA1 | −6 dB |
| TA1 ≤ TA < TA2 | −3 dB |
| TA2 ≤ TA < TA3 | 0 dB |
| TA3 ≤ TA < TA4 | +3 dB |
| TA4 ≤ TA | +6 dB |

The level of interferences may be estimated, e.g., based on the estimated WTRU location.

The WTRU may receive an adjustment factor from the network and apply it. The WTRU may receive one or more interference values from serving and/or adjacent cells. The WTRU may be configured to combine the interference values in a global interference value. The WTRU may be configured with a table mapping one or more interference value thresholds to corresponding adjustment factors. Table 4 is an example of a mapping between interference values and corresponding discovery signal power adjustment. The values in the table (e.g., the set of IVx, where x is an interference value threshold index and the actual values of $\Delta_{Interf}$) may be populated for example via higher layers. The WTRU may be configured with one or more interference value and $\Delta_{Interf}$ pair and be configured to interpolate the discovery signal power adjustment factor based on the interference value.

TABLE 4

Example interference value mapping table to discovery signal power adjustment

| Interference value range | Discovery signal power adjustment factor ($\Delta_{Interf}$) |
|---|---|
| IV < IV1 | −6 dB |
| IV1 ≤ IV < IV2 | −3 dB |
| IV2 ≤ IV < IV3 | 0 dB |
| IV3 ≤ IV < IV4 | +3 dB |
| IV4 ≤ IV | +6 dB |

Discovery signal power adjustment factor may be associated to the type of resource allocated to the discovery process. A WTRU may apply an adjustment factor based on the type of resource allocated to the discovery signal. The WTRU may be configured to determine this adjustment factor based on the discovery resource dynamicity, static, semi-static, dynamic. The WTRU may be configured to apply a specific adjustment factor for dynamic grants (as the control overhead associated to this type of signal may justify higher transmission power). The WTRU may be configured with a discovery signal embedded in a D2D communication subframe or not. The WTRU may be further configured with an adjustment factor for the embedded case and another adjustment factor for the non-embedded case.

The WTRU may be configured to determine a discovery signal power adjustment factor based on its current battery level. The WTRU may be further configured with a table mapping one or more battery level thresholds to corresponding adjustment factors. Table 5 is an example of a mapping between battery levels and corresponding discovery signal power adjustment. The values in the table (e.g., the set of BLx, where x is battery level threshold index and the actual values of $\Delta_{Interf}$) may be populated for example via higher layers. In an example, the WTRU may be configured with one or more battery level and $\Delta_{Interf}$ pair and be configured to interpolate the discovery signal power adjustment factor based on the battery level.

TABLE 5

Example battery level mapping table to discovery signal power adjustment

| Battery level range | Discovery signal power adjustment factor ($\Delta_{Interf}$) |
|---|---|
| BL < BL1 | −8 dB |
| BL1 ≤ BL < BL2 | −6 dB |
| BL2 ≤ BL < BL3 | −4 dB |
| BL3 ≤ BL < BL4 | −2 dB |
| BL4 ≤ BL | 0 dB |

The WTRU may be configured to determine and apply a discovery signal power adjustment factor related to one or more relevant WTRU capabilities. In an example, a WTRU may be configured to use its power class (e.g., its maximum output power) to determine a discovery signal power adjustment factor (e.g., a class 3 WTRU may set its discovery signal power may to its maximum power (23 dBm) minus a specific offset (e.g., 21 dB)). The WTRU with a relay capability may be configured to apply a positive discovery signal power adjustment factor.

The WTRU may be configured to determine and apply a discovery signal power adjustment factor related to the application running the discovery process. For example, discovery signal power adjustment factors may be used depending on the discovery application class, advertising, social networking, emergency, etc. The WTRU may be further configured with a table mapping one or more application classes to corresponding adjustment factors. Table 6 is an example of a mapping between application classes and corresponding discovery signal power adjustment. The values in the table may be populated, for example, via higher layers.

TABLE 6

Example application class mapping table to discovery signal power adjustment

| Application class | Discovery signal power adjustment factor ($\Delta_{App\text{-}class}$) |
|---|---|
| Emergency | +12 dB |
| Network offload | +3 dB |
| Advertising | 0 dB |
| Social networking | −3 dB |

The power for discovery signal may be dynamically controlled. The WTRU may determine a reference or initial power for a discovery signal, which may be adjusted. The WTRU may be configured, to receive this adjustment factor from an eNB, to receive this adjustment factor from another WTRU, and/or to compute the adjustment factor internally (e.g., in a power ramp up case).

The power for discovery signal may be adjusted, for example, via explicit signaling. A TPC command may be received. The adjustment factor(s) may be received from eNB. The WTRU may be configured to receive power updates related to a discovery process from the network through, RRC (e.g., through an SIB update), MAC (e.g., through a MAC Control Element), and/or PHY (e.g., through some specific DCI formats identified by a D2D RNTI). The adjustment factor(s) may be received from another WTRU.

The WTRU may be configured to receive power updates related to a discovery process from another WTRU through a control or data D2D channel. The WTRU may be configured to decode the power update from a discovery signal property. In an example, a monitoring WTRU may respond to a discoverable WTRU with a power update request for the next discovery signal transmission. The monitoring WTRU may be configured to use a SRS discovery signal. The monitoring and discoverable WTRUs may be configured with a table mapping one or more SRS cyclic shift indexes to corresponding power update requests. Table 7 is an example of a mapping between cyclic shift values and corresponding power update requests. The values in the table may be populated for example via higher layers.

TABLE 7

Example cyclic shift index mapping table to discovery signal power update request

| Discovery signal cyclic shift value | Power update request |
|---|---|
| −CS2 | −6 dB |
| −CS1 | −3 dB |
| 0 | 0 dB |
| CS1 | +3 dB |
| CS2 | +6 dB |

The WTRU may apply the power update assigned in a TPC command to a discovery signal reference power that may correspond to one or a combination of, a transmission power, a configured minimum power, and/or an initial power statically defined or provided by higher layers.

The WTRU may be configured to use to the transmission power $P_{DISC}(i)$ as reference power. The WTRU may be further configured to determine the power adjustment as follows:

$$P_{DISC}(i)=\text{Max}(P_{MIN,d},\text{Min}(P_{MAX,d},P_{DISC}(i)+f(i))) \quad (14)$$

where f(i) is the adjustment state of the discovery signal power control.

In an accumulation mode, the WTRU may be configured to determine f(i) as follows:

$$f(i)=f(i-1)+\delta(i-K) \quad (15)$$

In an absolute mode, the WTRU may be configured to determine f(i) as follows:

$$f(i)=\delta(i-K) \quad (16)$$

In (5A) and (6A), δ(i) may correspond to the power update command received by the WTRU at index i and K is an offset; i and K may correspond to one or more of, a frame number, a subframe number, a discovery resource index (e.g., subframe, symbol, etc), or a discovery signal sequence index. K may be defined based on the duplexing configuration or the TDD configuration. K may be equal or higher than 4 subframes to take into account the TPC decoding latency. The WTRU may be configured to select K according to the frame structure type and the special subframe configuration in the TDD case.

The WTRU may be configured to set f(0) to 0 or to a reference initial power. The WTRU may determine the parameters f(0), K as well as the TPC mode (e.g., accumulation or absolute). The determination may be based on a value statically defined for the network, configuration via RRC, and/or a dynamically provisioned value via MAC or PHY signalling (e.g., in the discovery grant DCI within PDCCH).

The WTRU may be configured to reset the accumulation of f(i) based on one or any combination of triggers, such as an explicit reset indication is provided by eNB, a plurality of WTRUs have been discovered, a counter value (e.g., in subframes or absolute time) has been reached, the WTRU has changed its serving cell, a new nominal power has been indicated by higher layers, the discovery signal type has been changed, and/or the discovery signal bandwidth has been changed.

In a power ramp up procedure, the WTRU may be configured to update the discovery signal transmission power $P_{DISC}$ as follows:

$$P_{DISC}(i)=\text{Min}(P_{powerRampingMax},P_{powerRampingRef}+\\ \text{FLOOR}(i/\text{powerRampingPeriod})*\text{powerRampingStep}) \quad (17)$$

where, $P_{powerRampingMax}$ may correspond to the maximum power, $P_{powerRampingRef}$ may correspond to the reference (e.g., initial) power, powerRampingPeriod may correspond to the update period, and powerRampingStep may correspond to the power increment value.

The WTRU may be configured to acquire the different parameters of the ramp-up procedure, such as $P_{powerRampingMax}$, $P_{powerRampingRef}$, powerRampingPeriod and powerRampingStep. The parameters may be statically defined, for example, by the network, configured by RRC, and/or dynamically provided by MAC or PHY signalling (e.g., in the discovery grant DCI within PDCCH).

The WTRU may be configured to set the reference power $P_{powerRampingRef}$ based on one or a combination of, a transmission power, a configured minimum power, and/or an initial power statically defined or provided by higher layers.

The WTRU may be configured to set the maximal power value $P_{powerRampingMax}$ based on one or a combination of, a transmission power, a configured maximum power, and/or a maximal power statically defined or provided by higher layers.

The WTRU may be configured to apply the parameter powerRampingPeriod in one or more of, a frame number, a subframe number, a discovery resource index (e.g., subframe, symbol, etc), and/or a discovery signal sequence index.

The WTRU may be configured to start a discovery signal power ramp up based on one or more of, when the WTRU transmits the first discovery signal of a discovery process, an explicit ramp up indication is provided by eNB, a counter value (in subframes or absolute time) has been reached, the WTRU changed its serving cell, a new nominal power has been indicated by higher layers, the discovery signal type has been changed, and/or the discovery signal bandwidth has been changed.

The WTRU may be configured to stop a discovery signal power ramp up based on one or any combination of triggers, such as the maximum power value of the ramp up process has been reached, an explicit stop indication is provided by eNB, a plurality of WTRUs have been discovered, a counter value (e.g., in subframes or absolute time) has been reached, and/or the WTRU receives a response from the monitoring WTRU.

At the ramp-up stop, the WTRU may keep the discovery signal at the same power during a period which may be defined based on one of any combination of, following a counter (e.g., subframes, discovery subframes or absolute time) started at the stop event, a maximum number or retransmissions (e.g., counter increase for every retransmissions or every x retransmissions), until an explicit reset indication from the network, the WTRU has changed its serving cell, and/or a new nominal power has been indicated by higher layers.

The WTRU may be configured to reset a discovery signal power ramp up based on one or any combination of triggers, such as an explicit reset indication is provided by eNB, a plurality of WTRUs have been discovered, a counter value (in subframes or absolute time) has been reached, the WTRU changed its serving cell, a new nominal power has been indicated by higher layers, the discovery signal type has been changed, and/or the discovery signal bandwidth has been changed.

The WTRU may perform single shot discovery. The WTRU may be configured, for example, statically, with discovery signal properties (e.g., a static and unique SRS signal on 24 RBs). The WTRU may be configured, for example, statically, with parameters $P_{MIN,d}$ and $P_{MAX,d}$. The WTRU may be configured, for example, statically, with adjustment factor $\Delta_1$ to $P_{N\_DISC}$ for X proximity criteria (e.g., [−3, 0, +3 dB] for minimum, medium and maximum discovery ranges).

The WTRU may scan (e.g., continuously) $P_{N\_DISC}$ (e.g., cell specific) in SIB2 and apply the latest value. A WTRU application may request to run a discovery process with maximum range. The WTRU may transmit a discovery process request to the network (e.g., through RRC signalling). The WTRU may receive the network response to this request (e.g., through RRC signalling) including a parameter indicating that autonomous interference compensation is allowed for this process. The WTRU may select the adjustment factor $\Delta_1$ according to the proximity criteria provided by the discovery application. The WTRU may measure the interference level in its local environment. The WTRU may determine an adjustment factor $\Delta_{Interf}$ using a mapping table. The WTRU may compute the discovery signal transmission power as follows:

$$P_{DISC}(i) = \text{Max}(P_{MIN,d}, \text{Min}(P_{N\_DISC} + \Delta_1 + \Delta_{Interf}, P_{MAX,d})) \tag{18}$$

The WTRU may receive a dynamic grant (e.g., indicated by a D-RNTI) related to this discovery process. The WTRU may transmit the selected SRS sequence at $P_{DISC}(i)$ in the corresponding grant.

The WTRU may perform multiple shot and multi-cast discovery with power ramp up. The WTRU may transmit a discovery process request to the network indicating a QoS parameter (e.g., through RRC signalling). The WTRU may receive a discovery process configuration from the network (e.g., through RRC signalling) indicating, the signal type (e.g., PRACH), the signal bandwidth (e.g., 6 RBs), the power ramp up mode indication, initial and maximum power for the ramp-up such as $P_{powerRampingRef}$ and $P_{powerRampingMax}$ the ramp-up period powerRampingPeriod (e.g., 2 discovery subframes), the ramp-up offset powerRampingStep (e.g., 1 dB), and/or the identities of 5 monitoring WTRUs.

The WTRU may apply $P_{powerRampingRef}$ to the first discovery signal transmission power. The WTRU may apply an adjustment factor of 1 dB every 2 discovery subframes up to $P_{powerRampingMax}$. The WTRU may discover 4 WTRUs before reaching the maximum ramp up power. The WTRU may send a message to the network indicating that $P_{powerRampingMax}$ has been reached. The WTRU may start a counter (incremented every discovery subframe) and may stay at $P_{powerRampingMax}$ until it receives a response from network or reaching the counter limit. The WTRU may receive a response from network indicating to stop the discovery process (e.g., as the current interference level in the cell may not allow to go higher than $P_{powerRampingMax}$). The WTRU may stop the discovery process.

The WTRU may perform multiple-shot discovery with eNB closed loop. The WTRU may perform single shot discovery. The WTRU may be configured, for example, statically, with discovery signal properties (e.g., a static and unique SRS signal on 24 RBs), $P_{MIN,d}$ and $P_{MAX,d}$, and/or a nominal power $P_{N\_DISC}$ associated to the discovery signal.

The WTRU may transmit a discovery process request to the network indicating a QoS parameter (e.g., through RRC signalling). The WTRU may receive a discovery process configuration from network indicating a static resource allocation. The WTRU may transmit the discovery signal at $P_{DISC}(i) = P_{N\_DISC}$ in each allocated resource i. During the discovery process, the WTRU may receive TPC commands from network indicating negative accumulative offsets to be applied to $P_{DISC}(i)$ (e.g., as the network may measure a high level of interferences). After n discovery subframes, the WTRU may compute that $P_{DISC}(i)$ is equal to $P_{MIN,d}$. The WTRU may stop the discovery signal transmission and may send a message to the network indicating that $P_{MIN,d}$ has been reached. The WTRU may inform higher layers that the discovery process has been temporally stopped. The WTRU may start to scan the D2D HI indicator in SIBn. The WTRU may start a counter to limit the maximum duration of this scan. The WTRU may detect that HI is reset to 0 on SIBn. The WTRU may transmit a new discovery request to the network.

A first WTRU may discover a second WTRU via a discovery process. The WTRU may be configured, for example, statically, with discovery signal properties (e.g., a static and unique SRS signal on 24 RBs). The WTRU may be configured, for example, statically, with parameters PMIN, d and PMAX, d. The WTRU may be configured, for example, statically, with a nominal power $P_{N\_DISC}$ associated to the discovery signal.

A WTRU such as UE1 may transmit a discovery process request to the network. UE1 may receive a discovery process configuration from network indicating a static resource allocation. UE1 may transmit a discovery signal at $P_{DISC}(i)=P_{N\_DISC}$ in the discovery resource i. A second WTRU, such as UE2 may decode the discovery signal and may compute the path loss based on the static transmit power $P_{N\_DISC}$. UE2 may measure a discovery signal quality lower than a certain threshold. UE2 may map this signal quality to a power update request ($\delta_1$) for the next discovery signal transmission. UE2 may select its discovery signal based on the power offset request e.g., using Table 7. UE2 may apply a full path loss compensation to its discovery signal transmit power ($\Delta_{PLC}$) and transmits its discovery signal at $P_{DISC}(i+1)=P_{N\_DISC}+\Delta_{PLC}$. UE1 may decode this signal and may identify the power increase request. UE1 may transmit another discovery signal at $P_{DISC}(i+2)=P_{N\_DISC}+\delta_1$.

Figure 18:
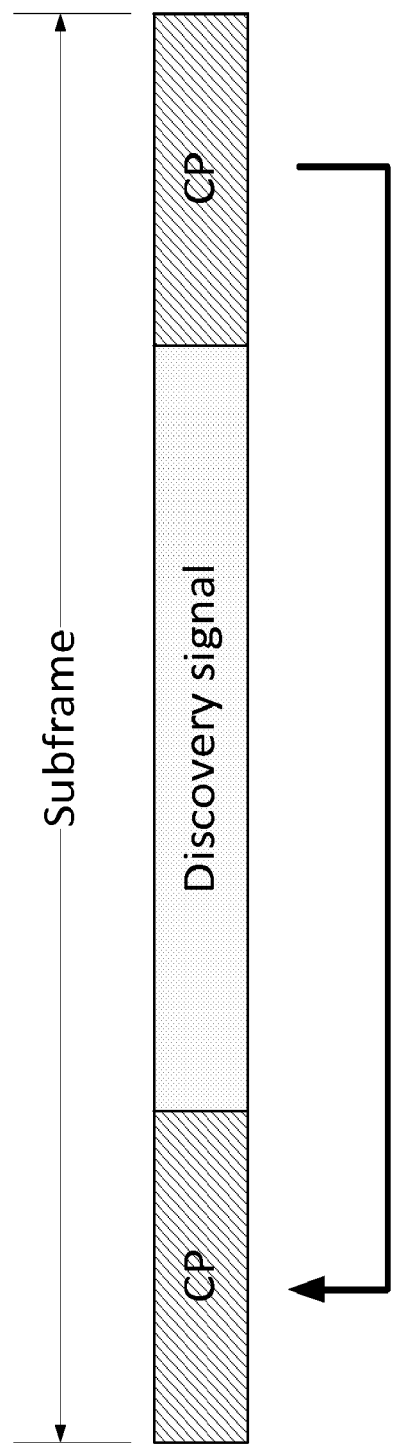
FIG. 18 illustrates an example discovery signal with redundancy section.
Figure 19:
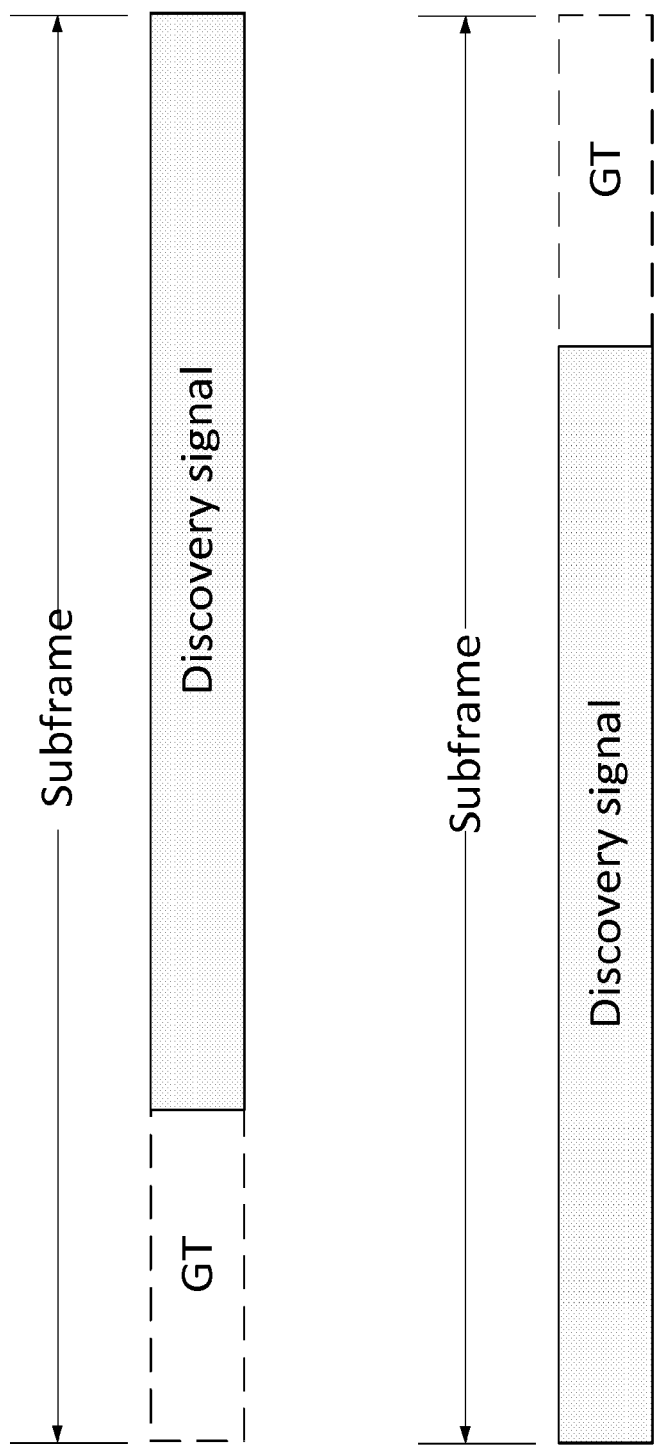
FIG. 19 illustrates an example discovery signal with guard time.

The discovery signal may include a redundant section (e.g., a subframe-based cyclic prefix, as illustrated in FIG. 18). The discovery signal may include a guard time before and/or after the signal, e.g., as illustrated in FIG. 19. The guard time at the end of the discovery signal may be artificially created by a timing advance offset.

Receiver corrupted time at the start of the discovery signal, $\Delta L$, may be higher or equal to $\Delta S$. Independently from its location, a monitoring WTRU may not see the first section $\Delta S$ of the discovery signal (e.g., assuming a transmission on UL timing,). Hence it may be possible to reduce the discovery signal size and the transmit power consumption without impacting the reception performance. This may be achieved by adding a guard time equal to $\Delta S$ at the start of the discovery signal.

To compensate for a worst case $(\Delta L)_{max}$, a redundant section may be used in the discovery signal so that the receiver may be able to properly decode the discovery signal independently of the propagation conditions. If a guard time equal to $\Delta S$ is used, the redundant section may be given by: $(\Delta L)_{max}=T_{P1max}+T_{P2max}$. If no guard time is used, the redundant section may be extended to $(\Delta L)_{max}=T_{P1max}+T_{P2max}+\Delta S$. To compensate for the worst case, $(\Delta P)_{max}$ in FDM, an extended cyclic prefix duration equal to $(T_{P1max}+T_{P2max})$, (which may be replaced by $2R_{cmax}/3\times 10^8$ to cover the worst case) may be used for the discovery signal subframes (FDM signals may use the extended cyclic prefix in the subframe). Interference management may be used to limit the maximum timing difference between FDM signals.

In WTRU discovery procedures, a guard time may be created by applying a timing advance offset to the discovery signal transmission. This offset may be provided by the network or computed by the discoverable WTRU. A discovery process may be scheduled on a subframe n.

A discoverable WTRU may transmit a discovery signal including a static guard time or redundant signal section, e.g., at the beginning of the signal. Its size may be based on a fixed network value representing the maximum allowed WTRU switching latency $\Delta S$. A discoverable WTRU may transmit a discovery signal including a static guard time or a redundant signal section at the end of the signal. The size of the discovery signal may be based on a fixed network value representing the maximum allowed WTRU switching latency $\Delta S$. A discoverable WTRU may transmit a discovery signal including a guard time combined with a redundant signal section at the start and/or end of the discovery signal. The discoverable WTRU may select and/or define the guard time size, the redundant section size, and cyclic shift value (e.g., for a Zadoff-Chu sequence) based on $\Delta S-(T_{P1}+T_{P2})$, $(T_{P1}+T_{P2})$, and $(T_{P1}+T_{P2})$ respectively. $T_{P1}$ may be a function of the cell size, and may be equal to the discoverable WTRU TA value received from the network. The cell size may be statically defined to its maximum value, e.g., $R_{cmax}/3\times 10^8$. The cell size may also be indirectly derived from a parameter associated to the cell size (cyclic prefix size, PRACH configuration, etc.) $T_{P2}$ may be equal to the maximum TA value of a group of monitoring WTRUs (e.g., in case pre-selection applies to the discovery process). The value of $T_{P2}$ may be distributed during a discovery process configuration by the network and/or communicated at the application level. $T_{P2}$ may be a function of the cell size, and me be, for example, statically defined to its maximum $R_{cmax}/3\times 10^8$, and/or indirectly derived from a parameter associated to the cell size (e.g., cyclic prefix size, PRACH configuration, etc.) The values may be approximated to the closest symbol size.

A discoverable WTRU may use a sounding symbol at the end of the discovery subframe to create a guard time. The WTRU may combine the sounding symbol to a negative timing advance offset on the discovery signal to create an artificial guard time at the start of the subframe.

The discovery signal parameters such as guard time, redundant section and cyclic shift may be computed by the WTRU based on static parameters and/or system or dedicated parameters provided by the network. The discovery signal parameters may be computed by the network and transmitted to the WTRU. The two computing methods may be combined, e.g., the network may provide the guard time value, and the WTRU may compute the redundant section and cyclic shift. The signal redundancy may be placed inside the discovery signal payload using a coding rate based on the expected propagation conditions. For example, for WTRUs that are close to the eNB, $T_{P1}$ and $T_{P2}$ may be small, and a higher coding rate may be used, as the monitoring WTRU may be able to decode most of the discovery signal.

In the case of addition or removal of pre-selected WTRUs in the discovery procedure, a discoverable WTRU may receive updates from the network on the discovery signal to use based on the maximum value of $T_{P2}$. The discoverable WTRU may directly update its signal based on pre-selection information. For example, the discoverable WTRU may initially receive a list of WTRUs involved in the discovery process with their corresponding TA values. The WTRU may receive a notification indicating that a WTRU may not be involved in the process. The WTRU may remove the corresponding TA from its list and update its discovery signal accordingly.

A WTRU in RRC_IDLE mode or a WTRU in RRC_CONNECTED mode that may not be synchronized may select a specific discovery signal designed to be more robust with timing imprecision. A WTRU in RRC_IDLE mode or a WTRU in RRC_CONNECTED mode that is not synchronized may use specific discovery resources to ensure that it does not interfere with network communications.

A monitoring WTRU may acquire a set of discovery signal parameters (e.g., redundant section size, etc.) from the network (e.g., from system or dedicated information). A monitoring WTRU may use the values $\Delta S$, $T_{P1}$, and $T_{P2}$ to adjust its reception parameters, e.g., to open and/or close a receive window (UL frequency), to improve the discovery signal decoding (e.g., to combine redundant sections). $T_{P1}$, in a monitoring WTRU, may be equal to the discoverable WTRU TA value provided by the network. $T_{P2}$ may be equal to the maximum TA value of a group of monitoring WTRUs. $T_{P1}$ and $T_{P2}$ may be a function of the cell size, and may be, for example, statically defined to its maximum value ($R_{cmax}/3\times10^8$), and/or indirectly derived from a parameter associated to the cell size (e.g., cyclic prefix size, PRACH configuration, etc.)

A monitoring WTRU, scheduled for network communications at subframe (n−1), may open a discovery signal receive window at ΔS after the start of subframe (n), whereas the WTRU not scheduled for network communications at subframe (n−1) may switch to UL frequency at ΔS before the start of subframe (n). A monitoring WTRU, scheduled for network communications at subframe (n+1) may switch back to its DL frequency at ΔS before the start of subframe (n+1).

A monitoring WTRU may use the network synchronization reference to derive the transmission time of a discovery signal. For example, a monitoring WTRU may know the network reference time from the timing advance value provided by the network. The monitoring WTRU may receive the discoverable WTRU timing advance value from the network. Based on the received timing advance value, the monitoring WTRU may derive the transmission time of the discovery signal. A monitoring WTRU may compute the synchronization point time of the received discovery signal (e.g., through reference pattern autocorrelation or crosscorrelation). A monitoring WTRU may derive the propagation time from the transmission time and the synchronization point time of the received discovery signal.

A monitoring WTRU may define RF proximity status (or the D2D distance) based on the D2D propagation time computation combined or not with other signal metrics (e.g., RSRP, RSRQ, path loss, etc.) A monitoring WTRU that is not able to properly decode a discovery signal because of timing issues (e.g., in a case where the energy level may be correct but the signal size may be shorter than a given threshold), may request the network to adjust the discovery signal settings (e.g., timing, redundancy, etc.)

A monitoring WTRU in RRC_IDLE mode may not have a valid TA value and may use a function of the cell size instead. For example, the TA value may be statically defined to its maximum value ($R_{cmax}/3\times10^8$), and/or indirectly derived from a parameter associated to the cell size (cyclic prefix size, PRACH configuration, etc.).

A network may use a symbol offset on the control information for a monitoring WTRU in subframe (n+1) (e.g., an R-PDCCH or ePDCCH). In this case, the first symbols in the subframe (n+1) may not be decoded. Such a scheduling limitation may be specified by design. For example, a WTRU scheduled to a discovery process on subframe n may be scheduled for network communications on subframe (n+1) by ePDCCH. The scheduling limitation may be provided by the network, e.g., during the discovery process configuration. A monitoring WTRU may decode the entire discovery signal on subframe (n) before switching back to the DL frequency on subframe (n+1).

The network may further add scheduling limitations to a monitoring WTRU, for example, no network DL scheduling may be provided on subframe (n−1), so that the monitoring WTRU may switch on the UL frequency at subframe (n)−ΔS. No network DL scheduling or control information may be provided on subframe (n+1), e.g., so that the monitoring WTRU may stay on the UL frequency to decode the entire discovery signal.

In a TDD case, the switching latency problem may be similar to the FDD case. Frequency switching latency, ΔS, may be equal to the time to switch from transmit (Tx) to receive (Rx) or from Rx to Tx (e.g., where the frequency may stay the same). Additional procedures used for the TDD case may include, for example cases where the n−1 subframe is a special TDD subframe, and/or where n+1 subframe is a DL subframe. If the n−1 subframe is a special TDD subframe, a monitoring WTRU with a discovery process scheduled after a special TDD subframe (DwPTS/GP/UpPTS) may stay in the Rx state during the special subframe (GP and UpPTS), and receive the discovery signal without experiencing switching latency impact. This method may prevent network UL allocation to the monitoring WTRU on UpPTS. If the n+1 subframe is a DL subframe, the discoverable WTRU may consider that ΔS is equal to zero then use WTRU discovery methods, e.g., to select or define the discovery signal. The monitoring WTRU may decode the entire discovery subframe (n) as the WTRU may not switch back to transmit state before the end of the subframe.

A monitoring WTRU may send a response to a discoverable WTRU after RF proximity detection. In this case, the monitoring WTRU may use a specific transmit timing (e.g., timing different from its current network UL timing). For example, a monitoring WTRU may derive the discoverable WTRU DL reference time $T_{ref}$ by receiving the timing advance associated to the discoverable WTRU from the network, or through a timestamp inserted in the discovery signal. A monitoring WTRU may obtain the D2D propagation time $T_{Pd}$. The monitoring WTRU may transmit its response at $T_{ref}-T_{Pd}+\Delta S$.

A discoverable WTRU may directly select, or receive from the network, one or several power values, including for example, the initial transmit power of a discovery signal, the minimum transmit power of a discovery signal, and/or the maximum transmit power of a discovery signal. These received power values may be based on, for example, one or more of the RF discovery range, the current network interference level, the number of resources assigned to the discovery signal, the current WTRU timing advance, the type of signal allocation (that may be contention free or contention based), the number of parallel discovery processes, or a priority value associated with the discovery process.

The current network interference level may be provided by the network during discovery configuration or based on WTRU measurements. The number of resources assigned to the discovery signal may be in frequency, time, and/or space. The current WTRU timing advance value may be, for example, used to increase the transmit power to counteract the higher level of interferences at the cell edges. The TA value may be used to decrease the transmit power, e.g., to not exacerbate the interference level. Such rules may be dynamically switched based, e.g., on the network conditions. If pre-selection of monitoring WTRU applies, the TA of the monitoring WTRUs may be used. As described herein, the knowledge of TA for discoverable and monitoring WTRUs may provide an upper bound of the maximum distance between WTRUs. The maximum WTRU transmit power, e.g., a margin, may be reserved for eventual future D2D communications.

In case of multiple discovery signal transmissions, power adjustments may be defined by the discoverable WTRU or sent by the network between the transmissions (e.g., PDCCH or RRC messaging). Such power adjustments may be based on, for example, the number of RF proximity detections, reports from the monitoring WTRUs (e.g., metrics on received signals, interference level, etc.), interference reports from other eNBs (e.g., to decrease interference in a given resource), and/or an update of the power values, the number of discovery signal transmission iterations (e.g., power ramp up). The maximum power value may be limited by a static parameter or provided during the discovery configuration.

Such power parameters may be combined in multiple ways, e.g., a discoverable WTRU may increase its power up to the nominal power (related to the maximum discovery range) but may stop the ramp up if at least n WTRUs report RF proximity. The power ramp-up may be time bounded.

A discoverable WTRU may transmit one or more UL signals in parallel to a discovery signal. In such a case, the discoverable WTRU may compute the power to be allocated to the UL signals based on the "Physical Layer Procedures" as provided, for example, in 3rd Generation Partnership Project (3GPP) Technical Specification 26.213. The discoverable WTRU may compute the power to be allocated to the discovery signal. If the total transmit power of the WTRU exceeds the WTRU maximum output power, the WTRU may scale the discovery signal power ($P_{discovery}$) according to the following equation:

$$(\Sigma w(i) P_{PUSCH} + \alpha P_{discovery}) \leq (P_{UEmax} - P_{PUCCH}) \quad (6)(19)$$

The power values described in equation (12) may be linear, the coefficients $w(i)$ may represent scaling factors related to PUSCH transmission as defined, for example, in 3GPP TS 26.213. $\alpha$ may be the scaling factor for the discovery signal power. This factor may be known by design or provided by the network for a cell or for a given discovery process.

A monitoring WTRU may send a response to a discovery signal after RF proximity detection. In this case, the monitoring WTRU may use a specific transmit power level, based on parameters including, for example, partial path loss compensation, and/or propagation time between the discoverable and monitoring WTRU (e.g., related to the D2D distance). The discovery signal transmit power may be known by design, received from the network, or provided in the discovery signal (e.g., inside a payload or associated to a reference pattern). The received signal power may be based on a Reference Signal Received Power (RSRP) measurement. The fraction of path loss to compensate may be provided by the network for this discovery process or may be a static parameter.

A monitoring WTRU may consider a minimum margin (e.g., power headroom) with its maximum transmit power before sending a response. The margin may be computed, e.g., based on a maximum Packet Error Rate defined for the D2D communication. The margin may take into account a minimum power budget reserved for parallel network communications. If the margin is not sufficient, the monitoring WTRU may skip its response (e.g., in the case where the discovery should be followed by D2D communication). Other power value parameters for a discoverable WTRU described herein may still apply.

Joint procedures may be used to compensate for the near far effect on a monitoring WTRU in a network. The network may use various mechanisms to achieve such compensation. For example, Frequency Division Multiplexing (FDM) or Code Division Multiplexing (CDM) may be used on discovery processes located far away from each other (e.g., the eNB may use, for example, timing advance information, coarse location information, etc. to distribute the allocation). Processes close to each other may use different Time Division Multiplexing (TDM) resources. The network may switch to dedicated resources (TDM) or change FDM/CDM resources based on discovery failure rate for a given discovery process. The network may switch discoverable/monitoring role of a WTRU based on interference level at each WTRU. In this case, a discoverable WTRU may take the monitoring role and the monitoring WTRU may take the discoverable role. The remaining discovery parameters may stay unchanged to limit the control overhead.

A discoverable WTRU may switch its hopping pattern to randomize interferences. This pattern may be provided by the network to the monitoring WTRUs or the monitoring WTRUs may use a blind decoding on a set of resources.

Various joint methods may be adopted to avoid a near-far effect on the eNB receiver. When a WTRU has a timing advance value that is, for example, lower than a given threshold, the eNB may limit its role to a monitoring role. Such a WTRU may not be allowed to request a discoverable role. When two WTRUs, e.g., having timing advance values lower than a given threshold, want to discover each other, an eNB may select an alternative method to determine location. If, for example, timing advance is lower than a first threshold, the network may directly admit that they are in RF proximity and may provide this information to the WTRUs. If, for example, timing advance is lower than a second threshold, the network may use alternative location procedures that may be accurate enough as the WTRU may be physically close to a signal transmitter.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

The invention claimed is:

1. A method associated with device to device (D2D) signaling by a wireless transmit/receive device (WTRU), comprising:
    selecting a D2D discovery signal schedule indicating allowed subframes to transmit a D2D discovery signal;
    determining a scrambling sequence, wherein the scrambling sequence is generated by a scrambling sequence generator, and wherein the scrambling sequence generator is initialized with a pre-configured fixed value at the start of each subframe associated with the D2D discovery signal;
    determining to transmit the D2D discovery signal on one or more resource blocks associated with the allowed subframes based on a condition that the one or more resource blocks do not overlap with resources scheduled for a priority channel; and transmitting the D2D discovery signal using the scrambling sequence, wherein the D2D discovery signal comprises a payload and a guard period, wherein the guard period occupies the last symbol in a sidelink subframe carrying the D2D discovery signal.

2. The method of claim 1, wherein determining the D2D discovery signal schedule comprises receiving a system information block (SIB) from a network and determining the D2D discovery signal schedule based on the SIB.

3. The method of claim 1, wherein determining the D2D discovery signal schedule comprises deriving the D2D discovery signal schedule based on a D2D radio network temporary identifier (D-RNTI) associated with the WTRU.

4. The method of claim 1 comprising:
determining a transmission schedule associated with the priority channel; and
comparing the D2D discovery signal schedule to the transmission schedule associated with the priority channel.

5. The method of claim 4, wherein the priority channel is a Physical Uplink Shared Channel (PUSCH) or a Physical Uplink Control Channel (PUCCH) with ACK/NACK traffic.

6. The method of claim 1, further comprising:
prioritizing a transmission associated with the priority channel over transmission of D2D discovery signal based on a condition that the one or more resource blocks overlap with resources scheduled for the priority channel; and
sending the transmission associated with the priority channel.

7. The method of claim 1, wherein the D2D discovery signal further comprises a reference symbol.

8. The method of claim 7, wherein the reference symbol is in the payload.

9. The method of claim 1, wherein the WTRU is configured to alternate D2D regions when transmitting the D2D discovery signal.

10. The method of claim 1, wherein the WTRU is configured to alternate D2D regions when transmitting the D2D discovery signal using a pre-determined hopping sequence or on a random selection.

11. A wireless transmit/receive device (WTRU) comprising:
a processor configured to at least:
select a device to device (D2D) discovery signal schedule indicating allowed subframes to transmit a D2D discovery signal;
determine a scrambling sequence, wherein the scrambling sequence is generated by a scrambling sequence generator, and wherein the scrambling sequence generator is initialized with a pre-configured fixed value at the start of each subframe associated with the D2D discovery signal;
determine to transmit the D2D discovery signal on one or more resource blocks associated with the allowed subframes based on a condition that the one or more resource blocks do not overlap resources scheduled for a priority channel; and
a transmitter configured to at least:
transmit the D2D discovery signal using the scrambling sequence, wherein the D2D discovery signal comprises a payload and a guard period, wherein the guard period occupies the last symbol in a sidelink subframe carrying the D2D discovery signal.

12. The WTRU of claim 11, wherein the D2D discovery signal schedule is determined by receiving a system information block (SIB) from a network and determining the D2D discovery signal schedule based on the SIB.

13. The WTRU of claim 11, wherein the D2D discovery signal schedule determined by deriving the D2D discovery signal schedule based on a D2D radio network temporary identifier (D-RNTI) associated with the WTRU.

14. The WTRU of claim 11, wherein the processor is configured to at least:
determine a transmission schedule associated with the priority channel; and
compare the D2D discovery signal schedule to the transmission schedule associated with the priority channel.

15. The WTRU of claim 14, wherein the priority channel is a Physical Uplink Shared Channel (PUSCH) or a Physical Uplink Control Channel (PUCCH) with ACK/NACK traffic.

16. The WTRU of claim 11, wherein the processor is configured to:
prioritize a transmission associated with the priority channel over transmission of D2D discovery signal based on a condition that the one or more resource blocks overlap with resources scheduled for the priority channel; and
send the transmission associated with the priority channel.

17. The WTRU of claim 11, wherein the D2D discovery signal further comprises a reference symbol.

18. The WTRU of claim 17, wherein the reference symbol is in the payload.

19. The WTRU of claim 11, wherein the processor is configured to alternate D2D regions when transmitting the D2D discovery signal.

20. The WTRU of claim 11, wherein the processor is configured to alternate D2D regions when transmitting the D2D discovery signal using a pre-determined hopping sequence or on a random selection.

* * * * *